(12) United States Patent
Yajima

(10) Patent No.: US 7,996,761 B2
(45) Date of Patent: Aug. 9, 2011

(54) TABLE FORMAT DATA PROCESSING METHOD AND TABLE FORMAT DATA PROCESSING

(76) Inventor: Mantaro Yajima, Hiroshima (JP)

( * ) Notice: Subject to any disclaimer, the term of this patent is extended or adjusted under 35 U.S.C. 154(b) by 833 days.

(21) Appl. No.: 10/588,058

(22) PCT Filed: Feb. 2, 2005

(86) PCT No.: PCT/JP2005/001512
§ 371 (c)(1),
(2), (4) Date: Feb. 26, 2007

(87) PCT Pub. No.: WO2005/073886
PCT Pub. Date: Aug. 11, 2005

(65) Prior Publication Data
US 2007/0174482 A1    Jul. 26, 2007

(30) Foreign Application Priority Data
Feb. 2, 2004  (JP) ................................ 2004-025165

(51) Int. Cl.
*G06F 17/00* (2006.01)
(52) U.S. Cl. ........ 715/227; 715/212; 715/217; 715/220; 715/228
(58) Field of Classification Search .................. 715/227, 715/228, 212, 217, 219, 220
See application file for complete search history.

(56) References Cited

U.S. PATENT DOCUMENTS

| | | | | |
|---|---|---|---|---|
| 5,228,100 A | * | 7/1993 | Takeda et al. | 382/175 |
| 5,280,575 A | * | 1/1994 | Young et al. | 715/255 |
| 5,537,633 A | * | 7/1996 | Suzuki et al. | 1/1 |
| 5,794,229 A | * | 8/1998 | French et al. | 1/1 |
| 2001/0007988 A1 | * | 7/2001 | Bauchot et al. | 707/100 |
| 2002/0095444 A1 | | 7/2002 | Mantaro | |
| 2002/0143742 A1 | * | 10/2002 | Nonomura et al. | 707/1 |
| 2004/0133848 A1 | * | 7/2004 | Hunt et al. | 715/500 |

(Continued)

FOREIGN PATENT DOCUMENTS

EP    336586 A2 * 10/1989

(Continued)

OTHER PUBLICATIONS

International Preliminary Report on Patentability dated Nov. 14, 2006 issued in corresponding International Application PCT/JP2005/007558.

(Continued)

*Primary Examiner* — Chau Nguyen
(74) *Attorney, Agent, or Firm* — Wenderoth Lind & Ponack, L.L.P.

(57) ABSTRACT

A method of automatic data input/output to/from another document format or data file with a high visibility and an easy document format definition operation, even in a document format having a derivative area as a second data description area in a single cell. The method includes performing an item definition for correlating data or a data field with an item name in a document format, and specifying a difference condition as a description condition unique to the derivative area against a main area as a first description area in the same cell, for the data field having the derivative area as a second data area in a single cell. According to the specified item definition and the difference condition, data or a record as a set of data description areas to be simultaneously referenced at the document data input/output is identified for each of the derivative areas.

6 Claims, 49 Drawing Sheets

U.S. PATENT DOCUMENTS

| | | | |
|---|---|---|---|
| 2005/0027724 A1* | 2/2005 | Minamino et al. | 707/100 |
| 2005/0038804 A1* | 2/2005 | Shimizu | 707/100 |
| 2005/0108268 A1* | 5/2005 | Saintry et al. | 707/102 |
| 2010/0185967 A1* | 7/2010 | Noda | 715/770 |
| 2010/0228880 A1* | 9/2010 | Hunt et al. | 709/246 |

FOREIGN PATENT DOCUMENTS

| | | |
|---|---|---|
| JP | 9-134349 | 5/1997 |
| JP | 10-162086 | 6/1998 |
| JP | 10-187679 | 7/1998 |
| JP | 2001-357342 | 12/2001 |
| JP | 2003-223606 | 8/2003 |
| JP | 2003-323580 | 11/2003 |

OTHER PUBLICATIONS

International Preliminary Report on Patentability dated Sep. 19, 2006 issued in corresponding International Application PCT/JP2005/001512.

* cited by examiner

FIG. 5

[DEFINITION ELEMENT/ENTRY INFORMATION REFERENCE TABLE]

| DEFINITION SYSTEM | DEFINITION ELEMENT | CORRESPONDING DOCUMENT ELEMENT |
|---|---|---|
| COMMON | LINKING LINE | — |
| | REGISTERED WORD SPECIFICATION | ◯  ▨ |
| | ⋮ | ⋮ |
| FORM DEFINITION | DATA ITEM NAME | 〈 〉 ,  ▨ |
| | FIELD DATA NAME | [ ], 「 」, ▨ |
| | DATA ENTRY ORDER | |
| | ASCENDING ORDER | ↑ |
| | DESCENDING ORDER | ↓ |
| | SIGNIFICANT DIGITS | "NUMBER" DIGITS |
| | ROUNDING METHOD | ROUND UP, ROUNDING UP |
| | | ROUND DOWN, ROUNDING DOWN |
| | | ROUND OFF |
| | | · |
| | TABULATION NUMERIC VALUE | ○ |
| | NON-TABULATION NUMERIC VALUE | ● |
| | DIFFERENCE CONDITION SPECIFICATION | △ |
| | COMPOSITE FIELD SPECIFICATION | COMPOSITE, COMP. |

FIG. 9

SALES SUMMARY TABLE

YEAR 2001

| PRODUCT | TOKYO | OSAKA | NAGOYA | TOTAL |
|---|---|---|---|---|
| TELEVISION | | | | |
| RADIO | | | | |
| CAR NAVIGATION SYSTEM | | | | |
| TOTAL | | | | |

FIG. 10

SALES SUMMARY TABLE

YEAR 2001

( [ ] INDICATES SALES OF YEAR 2000 )

| PRODUCT | TOKYO | OSAKA | NAGOYA | TOTAL |
|---|---|---|---|---|
| TELEVISION | 20,530 [19,380] | 15,780 [13,250] | 13,260 [11,320] | . . . [ . . . ] |
| RADIO | . . . [ . . . ] | . . . [ . . . ] | . . . [ . . . ] | . . . [ . . . ] |
| CAR NAVIGATION SYSTEM | . . . [ . . . ] | . . . [ . . . ] | . . . [ . . . ] | . . . [ . . . ] |
| TOTAL | . . . [ . . . ] | . . . [ . . . ] | . . . [ . . . ] | . . . [ . . . ] |

FIG. 15 CHARACTER DATA

TOTAL FIELD DEFINITION DATA

FIG. 2 6

| SUB-DEFINITION SYSTEM | CHARACTER, STRING, AND SYMBOL USED |
|---|---|
| UNIT SPECIFICATION | km, m, cm, mm<br><br>M PIECES, K PIECES<br><br>M YEN, M¥, K YEN, K¥, YEN, ¥ ···<br><br>M DOLLARS, M$, K DOLLARS, K$, DOLLAR, $ ··· |
| EQUATION OPERATOR | =, +, ×, ÷ ··· |
| CALCULATION RESULT SPECIFICATION | TOTAL, INTERMEDIATE TOTAL, MINOR TOTAL, GRAND TOTAL, ···<br>AVERAGE, VARIANCE, ··· |

FIG. 31
DERIVED AREA ALLOCATION DIRECTION IN CELL
(a) ALLOCATE IN DOWNWARD DIRECTION IN CELL
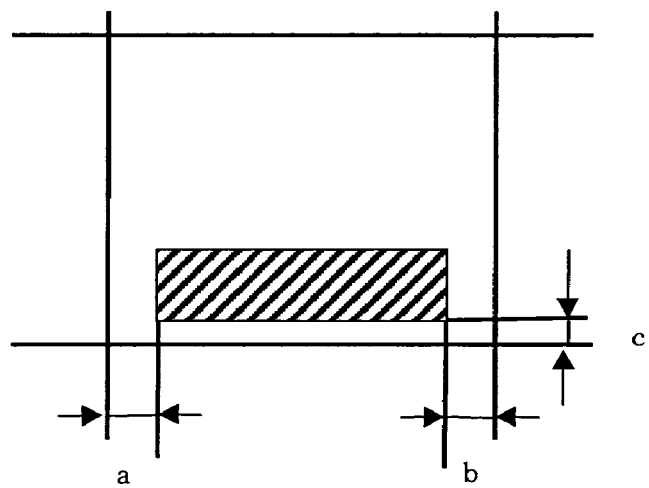
a, b, AND c ARE WITHIN REFERENCE VALUE
(b) ALLOCATE IN RIGHTWARD DIRECTION IN CELL
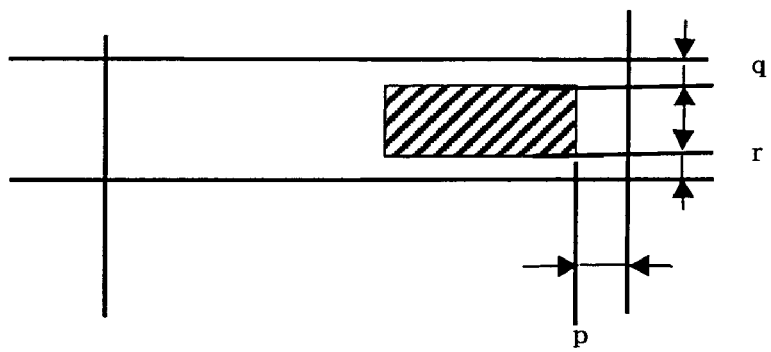
p, q, AND r ARE WITHIN REFERENCE VALUE
SHADED AREA IS EXTERIOR FRAME RECTANGLE OF
DERIVED AREA GENERATING ELEMENT

ENTRY RANGE OF DERIVED AREA h: DERIVED AREA DIVIDING POSITION l, r: BOTH-SIDE MARGIN OF DERIVED AREA

FIG. 37

OUTPUT SOURCE DATA FIELD

| FIELD NAME | BRANCH | PRODUCT | YEAR | CODE | SALES VOLUME | SALES AMOUNT | PROFIT |
|---|---|---|---|---|---|---|---|
| FIELD LENGTH | 20 | 20 | 20 | 5 | 5 | 5 | 5 |
| NUMERIC VALUE/ TEXT CATEGORY | 0 | 0 | 0 | 2 | 1 | 1 | 1 |

0: TEXT
1: TABULATION NUMERIC VALUE
2: NON-TABULATION NUMERIC VALUE

IMAGE OF PICKING UP OF RECORD CELL SEQUENCE

SALES SUMMARY TABLE

YEAR ([    ] INDICATES SALES OF YEAR 2000)

PICKING UP FROM CELL OR DATA IN SHADED AREAS

RELEVANT MAIN RECORD

| \<YEAR\> | \<BRANCH\> | PRODUCT CLASSIFICATION | SALES AMOUNT |
|---|---|---|---|
| 2 0 0 1 | OSAKA | RADIO | |

RELEVANT SUB-RECORD

| \<YEAR\> | \<BRANCH\> | PRODUCT CLASSIFICATION | SALES AMOUNT |
|---|---|---|---|
| 2 0 0 0 | OSAKA | RADIO | |

FIG. 4 2

FIRST ROW    ITEM NAME

SECOND ROW
  TABULATION CATEGORY

THIRD ROW
  OUTPUT DESTINATION CELL
    DATA ADDRESS

FOURTH ROW
  OUTPUT    DESTINATION

FIFTH ROW
  OUTPUT SOURCE CELL
DATA ADDRESS

SIXTH ROW
  OUTPUT SOURCE DATA

|  |  |  |  |
|--|--|--|--|
|  |  |  |  |
|  |  |  |  |
|  |  |  |  |
|  |  |  |  |
|  |  |  |  |

PROCEDURE OF "DATA OUTPUT TO MAIN RECORD (COLUMN RECORD)"

FIG. 44

SALES SUMMARY TABLE 2001

( [ ] INDICATES PROFIT )

| PRODUCT | TOKYO | OSAKA | NAGOYA | TOTAL |
|---|---|---|---|---|
| TELEVISION | [ ] | [ ] | [ ] | [ ] |
| RADIO | [ ] | [ ] | [ ] | [ ] |
| CAR NAVIGATION SYSTEM | [ ] | [ ] | [ ] | [ ] |
| TOTAL | [ ] | [ ] | [ ] | [ ] |

FIG. 45

SALES SUMMARY TABLE
( [ ] INDICATES PROFIT )

<YEAR> [2001] (BLUE)

| <BRANCH> <PRODUCT> | [TOKYO] | OSAKA | NAGOYA | TOTAL |
|---|---|---|---|---|
| TELEVISION | [ ] | [ ] | [ ] | [ ] |
| RADIO | [ ] | [ ] | [ ] | [ ] |
| CAR NAVIGATION SYSTEM | [ ] | [ ] | [ ] | [ ] |
| TOTAL | [ ] | [ ] | [ ] | [ ] |

<PROFIT> (BLUE)
<SALES> (BLUE)

(All tags and brackets shown in BLUE)

FIG. 47

SALES SUMMARY TABLE

YEAR 2001

( [     ] INDICATES SALES OF YEAR 2000 )

| PRODUCT | TOKYO | OSAKA | NAGOYA | TOTAL |
|---|---|---|---|---|
| TELEVISION | 20,530 [19,380] | 15,780 [13,250] | 13,260 [11,320] | · · · [ · · · ] |
| RADIO | · · · [ · · · ] | · · · [ · · · ] | · · · [ · · · ] | · · · [ · · · ] |
| CAR NAVIGATION SYSTEM | · · · [ · · · ] | · · · [ · · · ] | · · · [ · · · ] | · · · [ · · · ] |
| TOTAL | · · · [ · · · ] | · · · [ · · · ] | · · · [ · · · ] | · · · [ · · · ] |

FIG. 48

SALES SUMMARY TABLE

YEAR 2001

( [ ] INDICATES SALES OF YEAR 2000 )

| PRODUCT | TOKYO | OSAKA | NAGOYA | TOTAL |
|---|---|---|---|---|
| TELEVISION | 20,530<br>19,380 | 15,780<br>13,250 | 13,260<br>11,320 | . . .<br>. . . |
| RADIO | . . .<br>. . . | . . .<br>. . . | . . .<br>. . . | . . .<br>. . . |
| CAR NAVIGATION SYSTEM | . . .<br>. . . | . . .<br>. . . | . . .<br>. . . | . . .<br>. . . |
| TOTAL | . . .<br>. . . | . . .<br>. . . | . . .<br>. . . | . . .<br>. . . |

FIG. 49

SALES SUMMARY TABLE    YEAR 2001    ( [ ] INDICATES SALES OF YEAR 2000 )

| PRODUCT | TOKYO | OSAKA | NAGOYA | TOTAL |
|---|---|---|---|---|
| TELEVISION | 20,530 (BLUE)<br>[19,380] | 15,780<br>[13,250] | 13,260<br>[11,320] | |
| RADIO | 9,100<br>[ 8,250] | 7,080<br>[ 6,970] | 4,120<br>[ 5,580] | |
| CAR NAVIGATION SYSTEM | 70,530<br>[59,980] | 53,140<br>[49,860] | 68,260<br>[39,920] (BLUE) | |
| TOTAL (BLUE) | (BLUE) | | | (BLUE) |

(BLUE) annotations on TOTAL cells and brackets throughout.

TABLE FORMAT DATA PROCESSING METHOD AND TABLE FORMAT DATA PROCESSING

BACKGROUND OF THE INVENTION

1. Field of the Invention

The present invention relates to a method and apparatus that processes data in a form format.

2. Description of the Related Art

Conventionally, with regard to various form formats created freely by a user, a form format defining method is known that data transcription and tabulation are performed automatically with another form or data file by performing item definition to correlate relevant item names with data fields or data constituting form formats, identifying data that should be referred in data input/output of a form or a record, i.e., a group of data entry areas, in a formulaic manner.

For example, in Japanese Patent Application Laid-Open Publication No. 1997-134349, the inventor proposed a method of achieving this method with excellent man-machine properties by additionally entering minimum characters and symbols familiar to a user in a form format.

With regard to each data field in a form format, in a method of specifying a field attribute such as a field format, a function is known that specifies a relevant data field range as a whole to specify the attribute value thereof from a field attribute screen displayed subsequently.

With regard to a method of calculating data on a table in a form format, a function is known that specifies a plurality of data in a column with, for example, a drag operation on a screen, to perform calculation such as a specified total process of the plurality of specified data and to enter the data of the calculation result in a specified calculation result entry space.

However, a form format used actually is often a composite format including another entry area (derived area) in a cell as shown in FIG. 10 described later and data entered in another entry area has a data entry condition different from the original entry area (main area).

Since only one piece of data is entered in each cell constituting a form in the case of form formats handled in form format defining methods that have been proposed so far, the automatic data input/output cannot be performed for the composite format including this type of derived area based on the above form definition.

If a user want to output data in the composite format including such derived areas, for example, a user must create another form such that a data entry condition of a constituent cell is equivalent to a data entry condition of each derived area of a target format and must copy acquired data onto the derived area of the target format one by one.

In the composite format including this type of derived areas, if a user want to specify a field attribute such as a layout format for a group of a plurality of main areas or a plurality of derived areas, since the main areas or derived areas to be specified are located alternately in either row or column direction, the user cannot use a known method of specifying a successive field range as a whole and must select the main areas or derived areas to be specified one by one.

If the large number of the main areas or derived areas specified, the operation of selecting the main areas or derived areas one by one in the composite format becomes troublesome correspondingly.

In the composite format including this type of derived areas, for example, if calculation such as a total process is performed in one column, data of the main areas and data of the derived areas in the column are summed separately and entered in the main area and derived area of a relevant total space, respectively.

However, since the main areas and derived areas are located alternately in one column in the composite format including the derived areas, for example, in the case of a composite format with the derived area located in the lower part of the cell, when the total calculation is performed in the column (vertical) direction, the data to be calculated must be selected alternately in the column direction.

In known table data calculating methods, a method of specifying a plurality of calculation target data together (e.g., specifying a plurality of data by dragging) is used only when the calculation target data are arranged serially in one row or one column. If the calculation target data are arranged discretely on a table as is the case of the composite format, the calculation target data must be selected separately and if large quantities of the calculation target data exist, a troublesome operation is required correspondingly.

The present invention was conceived in view of the above problems of conventional arts and it is therefore an object of the present invention to propose an information processing method and apparatus that can perform form format definition and automatic data input/output for the form format including this type of derived area with a simple operation at the same level as the specifying operation performed for a normal form format.

The present invention was conceived in view of the above problems of conventional arts and it is therefore another object of the present invention to propose an information processing method and apparatus that can perform table calculations for the form format including this type of derived area with an operation including a small number of operation procedures at the same level as the specifying operation performed for a normal form format.

The present invention was conceived in view of the above problems of conventional arts and it is therefore still another object of the present invention to propose an information processing method and apparatus that can specify field attributes for the form format including this type of derived area with an operation including a small number of operation procedures at the same level as the specifying operation performed for a normal form format.

It is still another object of the present invention to provide an information processing method and apparatus that can perform form format definition and automatic data input/output for the form format including the derived areas in a way providing visibility and readability that can be performed and understood by anyone.

It is still another object of the present invention to provide an information processing method and apparatus that can specify field attributes for the form format including the derived areas in a way providing visibility and readability that can be performed and understood by anyone.

It is still another object of the present invention to provide an information processing method and apparatus that can perform table calculations for the form format including the derived areas in a way providing visibility and readability that can be performed and understood by anyone.

In order to achieve the above objects, a table format data processing method in an information processing apparatus according to a first aspect of the invention is a table format data processing method that is an input/output method of a table format in an information processing apparatus, the table format being in a form of a composite unit data entry space where a data entry space is a constituent unit of a certain data field in a table and includes therein partial areas, which are a main area that is a first data entry area and a derived area that is a second data entry area, the method comprising the steps of:

performing item definition that corresponds an item name with each data field in the table;

specifying a difference condition, which is a difference portion specific to a data entry condition of the derived area from a data entry condition of the main area;

identifying from the table format a first record that is a combination of data to be concurrently referenced with the data in the main area or data entry areas of the data to be concurrently referenced with the data in the main area, based on the item name correlated with each data field in the table; and generating a second record that is a combination of data to be concurrently referenced with the data in the derived area or data entry areas of the data to be concurrently referenced with the data in the derived area, based on the specified difference condition and the first record identified from the table format, wherein data output to the derived area or data input from the derived area in the table format is effected based on the generated second record.

A table format data processing method in an information processing apparatus according to a second aspect of the invention, which is based on the first aspect of the invention, wherein the second record is generated by replacing data of a certain item in the first record with other data specified by the difference condition to generate.

A table format data processing method in an information processing apparatus according to a third aspect of the invention, which is based on the first aspect of the invention, wherein the second record is generated by adding data or a data entry area of an item specified by the difference condition to the first record.

A table format data processing method in an information processing apparatus according to a fourth aspect of the invention, which is based on the first aspect of the invention, wherein the difference condition is specified by additionally entering definition support entry information that can be differentiated from normal entry information, which is original entry information representing the table format of a document.

A table format data processing method in an information processing apparatus according to a fifth aspect of the invention, which is based on the fourth aspect of the invention, wherein the definition support entry information specifying the difference condition is differentiated by identifying certain entry modification information preliminarily assigned to the definition support entry information.

A table format data processing method in an information processing apparatus according to a sixth aspect of the invention, which is based on the fourth aspect of the invention, wherein the definition support entry information specifying the difference condition is differentiated by identifying a certain symbol or a certain graphical characteristic assigned to the definition support entry information.

A table format data processing method in an information processing apparatus according to a seventh aspect of the invention, which is based on the fifth aspect of the invention, wherein the definition support entry information specifying the difference condition is differentiated by identifying the entry modification information same as that differentiating the definition support entry information used for the item definition of the form format A table format data processing method in an information processing apparatus according to an eighth aspect of the invention, which is based on the sixth aspect of the invention, wherein specification of an item name or specification of a data name performed in the specification of the difference condition is performed by using the certain symbol or the certain graphical characteristic used for specification of an item name or specification of a data name used in the item definition of the table format.

A table format data processing method in an information processing apparatus according to a ninth aspect of the present invention a data processing method of a table format in an information processing apparatus, the table format having a composite unit data entry space including a main area that is a first data entry area and a derived area that is a second data entry area as partial areas in a unit data entry space configuring a table format, the method comprising the steps of:

specifying a group of a plurality of the composite unit data entry spaces as one composite field; and collectively performing specification of a field attribute of all the main areas or all the derived areas in the specified composite field for each composite field.

A table format data processing method in an information processing apparatus according to a tenth aspect of the invention, which is based on the ninth aspect of the invention, wherein the field attribute specification performed for each composite field is performed for one main area or one derived area selected from the composite field.

A table format data processing method in an information processing apparatus according to an eleventh aspect the invention is a data processing method of a table format, the table format having a composite unit data entry space comprising a main area that is a first data entry area and a derived area that is a second data entry area as partial areas in a unit data entry space configuring a table format, the method comprising the steps of:

specifying a group of unit data entry spaces as a composite field that is a group of composite unit data entry spaces in the table format;

correlating a plurality of composite unit data entry spaces in the specified composite field with one composite unit data entry space as a calculation result data entry space filled out with a result of calculation of data entered in the plurality of composite unit data entry spaces; and entering data of the calculation result of the main area data or the derived area data of a plurality of the calculation target unit data entry spaces in the main area or the derived area of the composite unit data entry space of the calculation result data entry space.

A table format data processing method in an information processing apparatus according to a twelfth aspect the invention, which is based on the ninth aspect of the invention, wherein this method comprises the step of correlating a plurality of composite unit data entry spaces filled out with calculation target data with one composite unit data entry space as a calculation result data entry space, wherein the field attributes of the main area and the derived area in the specified calculation target composite unit data entry space are applied to the field attributes of the main area and the derived area in the composite unit data entry space of the calculation result data entry space.

A table format data processing method in an information processing apparatus according to a thirteenth aspect of the invention, which is based on the first, ninth and eleventh aspects of the invention, wherein certain symbols entered in the unit data entry space are recognized to identify the range of the derived area located in the unit data entry space.

A table format data processing method in an information processing apparatus according to a fourteenth aspect of the invention, which is based on the thirteenth aspect of the invention, wherein a derived area generating element is certain symbols regulating the range of the derived area and includes a ruled line.

A table format data processing method in an information processing apparatus according to a fifteenth aspect of the invention, which is based on the fourteenth aspect of the invention, wherein the ruled line used as the derived area generating element is identified by identifying a line type or line color of the ruled line.

A table format data processing method in an information processing apparatus according to a sixteenth aspect of the invention, which is based on the first aspect of the invention, comprising the step of identifying the type of the derived area generating element entered in the certain unit data entry space in a certain data field with the derived area defined and the position of the derived area generating element in the unit data entry space, wherein at the time of data output to the certain data field, the derived area generating element is automatically generated and entered in the unit data entry space not filed out with the derived area generating method in the certain data field.

An information processing apparatus according to a seventeenth aspect of the invention is a data processing apparatus of a table format, the table format being in a form of a composite unit data entry space where a data entry space is a constituent unit of a certain data field in a table and includes partial areas, which are a main area that is a first data entry area and a derived area that is a second data entry area, the apparatus comprising:

a means that performs item definition corresponding an item name with each data field in the table;

a means that specifies a difference condition, which is a difference portion specific to a data entry condition of the derived area from a data entry condition of the main area;

a means that identifies from the table format a first record that is a combination of data to be concurrently referenced with the data in the main area or data entry areas of the data to be concurrently referenced with the data in the main area, based on the item name correlated with each data field in the table; and a means that generates a second record that is a combination of data to be concurrently referenced with the data in the derived area or data entry areas of the data to be concurrently referenced with the data in the derived area, based on the specified difference condition and the first record identified from the table format, the information processing apparatus performing data output to the derived area or data input from the derived area in the table format based on the generated second record.

An information processing apparatus according to an eighteenth aspect of the invention is a data processing apparatus of a table format, the table format having a composite unit data entry space comprising a main area that is a first data entry area and a derived area that is a second data entry area as partial areas in a unit data entry space configuring a table format, the apparatus comprising:

a means that specifies a group of a plurality of the composite unit data entry spaces as one composite field; and a means that collectively performs specification of a field attribute of all the main areas or all the derived areas in the specified composite field for each composite field.

An information processing apparatus according to a nineteenth aspect of the invention is a data processing apparatus of a table format, the table format having a composite unit data entry space comprising a main area that is a first data entry area and a derived area that is a second data entry area as partial areas in a unit data entry space configuring a table format, the apparatus comprising:

a means that specifies a group of unit data entry spaces as a composite field that is a group of composite unit data entry spaces in the table format;

a means that correlates a plurality of composite unit data entry spaces in the specified composite field with one composite unit data entry space as a calculation result data entry space filled out with a result of calculation of data entered in the plurality of composite unit data entry spaces; and a means that enters data of the calculation result of the main area data or the derived area data of a plurality of the calculation target unit data entry spaces in the main area or the derived area of the composite unit data entry space of the calculation result data entry space.

An information processing apparatus according to a twentieth aspect of the invention, which is based on the eighteenth aspect of the invention, comprising a means that correlates a plurality of composite unit data entry spaces filled out with calculation target data with one composite unit data entry space as a calculation result data entry space, wherein the field attributes of the main area and the derived area in the specified calculation target composite unit data entry space are applied to the field attributes of the main area and the derived area in the composite unit data entry space of the calculation result data entry space.

As described above, according to the present invention, even in the case of a complicated form format that is disposed with a second entry area, i.e., derived area in addition to an original data entry area, i.e., main area in one cell, form definition can be acquired to perform automatic data input/output by only performing a specifying operation of a simple difference condition in addition to the same item defining operation as the operation performed for a simple normal form format.

According to the present invention, in a composite form format that is disposed with a second entry area, i.e., derived area in addition to an original data entry area, i.e., main area in one cell, different field attributes can be given to the main area and the derived area with an effortless operation mainly including an operation of specifying serial composite fields together, and therefore, in a composite form format including a large number of cells, field attribution specification can be performed freely with a simple operation at the same level as the field attribution specifying operation in a normal simple form format.

According to the present invention, in a composite form format that is disposed with the derived area in one cell, table calculation can be performed with an effortless operation mainly including an operation of specifying serial composite fields together without the need of selecting one by one a plurality of calculation target data that is not arranged serially in many case, and therefore, in a composite form format, a calculation for a large quantities of data can be performed with a simple operation at the same level as a normal simple form format.

According to the present invention, in a composite form format that is disposed with the derived area in one cell, the input/output definition of a form, field attribute specification, and table calculation function can be performed with additional entry of strings that can understood by anyone and additional entry of predetermined definition support information including familiar characters, symbols, and graphics, and the definition content of the additional entry has a high degree of visibility, which may be understood by anyone obviously at a glance.

According to the present invention, in a composite form format that is disposed with the derived area in one cell, the input/output definition of a form, field attribute specification, and table calculation function can be performed with additional entry of a small number of characters, symbols, and graphics and therefore can be performed with an efficient operation with few errors.

BRIEF DESCRIPTION OF THE DRAWINGS

FIG. 5 is a diagram of a "definition element/entry information reference table" in the system of the embodiment.

FIG. 9 is a diagram of a first form format in the system of the embodiment.

FIG. 10 is a diagram of a data output example for the form format of FIG. 9 in the system of the embodiment.

FIG. 25 is a diagram of a data format of "item definition data" in the system of the embodiment.

FIG. 26 is a diagram of an example of terms included in an application term dictionary in the system of the embodiment.

FIG. 31 is a diagram of a derived area allocation direction in a cell in the system of the embodiment.

FIG. 32 is a diagram of a derived area entry range in the system of the embodiment.

FIG. 37 is a diagram of a configuration example of an output source file in the system of the embodiment.

FIG. 42 is a diagram of an image of a "tabulation management table" in the system of the embodiment.

FIG. 44 is a diagram of an example of a second form format in the system of the embodiment.

FIG. 45 is a diagram of an example of additionally entering definition support entry information in the form format of FIG. 44 in the system of the embodiment.

FIG. 47 is a diagram of a second data output example for the form format of FIG. 9 in the system of the embodiment.

FIG. 48 is a diagram of a second data output example for the form format of FIG. 46 in the system of the embodiment.

FIG. 49 is a diagram of an example that data are entered in the form format of FIG. 9 except total data in the system of the embodiment.

DETAILED DESCRIPTION OF THE INVENTION

Embodiments of the present invention will now be described with reference to the accompanying drawings.

Figure 1:
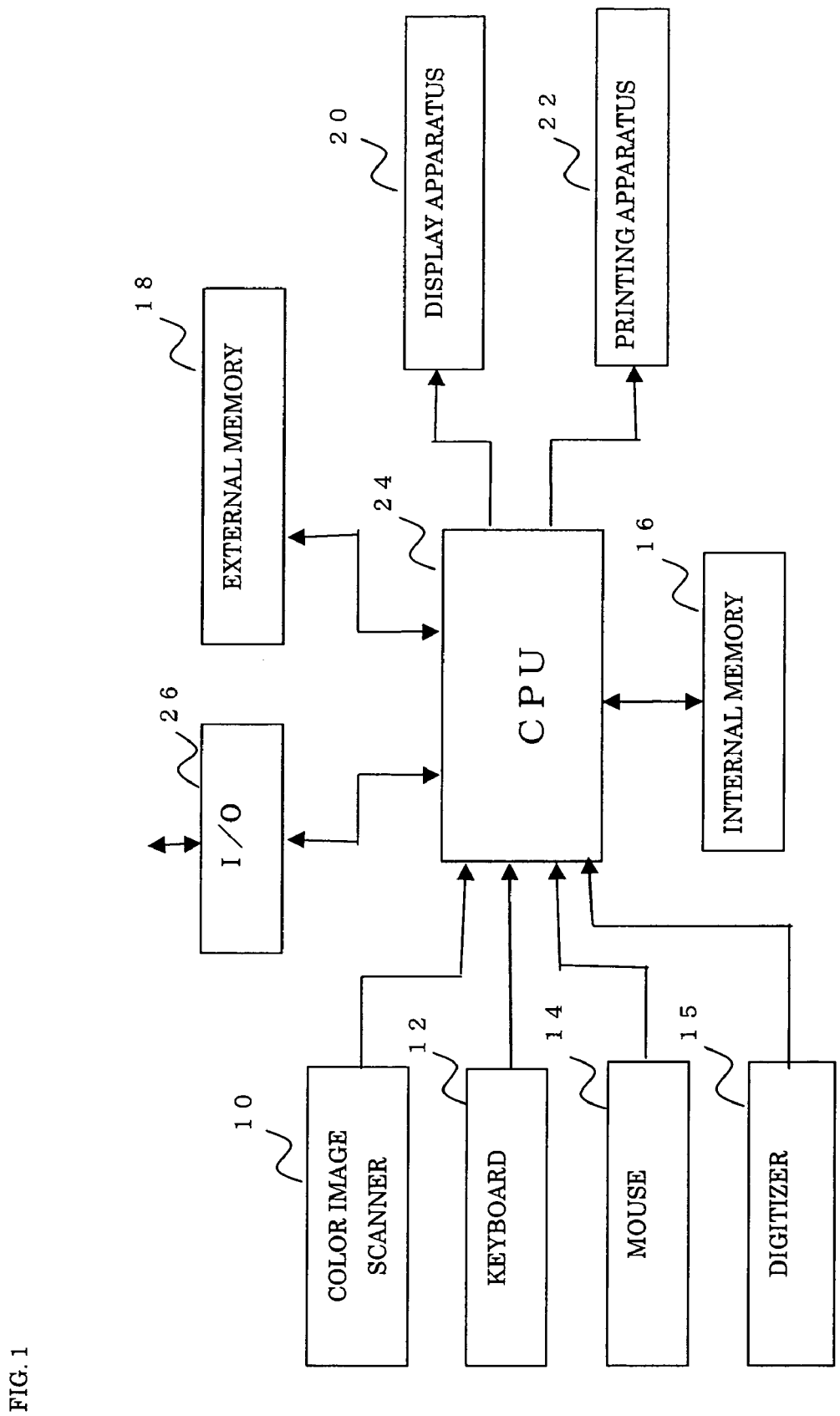
FIG. 1 is a block diagram of a system configuration example of hardware of an information processing apparatus according to an embodiment of the present invention.

FIG. 1 shows a system configuration of hardware of an information processing apparatus according to an embodiment of the present invention. This system includes input apparatuses that are a color image scanner 10, a keyboard 12, a mouse 14, and a digitizer, storing apparatuses that are an internal memory 16 and an external memory 18, and output apparatuses that are a display apparatus 20 and a printing apparatus 22, all of which are connected to a CPU 24 through suitable interface circuits (not shown). The CPU 24 is also connected to a telephone line or a communication line 27 through a communicating apparatus 26.

The color image scanner 10 reads color image information of characters, symbols, and graphics of a document written on a sheet. The internal memory 16 and the external memory 18 store various programs prescribing process and control operations of the CPU 24 as well as various electronic dictionaries, character fonts, files, etc. The communication apparatus 26 includes a facsimile communication function.

Figure 2:
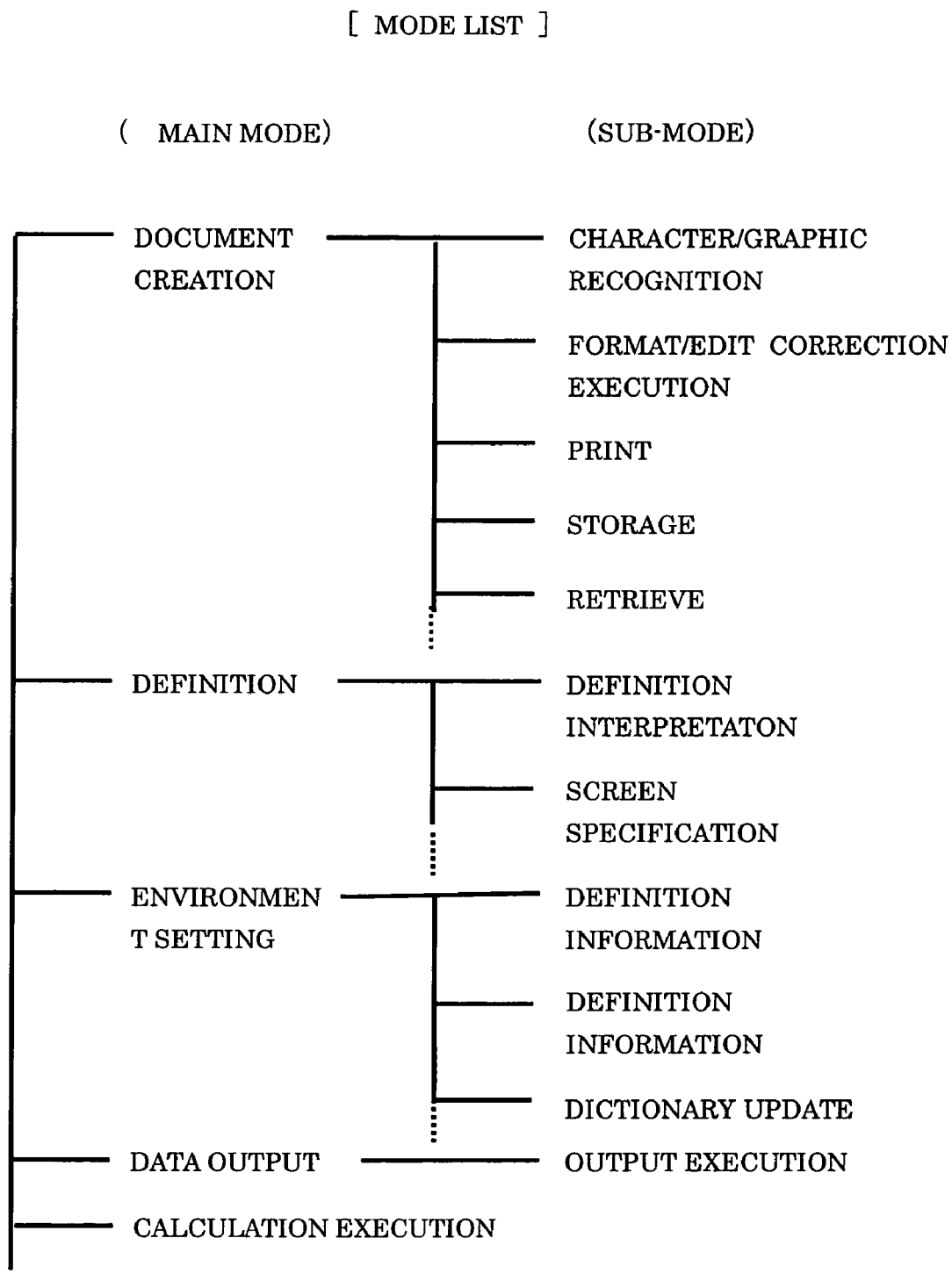
FIG. 2 is a diagram of a list of main modes in the system of the embodiment.

FIG. 2 shows a list of operation modes relating to form creation in the system of the embodiment. Main modes such as "document creation", "definition", and "environment setting" are set and each main mode branches into sub-modes such as "fetch" . . . , "definition interpretation" . . . , and "definition information setting".

Figure 3:
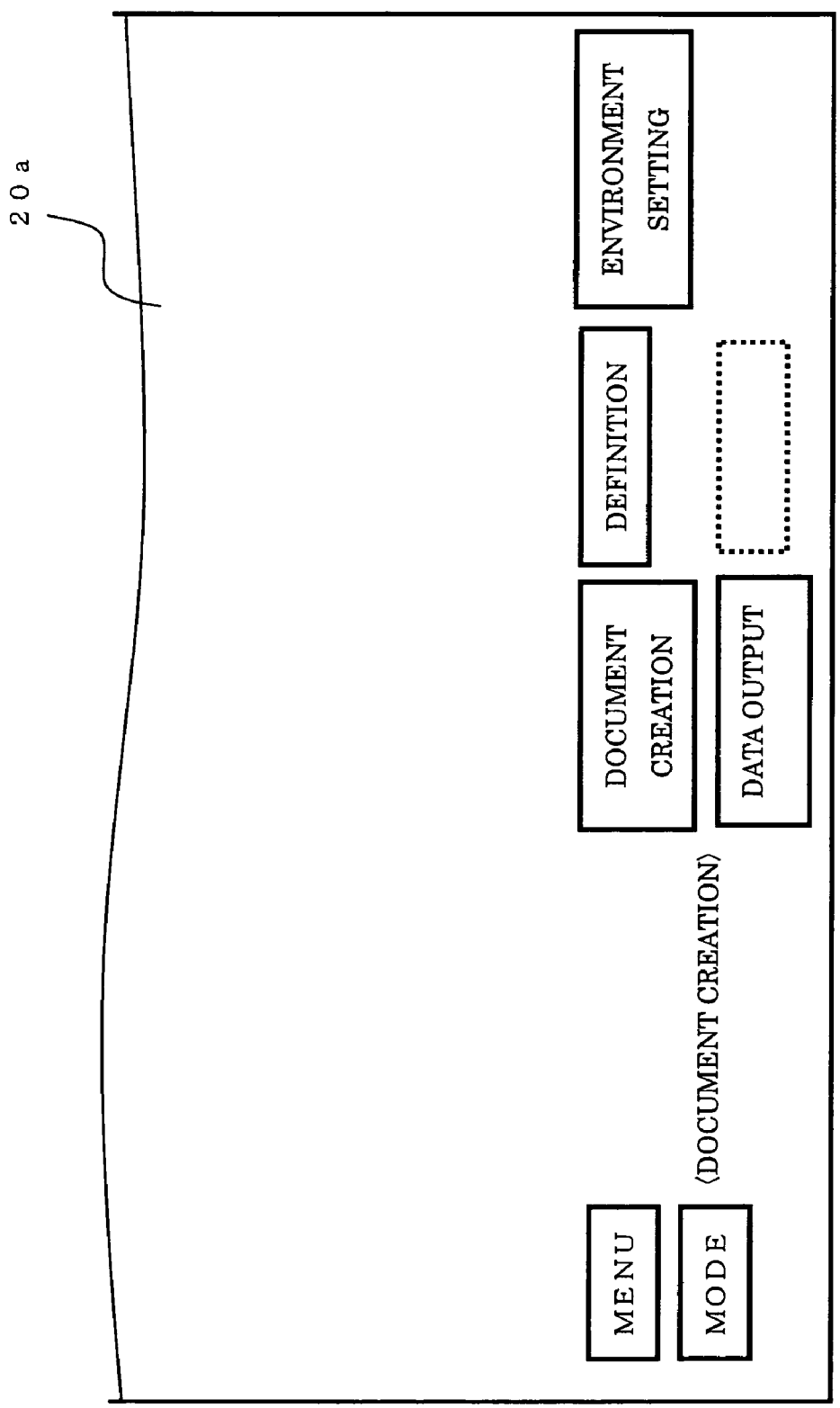
FIG. 3 is a diagram of a "main mode list menu screen" in the system of the embodiment.

FIG. 3 shows a "main mode list menu" displayed on a display screen 20a of the display apparatus 20. When selecting a "mode" button displayed always on the lower left corner of the display screen 20a, the "main mode list menu" appears on the screen to display main mode selection button such as "document creation", "definition", and "environment setting" on the lower left portion of the screen.

Figure 4:
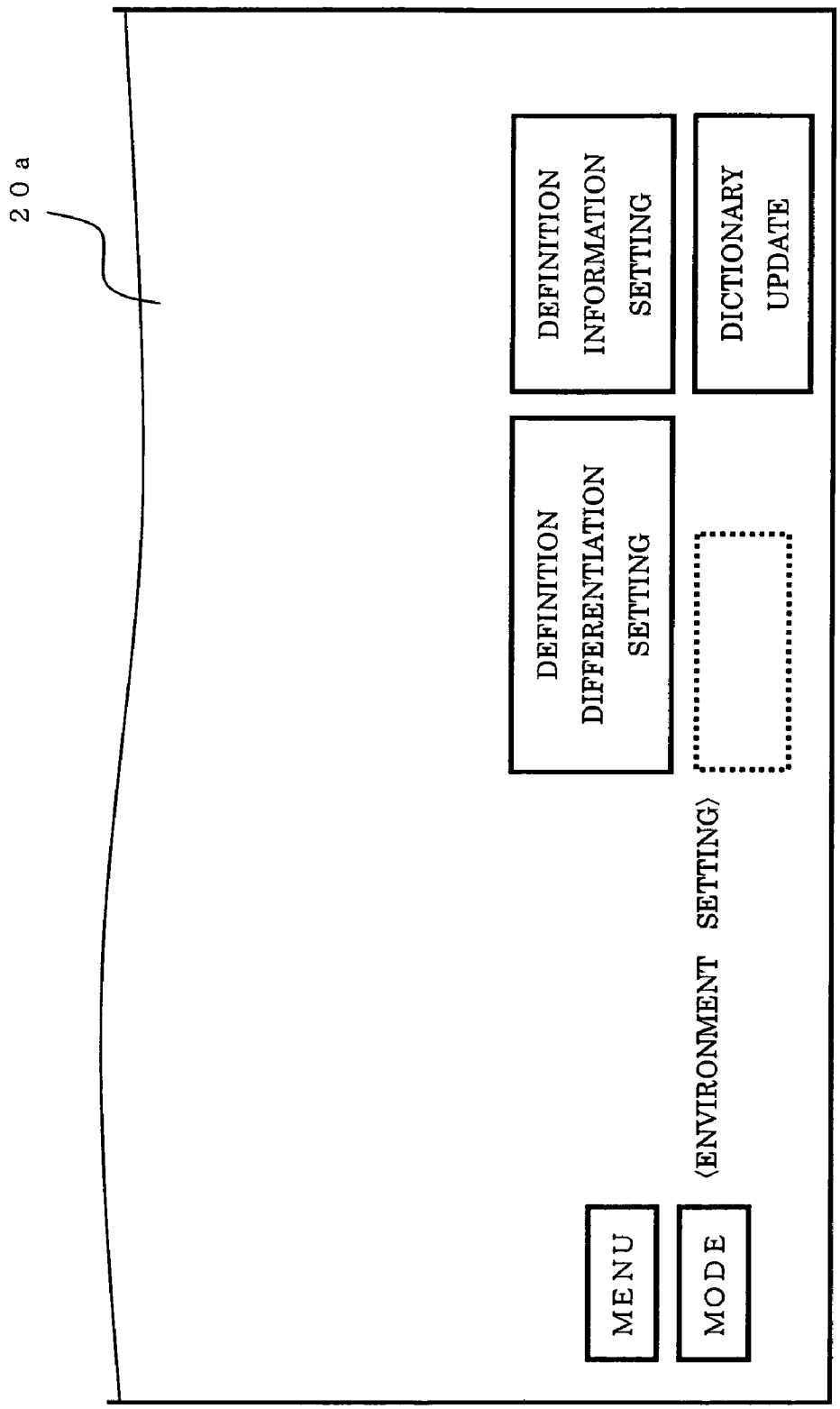
FIG. 4 is a diagram of an "environment setting mode screen" in the system of the embodiment.

When clicking the "environment setting" button in the above "main mode list menu", the environment setting mode is selected. When switching to this environment setting mode, a screen as shown in FIG. 4 appears on the display screen 20a to display sub-mode selection buttons such as "definition differentiation setting" and "definition information setting" on the lower left portion of the screen. When clicking the "definition information setting" button, the system enters into a definition information setting mode, and a "definition element/entry information reference table" screen as shown in FIG. 5 is displayed.

In FIG. 5, a plurality of definition systems such as "common" and "form definition" is prepared in this embodiment, and a plurality of definition elements is set in each definition system. Among these elements, the definition elements of the "form definition" system are used to set a format for managing data on a form, and the definition elements of the "common" system are also used for definition in other definition systems.

As shown in FIG. 5, each definition element is correlated with one or a plurality of types of predetermined characters (strings), symbols, or graphics. A definition element may represent intended definition contents only with entry information as in the case of "rounding up" corresponding to a definition element "rounding", and another definition element may act as constituents of the definition contents to specify other entry information on a document as in the case of "< >" corresponding to a definition element "item name". Yet another definition element may instruct that definition contents of characters, symbols, etc., specified by the definition element should be interpreted by reference to an application term dictionary, as in the case of "○" corresponding to a definition element "registered term specification".

The above correlation between definition elements and entry information may be prepared originally in the system or may be set and registered as needed by a user using screen input. In any case, a data format shown in FIG. 6 sets the definition element identification data with a variable data length corresponding to the reference table of FIG. 5 for each definition element. The definition element identification data are retained in a definition element identification data storing unit 48 (FIG. 21) of a definition information recognizing unit described later.

Figure 6:
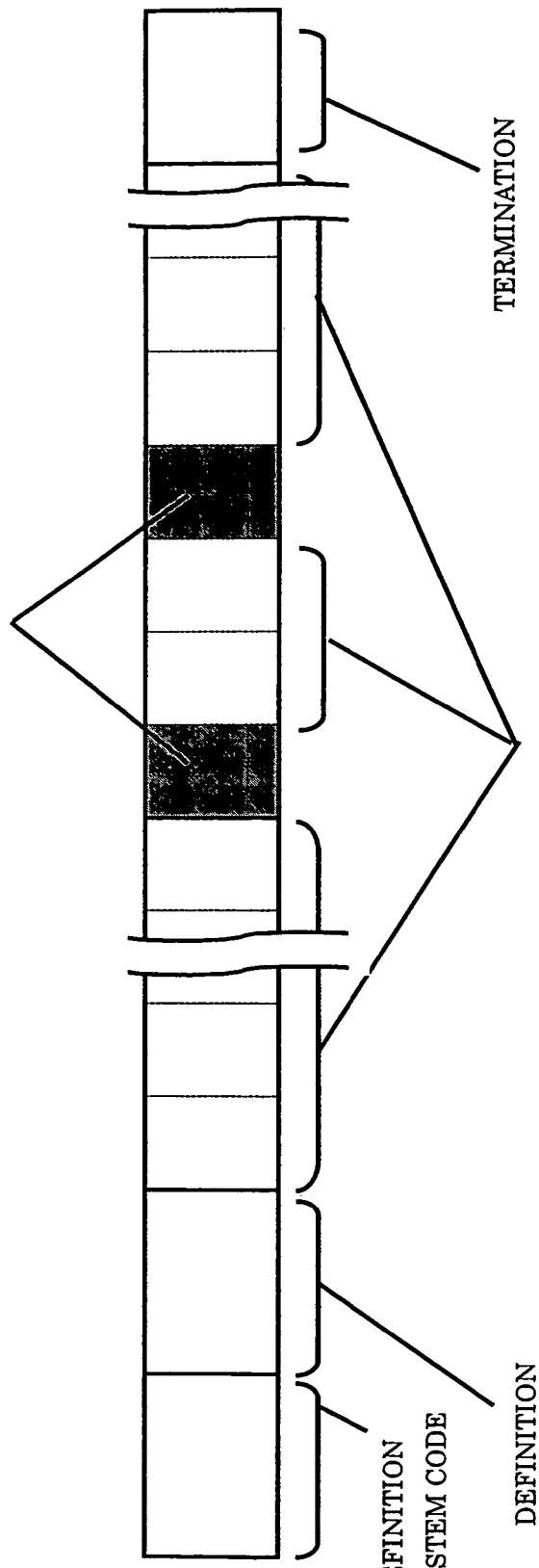
FIG. 6 is a diagram of a data format example of a "definition element identification data" in the system of the embodiment.

In the data format of the "definition element identification data" of FIG. 6, a code of a definition system (form definition) including a relevant definition element (e.g., "rounding up") is set in a data field of "definition system code"; a code of the relevant definition element (rounding up) is set in a data field of "definition element type"; a code of strings (rounding up, round up, . . . ) corresponding to the relevant definition element (rounding up) is set in each data field of "constituent string/symbol sequence" between predetermined delimiter identification data; and a predetermined termination identification data are added at an end field to indicate termination of the data.

As described above, the definition elements for various definitions on a document are correlated with characters, symbols, or graphics that can be used as normal entry information representing normal document contents in the embodiment. However, as described later, when used as the definition element, special modification information (e.g., color information) is added to the entry information to differentiate the information from the normal entry information representing document contents. That is, a user can use routinely-used familiar entry information not only as the normal entry information representing document contents directly but also as the definition information for indicating definition contents by adding the special modification information.

Figure 7:
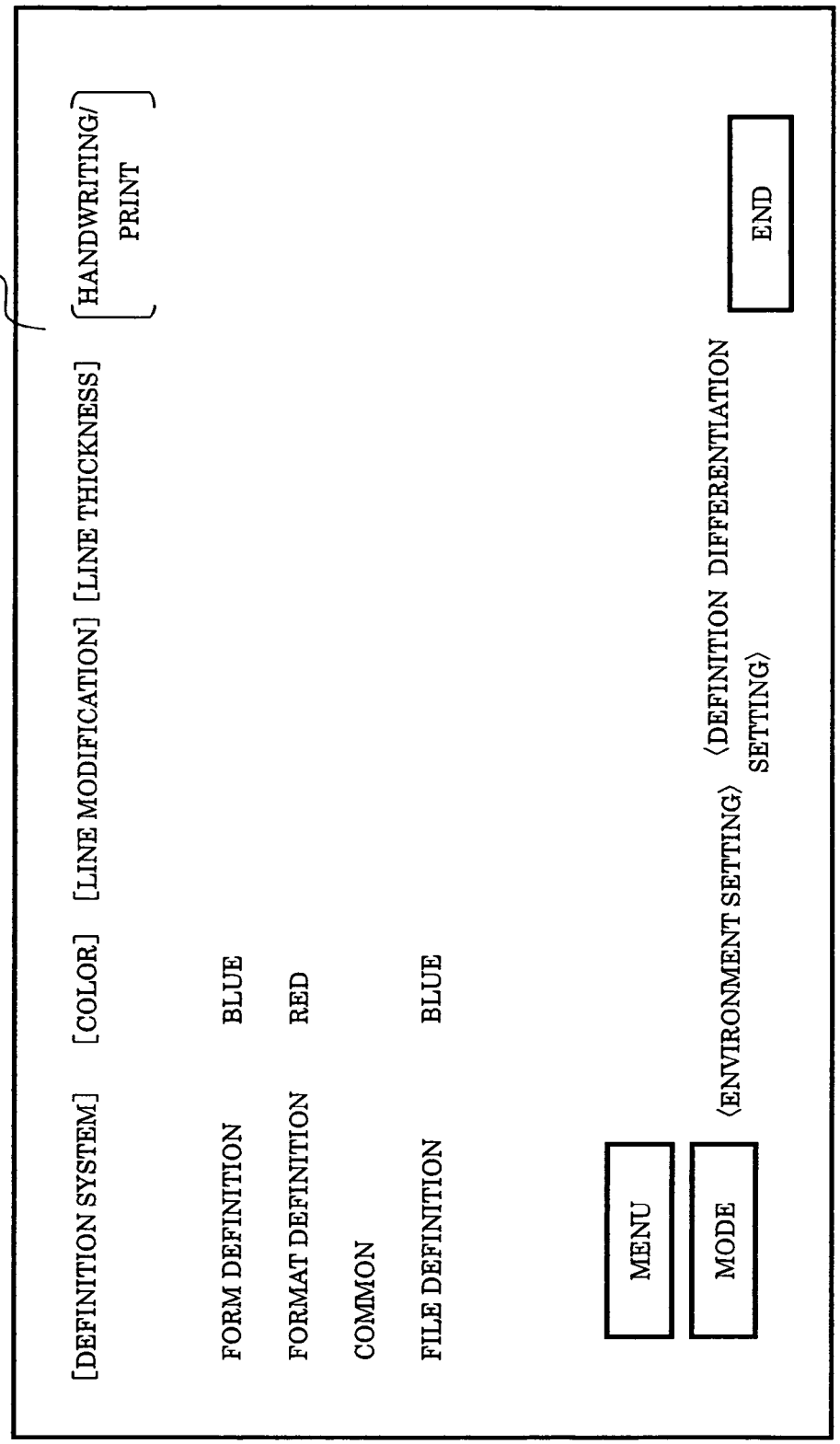
FIG. 7 is a diagram of a "definition information differentiation instructing screen" in the system of the embodiment.

When selecting a "definition differentiation setting" sub-mode selection button in the "environment setting mode screen" of FIG. 4, a "definition information differentiation instructing screen" shown in FIG. 7 appears on the display screen 20a.

In FIG. 7, the definition systems such as "form definition" are listed in a [definition system] space. A user may input modification information or identification information of [color], [line modification], [line thickness], and [handwriting/print] used for the entry information of the definition systems at each position.

In the example of FIG. 7, for example, (blue) is input into a [color] space for the definition system of "form definition", and (red) is specified for the definition system of "form definition". Since the definition elements of "common" are shared by all the definition systems, modification information does not have to be set specific to the "common".

Figure 8:
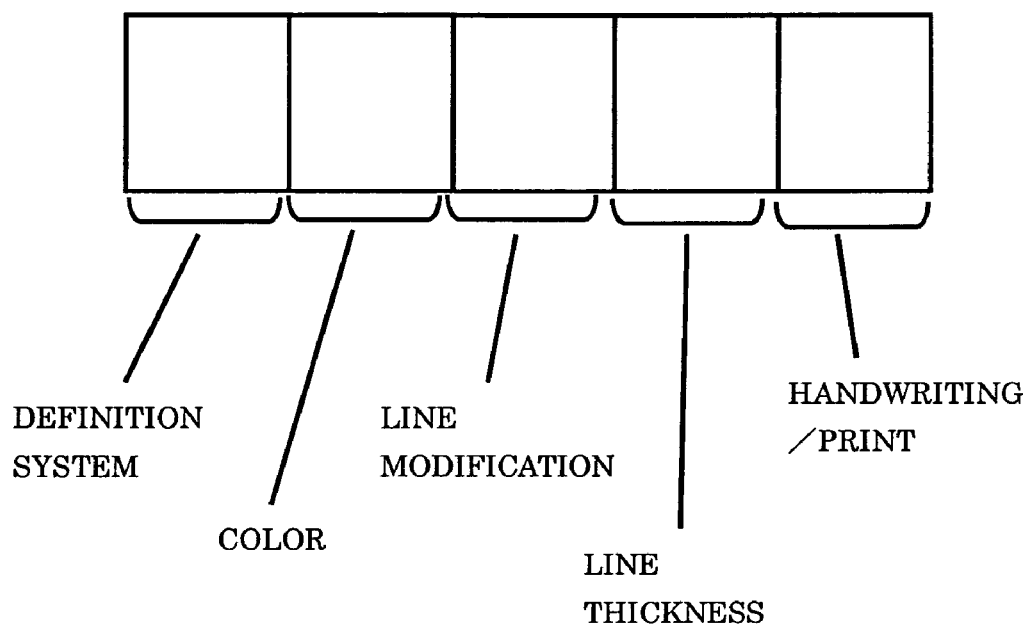
FIG. 8 is a diagram of a data format example of a "definition information differentiation data" in the system of the embodiment.

After the above specification, when the "end" button is specified on the "definition information differentiation instructing screen", definition information differentiation data are set for the definition systems, for example, in a data format shown in FIG. 8 in the system in accordance with the above input operation for instructing the definition information differentiation. The definition information differentiation data are retained in a definition information differentiation data storing unit 50 (FIG. 21) of the definition information recognizing unit described later.

Description will be made of an example of performing tabulation output to a summary table created freely on a sheet by a user with the use of the system.

For example, in a usage example to be described, a user has a table format shown in FIG. 9 as a sheet and wants to acquire data tabulation output shown in FIG. 10.

In a table of FIG. 9, data entry spaces of an item name "branch" are disposed in the uppermost row, and data entry spaces of an item name "sales" are disposed in a cell matrix from a second row to a fourth row from the top, to a second column to a fourth column from the left in the table. In the upper right portion outside of the table, a data name "2001" of an item name "year" is entered as a common entry condition of the data entry spaces in the table.

Total spaces are disposed in the lowermost row in the table to enter total values of the data of the item name "sales" of the same columns, and total spaces are disposed in the rightmost column in the table to enter total values of the data of the item name "sales" of the same rows.

A user perceives the above details from the entry contents in the table on the premise of some kind of dictionary describing correlation between each item name and a data name (e.g., product name master file). For example, the user perceives the item name "branch" from an entry data line of "Tokyo", "Osaka", and "Nagoya", and perceives the item name "product" from an entry data line of "Television", "Radio", "Car Navigation System" with the aid of a heading word "product name" entered at the adjacent upper position. The user perceives the correlation of the item name "sales" with the data entry spaces (fields) from the title of the table.

In the target table format of the data output result (FIG. 10), another data entry area is disposed in each cell configuring the data entry space (field) of the item name "sales" with the use of an additional symbol "[ ]". While data of a year "2001" are entered in the original entry area of the data entry space (field), data of a "previous year", i.e., "2000" are entered in the newly disposed entry area.

That is, although data entry conditions entered in the table is the same for two entry areas disposed in shaded areas of the data entry spaces (fields) of the item name "sales" in FIG. 40 described later (the "branch" is "Osaka" and the "product" is "radio"), since data of the common entry condition "year" on the outside of the table are "2001" for the original entry area and "2000" for the newly disposed entry area, the data are tabulated under different conditions.

The user perceives the above separation of the entry in the data entry space (field) of the item name "sales" from a comment "[ ] indicates sales of year 2000", which is entered under the title of the table.

If another entry area is disposed in a constituent cell of a data entry space (field) and data entered in the area has an entry condition different from an entry condition of the original entry area, the entry area newly disposed in the cell is referred to as a "derived area"; the entry area of the data with the original entry condition is referred to as a "main area"; and the different condition specified to the "derived area" is referred to as a "difference condition" in this description. In this example, the "difference condition" is that "the data name of the item name 'year' is '2000'".

An entry element is referred to as a "derived area generating element", which is entered in a cell to indicate that the "derived area" is disposed in the element, such as a symbol "[ ]" in this example.

A cell disposed with the new entry area, i.e., "derived area" is referred to as a "composite cell". A cell with only one piece of entered data is referred to as a "normal cell".

Figure 11:
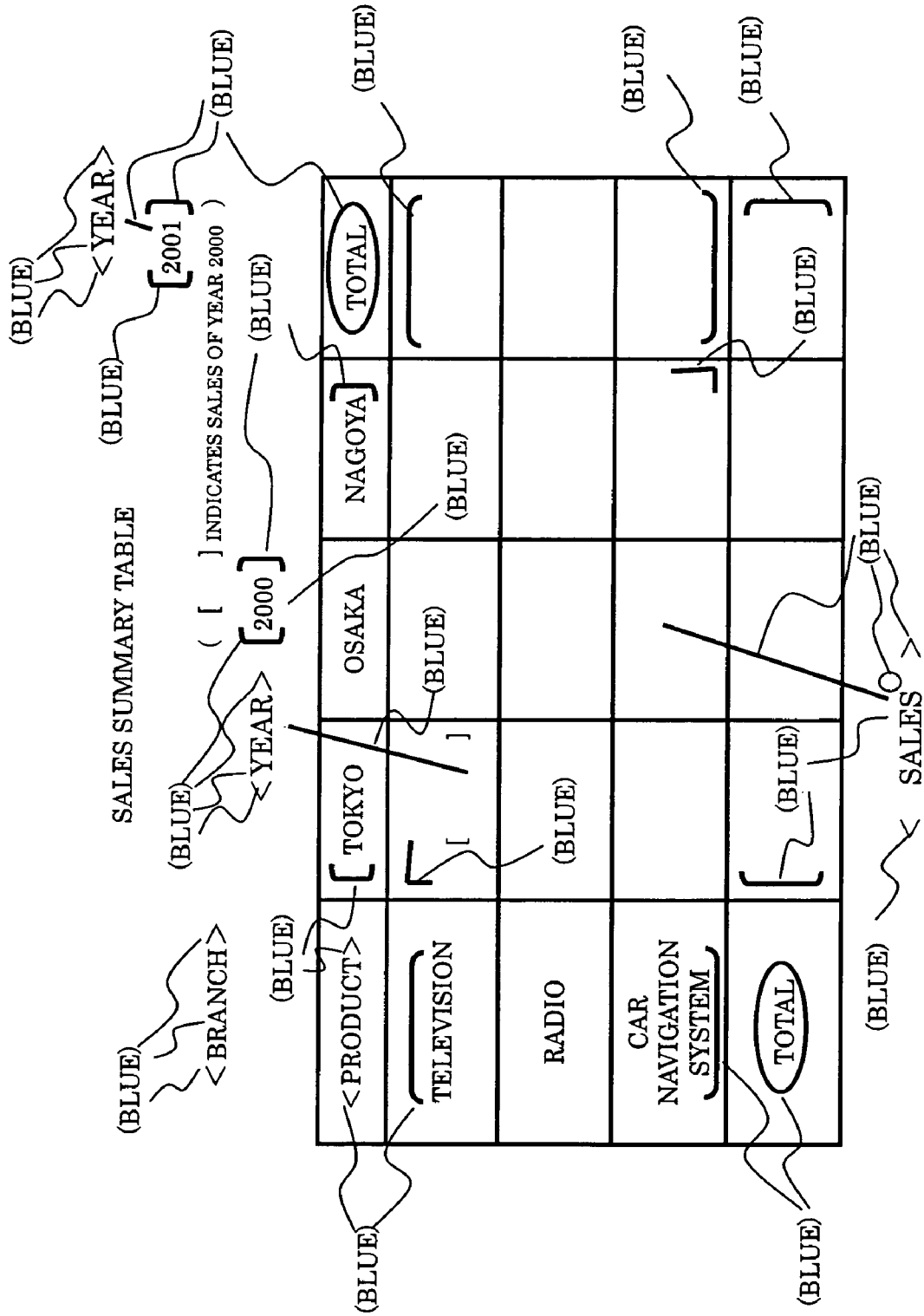
FIG. 11 is a diagram of an example of additionally entering definition support entry information in the form format of FIG. 9 in the system of the embodiment.

In the system of the embodiment, a "definition" operation shown in FIG. 11 is performed to allow the system to recognize the definition contents without ambiguity in a formulaic manner exactly as recognized by the user as above. The "definition" operation is performed by additionally enter definition support entry information that may be differentiated from normal entry information, which is original entry contents of the summary table. In this example, the definition support entry information are differentiated from the normal entry information by using a (blue) color assigned in the definition system of the "form definition" as shown in FIG. 7 to enter the information.

In the basic "definition" in the summary table format, "item definition" is performed to correlate all the data fields and data names in the summary table format with the item names. With regard to the item names (called "corresponding item names" in this description) used in the "item definition", since it is the spirit of the present invention to use those written freely on a sheet by a user as much as possible, if item names entered as heading wards exit originally in the summary table format, the item names are used directly.

First, "field specification" definition element symbols " " or "[ ]" are used for each group (cell sequence) of adjacent cells having the same corresponding item name to specify a data field. That is, constituent symbols " " and " " or "[" and "]" of the "field specification" definition element symbols " " or "[ ]" are entered in cells at the both ends of the cell sequence.

If a data name is not entered in a cell as in the case of "2001" of the example, the "field specification" definition element symbols "[ ]" are entered at the both sides of the data name string.

If an adjacent heading word is originally entered on the upper side or left side of the data field, the word is specified as the corresponding item name correlated with the data field. The specification of the item name is performed by additionally entering constituent symbols "<" and ">" of definition element symbols "< >" at the both sides of the relevant string. In this example, a heading word "product" is defined as the corresponding item name of the adjacent lower data field with this specifying method.

If the corresponding item name is not entered as the heading word of the original entry contents, i.e., normal entry information, the relevant name is entered in a blank near the relevant data field, is specified as the item name, and is linked to the relevant data field with the use of a linking line "-" of the definition elements. In this example, the item names of "branch" and "year" are correlated with the relevant data fields or data names in this method.

In the case of the data field including the composite cells (hereinafter, "composite field"), the field range is specified by the same method as the normal data field. In this example, with regard to the data field of the item name "sales", the constituent symbols " " and " " of the "field specification" definition element symbols are entered in the upper left cell and the lower right cell (" " is used because a matrix of cells is used in this field).

The relevant item name "sales" is entered as the (blue) color definition support entry information at a blank portion on the outside of the table; the above "item name specification" is added; and the linking line "-" is pulled out to an arbitrary position of the relevant data field.

To specify that a "tabulation category" of the item name "sales" is a "tabulation item", a "○" symbol of the definition element "tabulation category specification" is additionally entered in (blue) color at the right shoulder portion of the item name "sales" string. If the table format includes numeric data that are not tabulated such as an item name "unit price" in the table format, a definition element symbol indicating "non-tabulation numeric data" may be established and may be added to the right shoulder portion of the relevant item name string.

The illustrative symbol "[ ]" of the "derived area generation element" is additionally entered in an arbitrary cell of this data field. For example, the symbol is entered in only a cell at the upper left corner of this data field. The comment of "data in [ ] are those of year 2000" is entered at an appropriate position on the outside of the table such that anyone can understand the current definition of the "derived area". Although this entry is an additional entry, the entry is the normal entry information output in the target output table (FIG. 10) and is entered in (black) color, which is the output color.

A user can specify field attributes of the main areas and derived areas. If the user wants to specify the field attribute of the main area in the composite field, the user may use the definition support entry information to pull out the linking line from an arbitrary main area in the relevant composite field and may enter a certain term that represents the field attribute registered as a definition element. If the user wants to specify the field attribute of the derived area in the composite field, the user may pull out the linking line from an arbitrary derived area in the relevant composite field and may enter a certain term that represents the field attribute similarly.

If the field attribute is specified only for the main areas in the relevant data field because of a rule of the user operation, it is considered that the field attribute of the derived area is the same as the field attribute of the main area. If the field attribute is specified only for the derived areas in the relevant data field, the field attribute of the main area is determined in accordance with a predetermined default attribute.

The field attribute of the main area or derived area in the composite area includes, for example, a "number of significant digits", "rounding method", and layout format (centering, right-aligned, etc.) of the data digit sequence entered in the area as is the case with the normal data field. A surface attribute may also be included such as color of a region occupied by the derived area.

A string indicating the "difference condition" is entered in the following predetermined style. In this example, the specification of the item name and data name is performed for strings representing the item name "year" and the data name "2000", and a pair string "<year>[2000]" is entered in an appropriate blank portion outside the table. The string is entered as the (blue) colored definition support entry information and is linked to the composite field of the relevant item name "sales" with the linking line "-".

Finally, "total fields" are specified in the lowermost row and the rightmost column of the table. The "field specification" definition element symbols "[ ]" are used to specify the cell sequences of the total space in which the total value of the data fields are entered, as is the case with the above specification of the data field. That is, the constituent symbols "[" and "]" of the "field specification" definition element symbols "[ ]" are entered in the total space cells at the both ends of each "total field".

The cell at the lower right corner of the table may be included in the "total field" defined in the lowermost row or may be included in the "total field" defined in the rightmost column.

Since the data of the item name "sales" are tabulated in the cells of the two total fields specified in the lowermost row and the rightmost column of the table in this example, the cells are composite cells having the same "difference condition" and "derived areas" as the data field of the item name "sales". However, the data field range thereof may be specified as is the case with the normal total field.

With regard to characters "total" entered as the original entry contents, i.e., normal entry information of the document in the cell adjacent to the left end of the total field in the lowermost row and the cell adjacent to the upper end of the total field in the rightmost column, after it is checked that the characters "total" are a "total space specification word" of "calculation result specification" registered in an application term dictionary 52, the characters "total" are circled with a "registered word specification" definition element symbol "○".

If a string of a term such as "average" or "variance" instructing calculation is entered at the position of the characters "total" in the table format shown in FIG. 9, similarly, after it is checked that the string is a "registered word" of the "calculation result specification" in the application term dictionary 52, the string may be circled with the "registered word specification" definition element symbol "○".

In this system, user registers certain terms routinely used (as normal entry information) in the application term dictionary 52 (FIG. 26 described later) and circles the terms with the "registered word specification" definition element symbol "○" to convert the terms to the definition information having certain meaning in accordance with the routinely used meaning.

The characters "total" circled with the "registered word specification" definition element symbol "○" is integrated with the field specified by the adjacent definition element "[ ]" and configures one piece of definition information from the standpoint of data management to define that a total value of numeric data entered in other certain field should be entered in each space (cell) in the total field specified by the definition element "[ ]".

When the term such as "average" or "variance" instructing calculation is circled with the "registered word specification" definition element symbol "○", the term defines that a result value of the relevant calculation for numeric data entered in other certain field should be entered in each space (cell) in the field specified by the adjacent definition element "[ ]".

In this description, the certain field storing the calculation target data is referred to as a "calculation target field". The space for entering a calculation result such as the total space cell is generally referred to as a "calculation result data entry space" or "calculation result space". In this example, a "calculation target field" of one total space cell is established in an upper direction perpendicular to or a leftward direction perpendicular to the total field including the total space cell and is a group of cells belonging to the data field of the item name "sales". For example, the "calculation target field" of the total space cell in a second column from the left of the lowermost row is the data field portion of the item name "sales" defined in the upper vertical direction of the same column.

Description will then be made of functions for inputting to this system a table format entry sheet "defined" by additionally entering the above definition support entry information to acquire desired data output.

Figure 12:
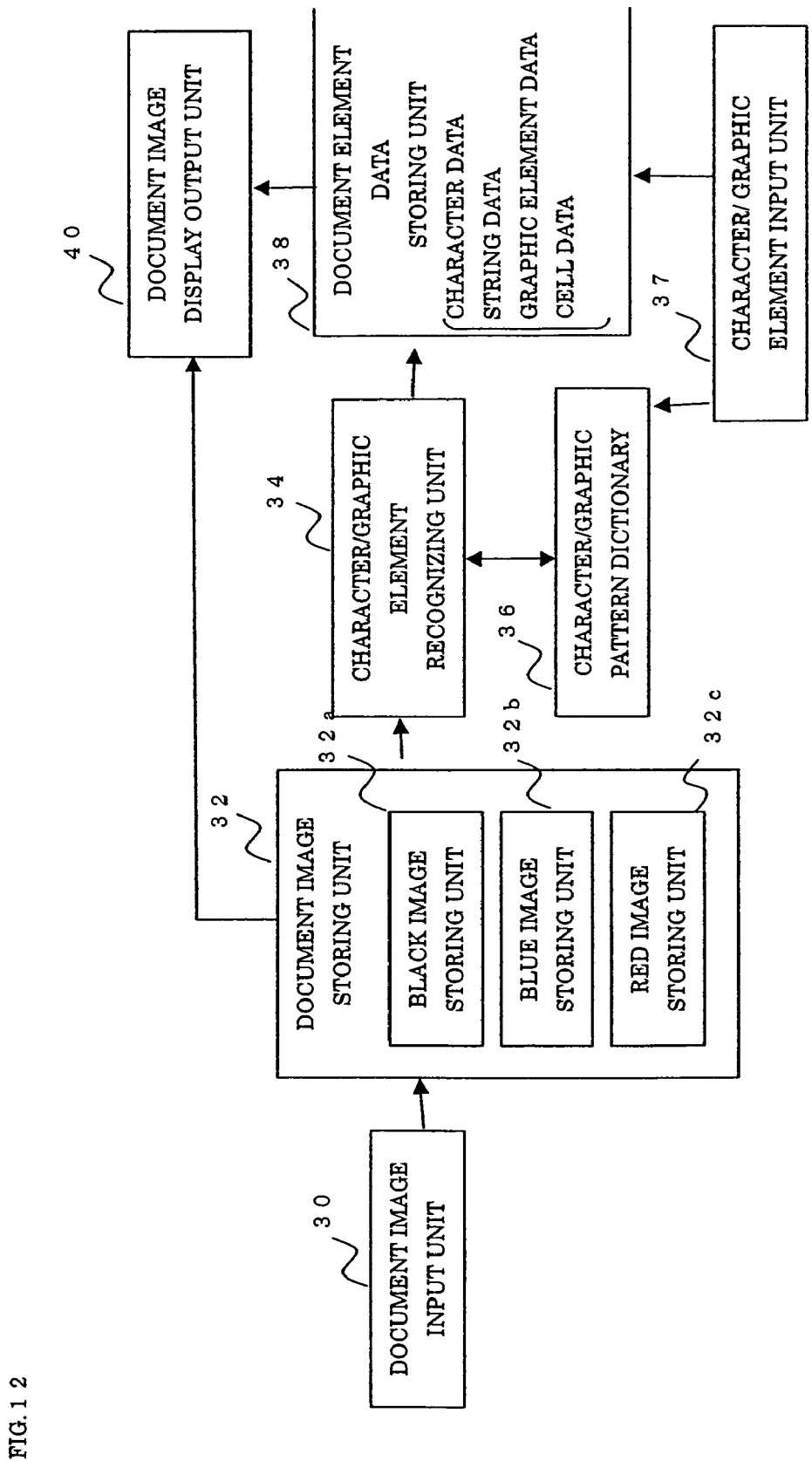
FIG. 12 is a block diagram of a configuration of a document input and document element data generating unit in the system of the embodiment.

FIG. 12 shows a configuration of a document input and document element data generating unit in the system of the embodiment. A document image input unit includes input apparatuses such as the color image scanner 10, the keyboard 12, and the mouse 14, the CPU that executes an input routine, and the internal memory 16 and the external memory 18 that temporarily captures an input color image.

A document image storing unit 32, a character/graphic pattern dictionary 36, and a document element data storing unit 38 use storage areas in the internal memory 16 and the external memory 18.

A character/graphic element recognizing unit is configured by the CPU 24 that executes a character/graphic element recognition processing program.

A document image output unit 40 mainly includes the CPU 24 that executes a display control program, and the display apparatus 20 that displays and outputs a document image or communicating apparatus 26 that transmits and outputs a document image under the control of the CPU 24.

A user sets a form sheet on the color image scanner 10, selects the "document creation" mode on the display screen 20*a*, and clicks the "character/graphic recognition" button.

In response to this click operation, the image scanner 10 performs a reading operation to capture the color image signals representing an image (all entry contents) of a form document shown in FIG. 11 into the image storing unit of the input unit 30. The color image signals captured in the input unit 30 are divided into (black), (blue), and (red) color image signals in the form of signals, and the document image storing unit 32 accumulates the (black) signals, the (blue) image signals, and the (red) image signals in a black image storing unit 32*a*, a blue image storing unit 32*b*, and a red image storing unit 32*c*, respectively.

The character/graphic element recognizing unit 34 recognizes individual characters and graphic elements for each color (black, blue, red) from the pixel data of each document accumulated in the document image storing unit 32. The graphic elements are simple patterned graphics having shapes that may easily be recognized as images, such as a line segment, rectangle, and circle.

Figure 13:
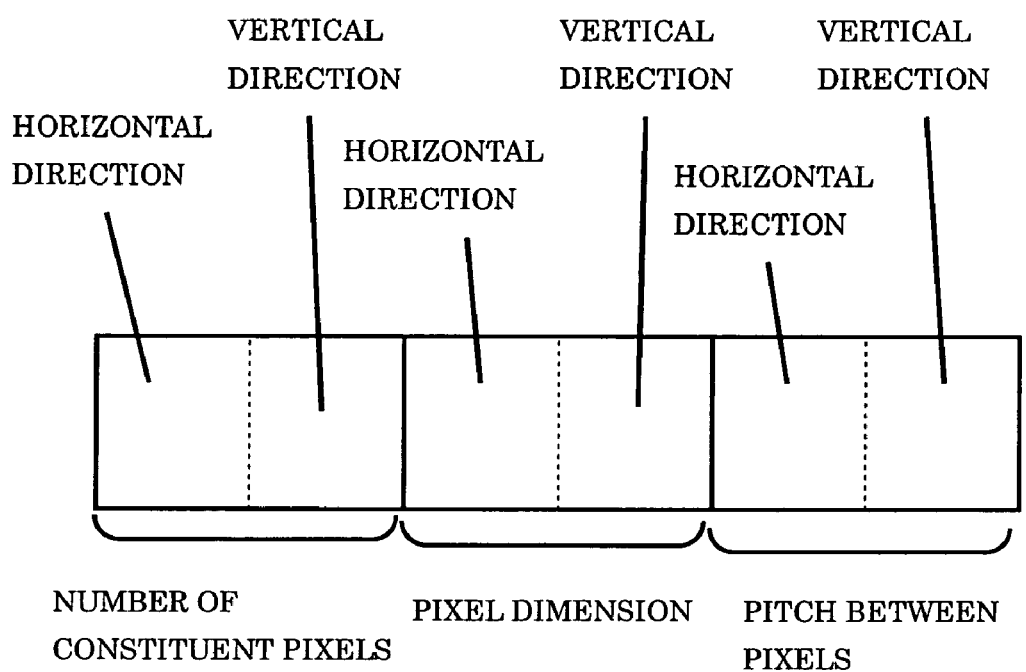
FIG. 13 is a diagram of a data format example of "image management data" in the system of the embodiment.
Figure 14:
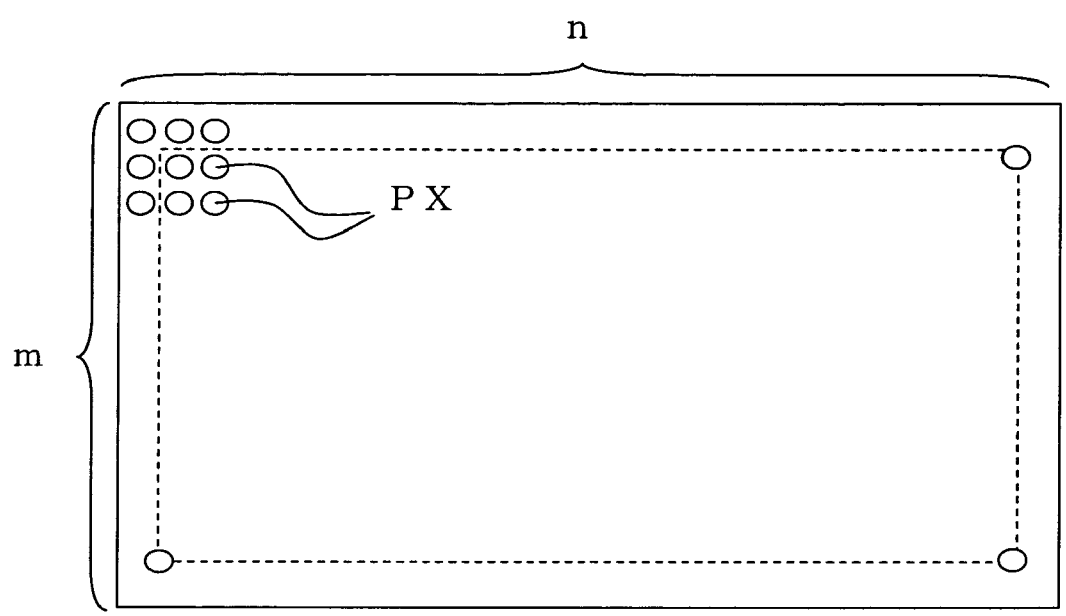
FIG. 14 is a diagram of a configuration of a target input image of the "image management data" in the system of the embodiment.

At the time of the image recognition in the embodiment, for example, "image management data" is referenced that is preliminarily set to a data format shown in FIG. 13. In the "image management data", data representing the number, dimension, pitch, etc., of pixels PX are set on the premise that an input image consists of a multiplicity of the pixels PX arranged on a matrix as shown in FIG. 14.

The character/graphic recognition in the character/graphic element recognizing unit 34 is basically performed by recognizing line elements configuring individual characters and graphic elements. Conventionally known various method may be used to identify the line elements. For example, a group of dots with a certain color is first detected, and the adjacent area or circumference thereof is searched to determine the direction that the group of dots is extended to. This process is repeated to track the trajectory depicted by the dot group until the dot group disappears (terminates). If the trajectory abruptly changes at a certain position along the way, the position is identified as a bending point or cusp.

The line element extracted in this way may be identified as one of preset line element patterns from the shape and size thereof. In this embodiment, the character/graphic pattern dictionary 36 preliminarily stores (sets and registers) categories of constituent line elements and significant positional relationships between the constituent line elements for each character and graphic in a predetermined electronic dictionary mode. The character/graphic element recognizing unit 34 repeats a process of combining the adjacent line elements extracted as above with each other and checking line elements against the character/graphic pattern dictionary 36 to recognize individual character, symbol, and graphic.

For example, the following recognition process is performed for a ruled line configuring a table such as a form. That is, if a line element extracted as a straight line in the above line element recognition is so much longer than other line elements and the rectilinear direction thereof has an inclination within a certain angle relative to the horizontal line (X-axis) or the vertical line (Y-axis), this straight line is considered as a horizontal ruled line or vertical ruled line and the positional information thereof is corrected such that the line becomes parallel to the horizontal line or the vertical line. If a certain value is not exceeded by a distance between end points of two extracted ruled lines or a distance from an endpoint of one ruled line to the other ruled line, it is considered that the end points of the both ruled lines overlap each other or that the end point of one ruled line overlaps with the other ruled line, and the positional information of each line is corrected such that the both ruled lines overlap as above.

If the ruled lines configure a table, cells configuring the table are detected. The cell is a rectangular region surrounded by ruled lines in the table to be used for entering one piece of data.

The cell can be detected as follows. The ruled line data are sequentially took out for all the ruled lines configuring the table to acquire the ruled line positions partitioned by the ruled lines or the extension thereof in the vertical and horizontal direction of the document. It is determined whether four sides of each box of a matrix generated by this ruled line positions are portions of the ruled lines, and if the side of the box is a portion of the ruled line, the ruled line portion is defined as a cell boundary. If the side of the box is not a portion of the ruled line, an adjacent box in the relevant direction is merged, and the same determination is repeated for the merged box to identify boundaries of the four sides of the cell.

The character/graphic element recognizing unit 34 performs the above character/graphic recognizing process for each color (black, blue, red) image of the image input document to generate the document element data in the data format shown in FIGS. 15 to 20 for each character, graphic element, and symbol.

Figure 15:
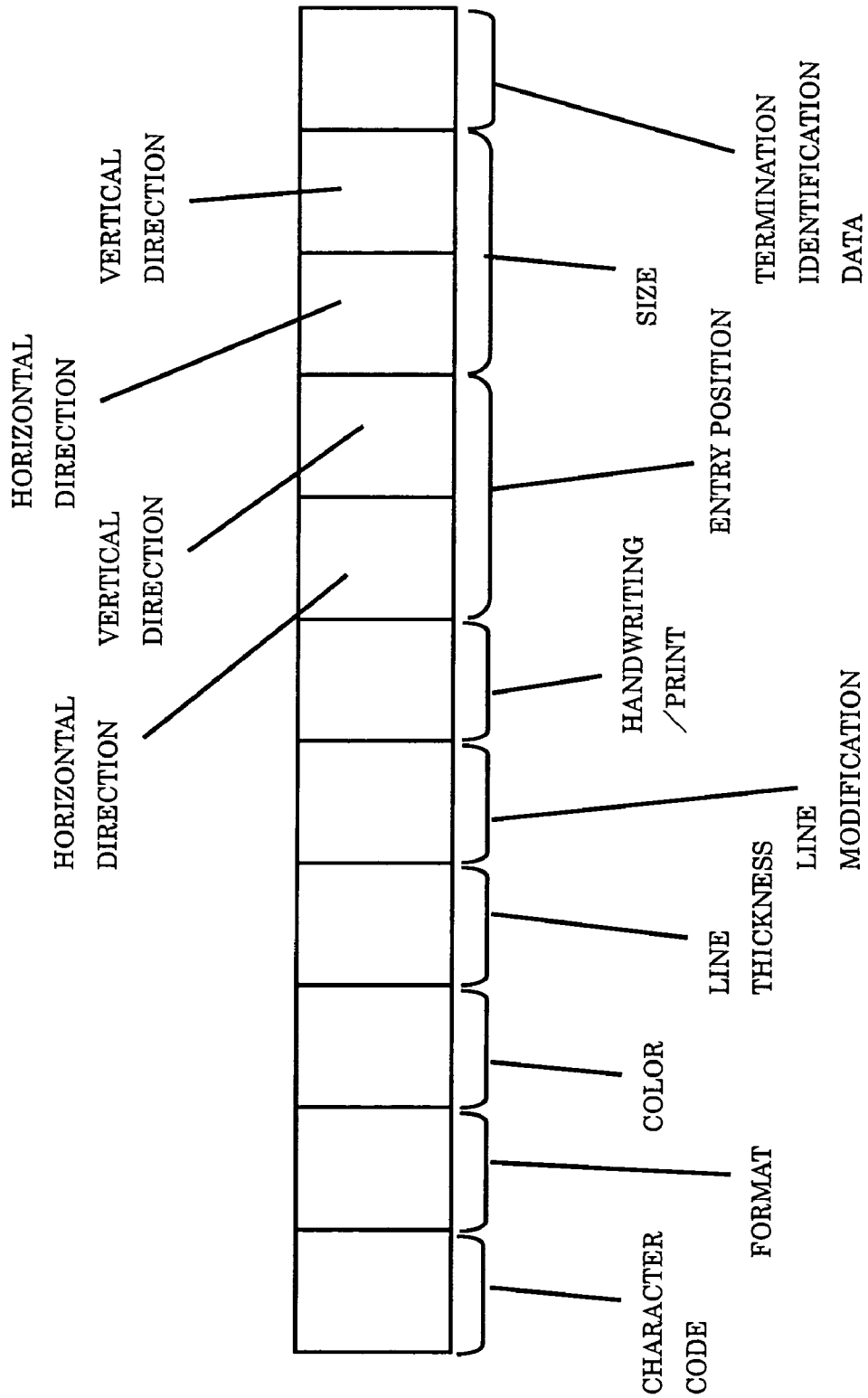
FIG. 15 is a diagram of a data format example of "character data" in the system of the embodiment.

FIG. 15 shows a data format example of the document element data (character data) corresponding to one character. As shown in FIG. 15, data are sequentially set in a predetermined data field to represent a code, font, color, line thickness, line modification (solid line, dot line, chain line) handwrite/print (differentiating handwritten character and printed character), entry position, and size (character size), and terminal identification data are added at the end to indicate the termination of the document element data.

Figure 16:
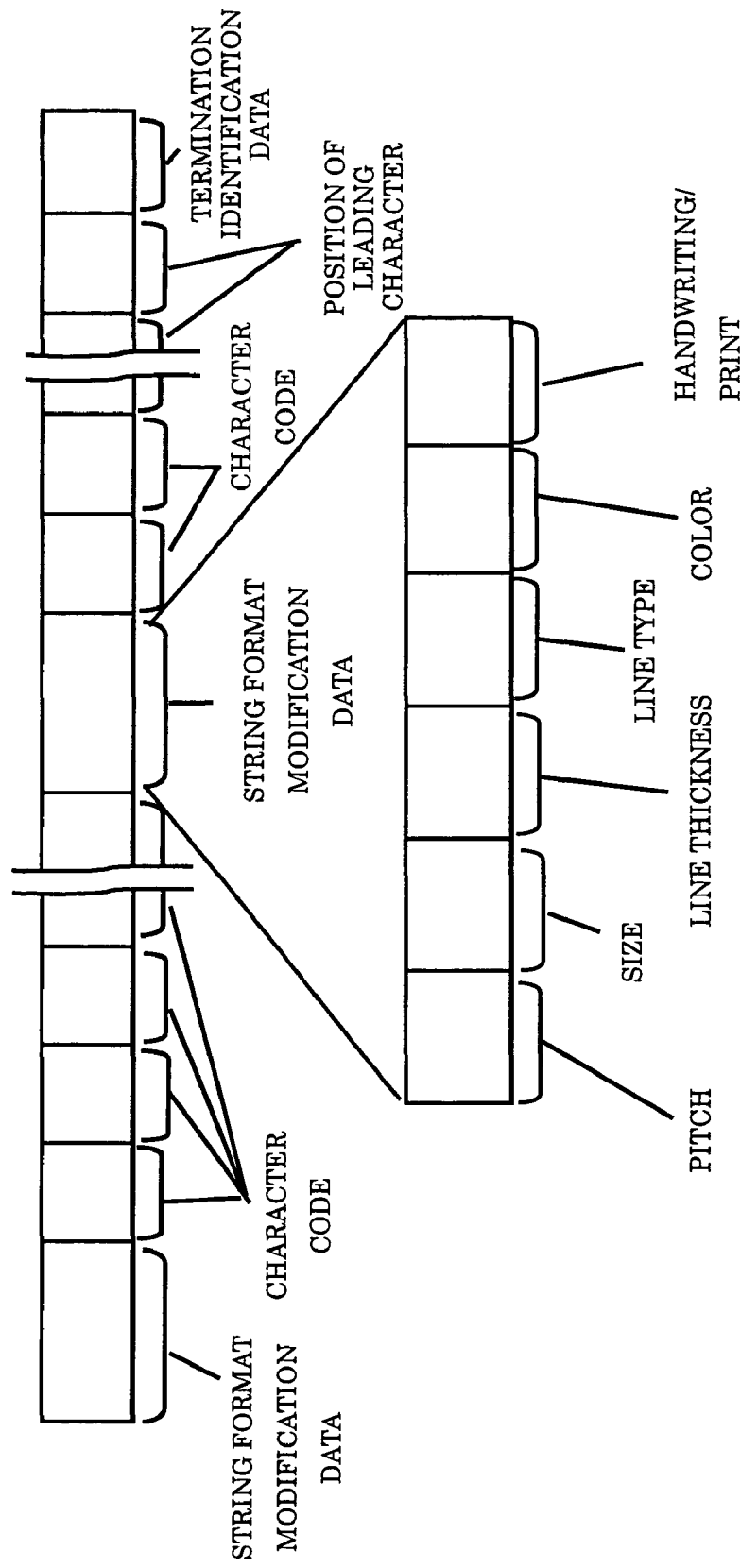
FIG. 16 is a diagram of a data format example of "string data" in the system of the embodiment.

FIG. 16 shows a data format example of the document element data (string data) corresponding to one string. As shown in FIG. 16, "leading character position" and "ending row position" are set to indicate locations of the string; "line pitch" and "character pitch" are set to indicate the font of the string; and character codes of characters configuring the string are set in the order of arrangement.

Figure 17:
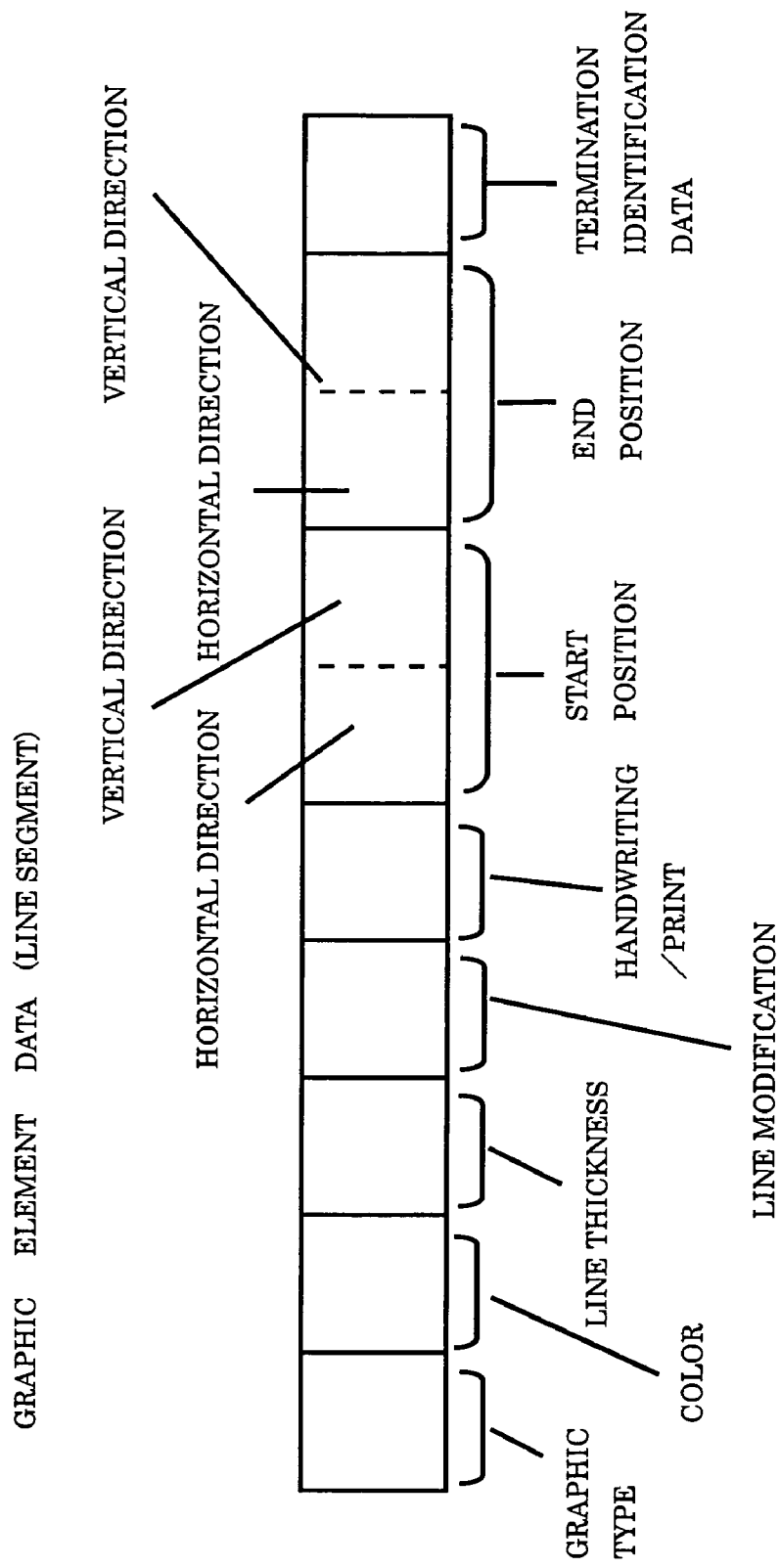
FIG. 17 is a diagram of a data format example of "graphic element data" corresponding to a line segment in the system of the embodiment.
Figure 18:
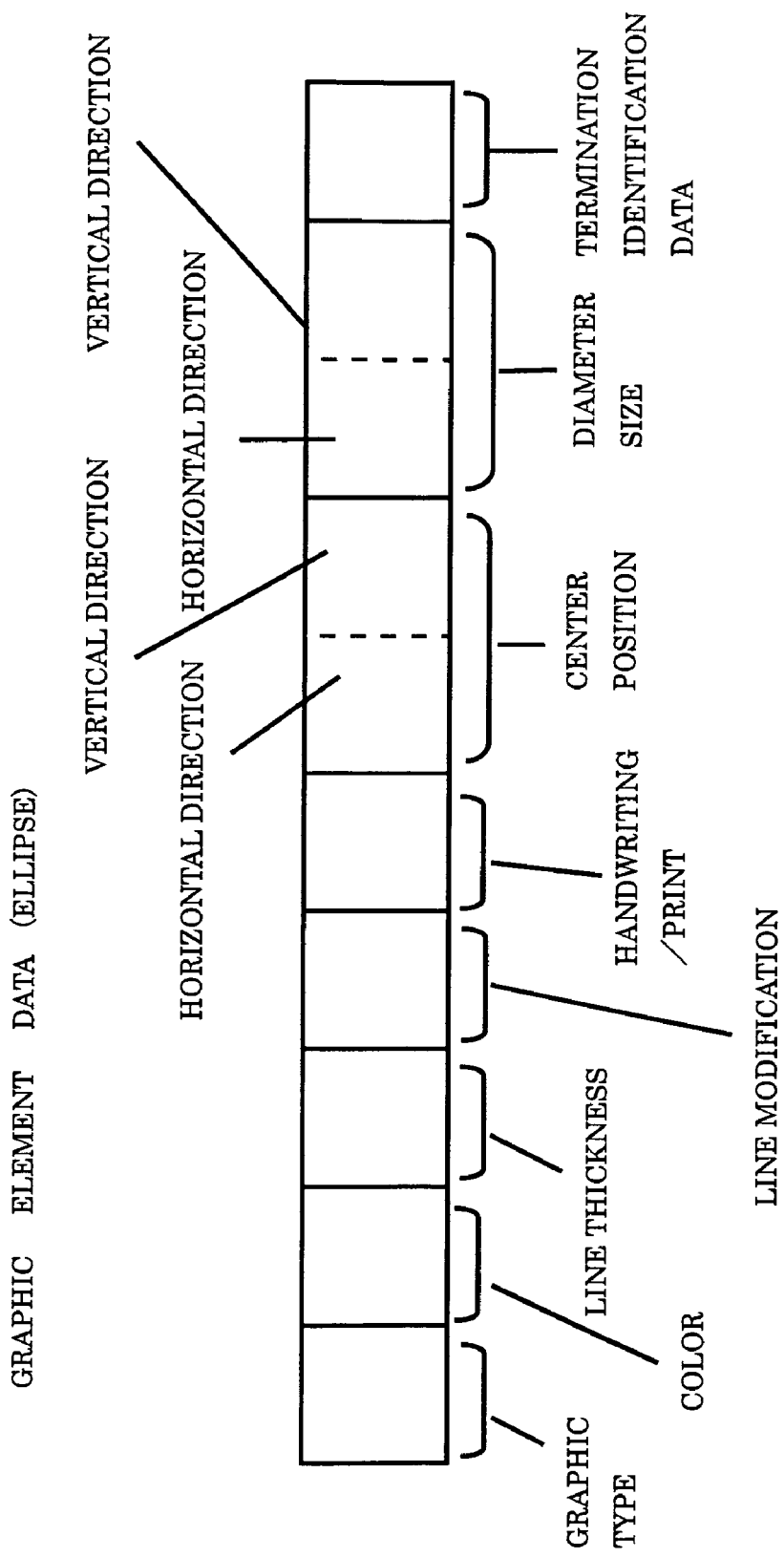
FIG. 18 is a diagram of a data format example of "graphic element data" corresponding to an ellipse in the system of the embodiment.
Figure 19:
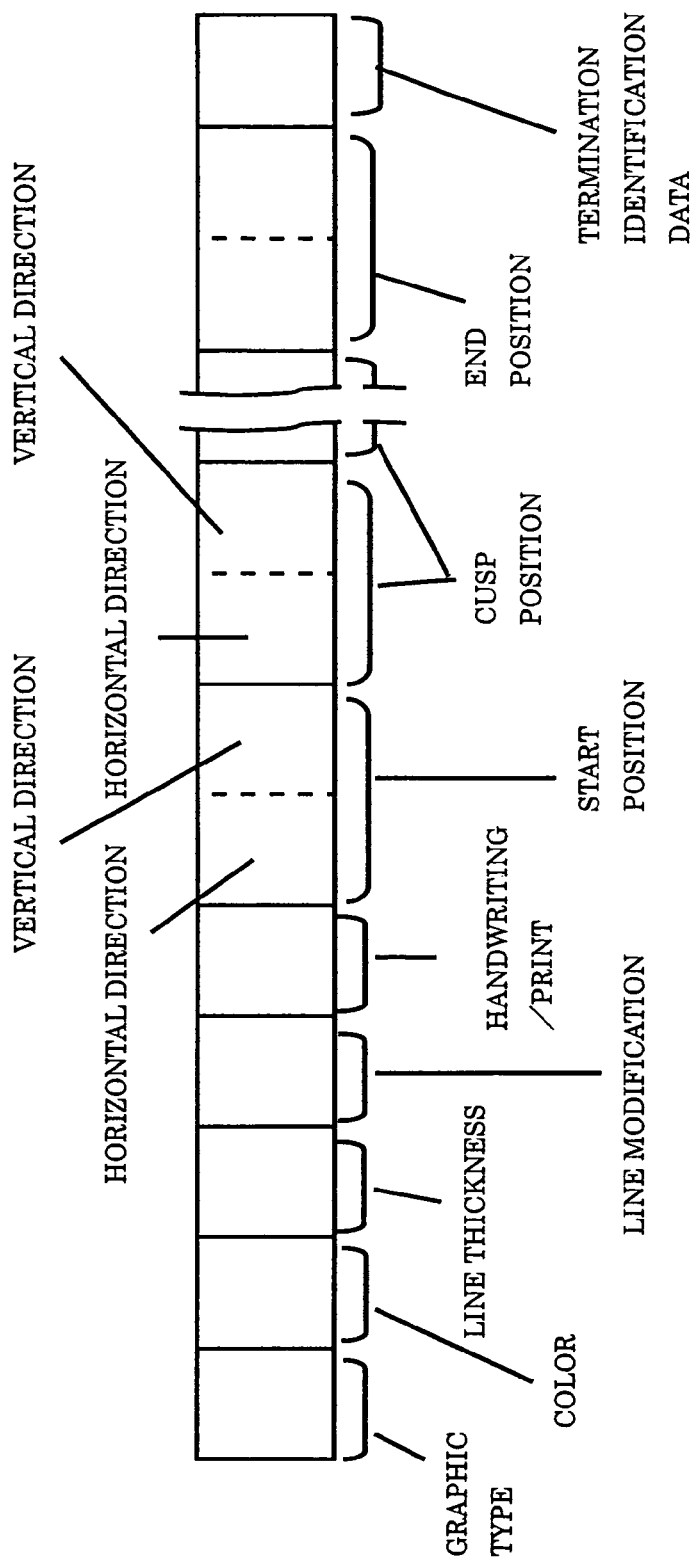
FIG. 19 is a diagram of a data format example of "graphic element data" corresponding to a rectangle, etc., in the system of the embodiment.

FIGS. 17, 18, and 19 are data format examples of the document element data (graphic element data), each of which corresponds to one graphic element or symbol. As shown in FIG. 17, data of the start and end positions are incorporated for a line segment. As shown in FIG. 18, data of the center position (X/Y-directions) and diameter size (X/Y-directions) are incorporated for an ellipse. As shown in FIG. 18, data of the start and end positions and the positions of the bending points or cusps (points of steep changes in a direction of a line segment) are incorporated for a rectangle, "<", etc.

Figure 20:
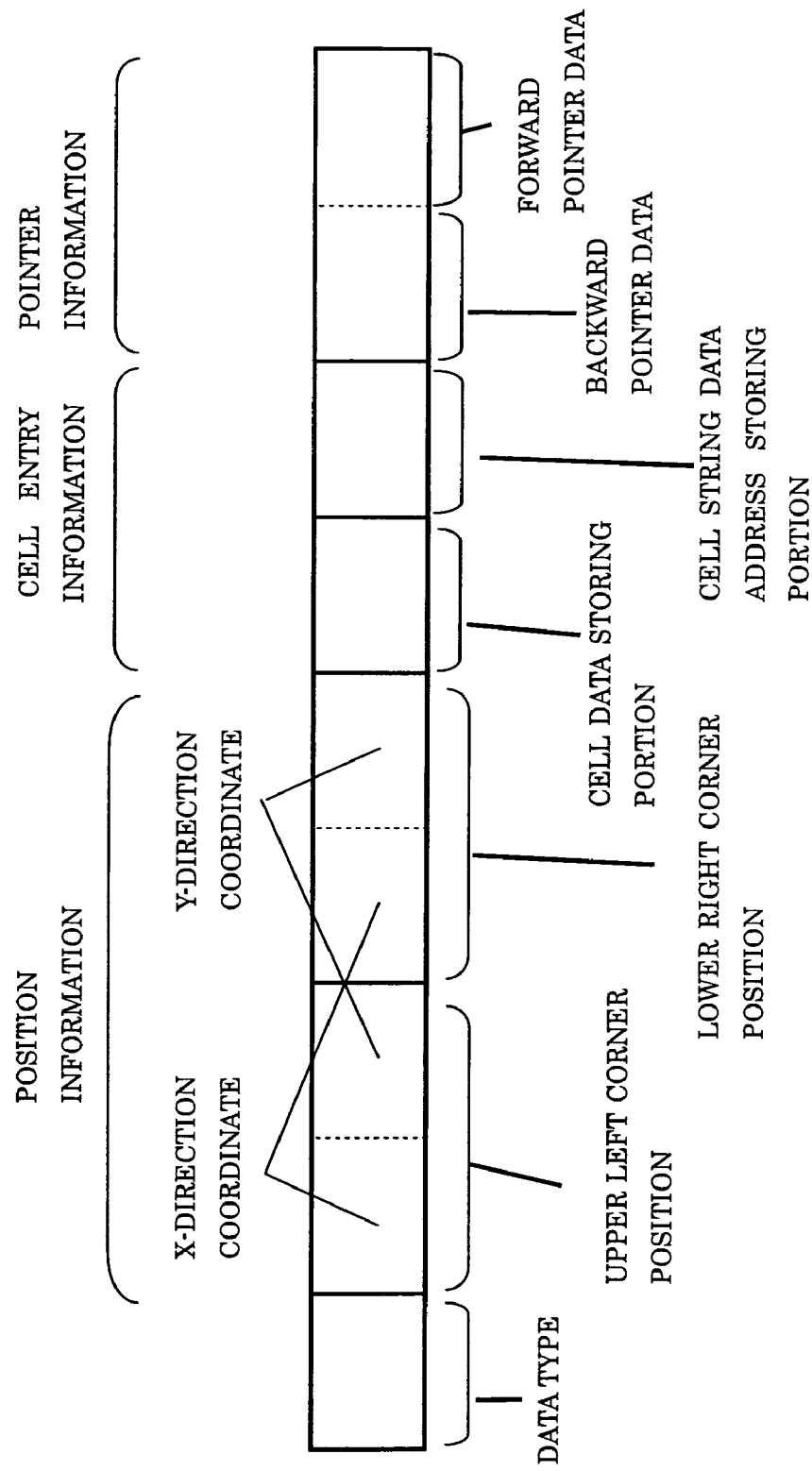
FIG. 20 is a diagram of a data format example of "cell data" in the system of the embodiment.

FIG. 20 is a data format example of "cell data" representing one cell. Only the positional information of the above identified cell (e.g., positions of the upper left point and the lower right point) is set in the "cell data" at this stage.

All the entry information in the image input document is divided into individual characters, symbols, and graphics and converted into the document element data by the character/graphic element recognizing unit 34. The document element data are accumulated in the document element data storing unit 38. In response to the character/graphic recognizing process, the image information corresponding to the entry information converted into the document element data may be deleted from the document image storing unit 32.

The document image output unit 40 can output a document image based on the image signals retained in the document image storing unit 32 and can also output a document image of the document element data stored in the document element data storing unit 38 after converting the data into image signals through the character/graphic pattern dictionary 36.

When the above document input and document element data generating process is completed, a message indicating the completion is provided for the user from the system through the display screen 20a, for example.

The user clicks the "mode" button always displayed at the lower right portion of the display 20a to select the "definition" mode and selects and specifies a "definition interpretation" button on the screen. In response to this specification, the system performs the following process.

Figure 21:
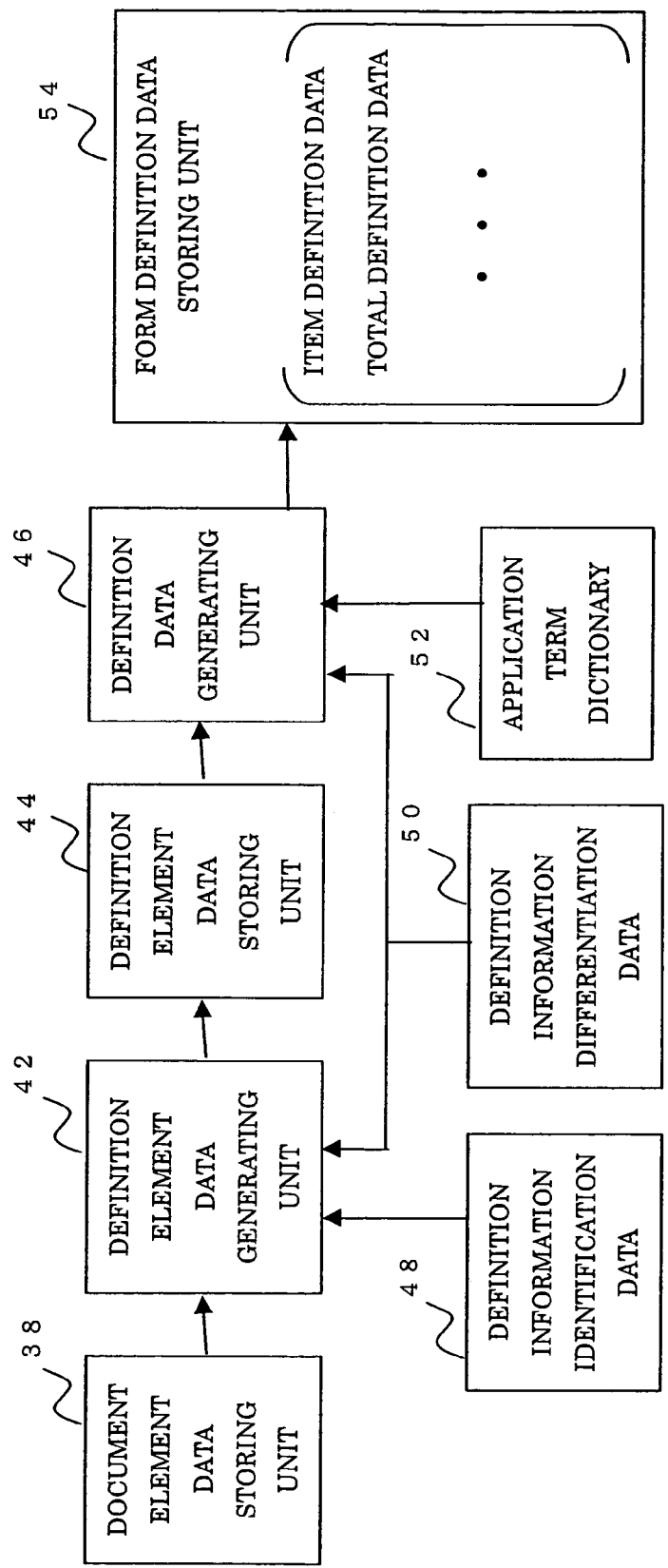
FIG. 21 is a block diagram of a configuration of a definition information recognizing and format setting unit and a definition execution processing unit in the system of the embodiment.

FIG. 21 shows a configuration of a definition information recognizing and format setting unit in the system of the embodiment. A definition element data generating unit 42 and a definition data generating unit 46 are configured by the CPU 24 that executes the definition element data and definition data generating process. The definition element identification data storing unit 48, the definition information differentiation data storing unit 50, the application term dictionary 52, and a form definition data storing unit 54 are deployed on a predetermined storing area of the internal memory 16 and the external memory 18.

In the definition information recognizing and format setting unit, the definition element data generating unit 42 refers to the definition element identification data (FIG. 6) and the definition information differentiation data (FIG. 8) retained in the definition element identification data storing unit 48 and the definition information differentiation data storing unit 50, respectively, to generate data (the definition element data) for each piece of the definition element entry information entered in each document based on the document element data (FIGS. 15 to 20) stored in the document element data storing unit 38.

Figure 22:
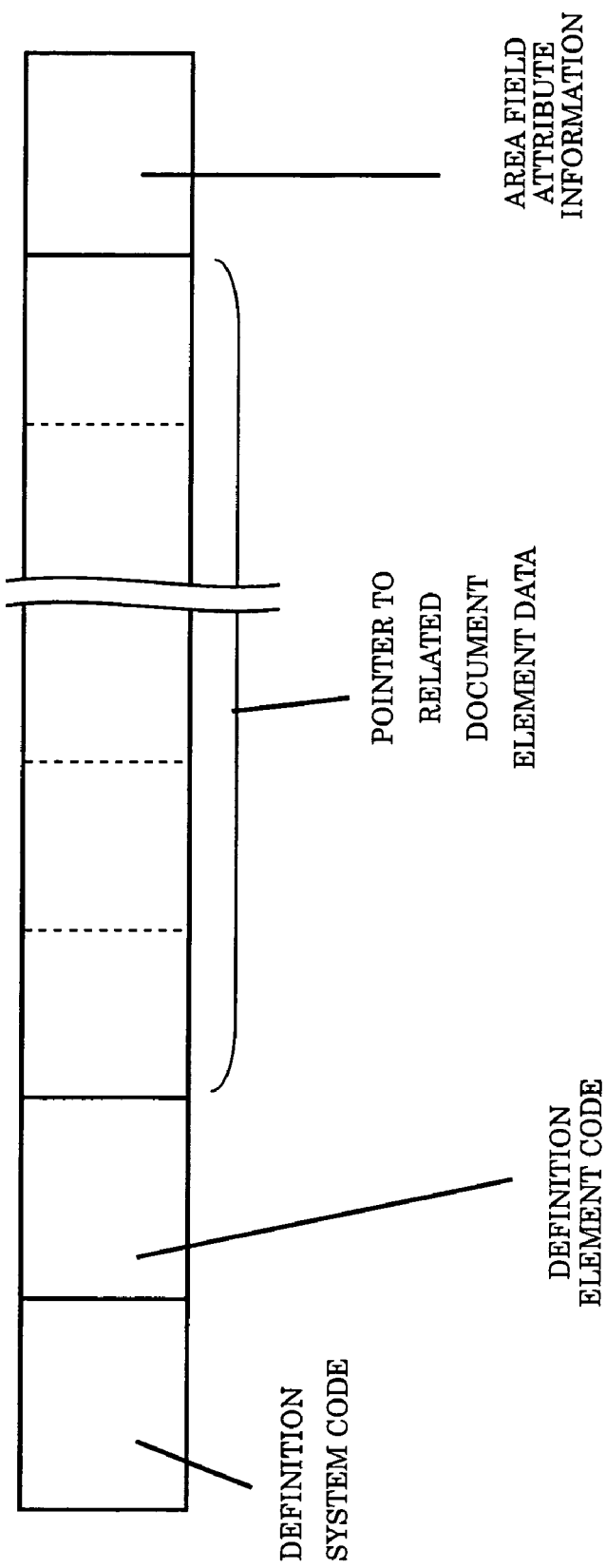
FIG. 22 is a diagram of a data format example of "definition element data" in the system of the embodiment.

FIG. 22 shows a data format example of the definition element data. The "definition system code" and "definition element codes" are set to identify the definition element entry information, and pointers are set to refer to the document element data corresponding to characters, graphics, and symbols configuring the definition element entry information. For example, in the case of "[ ]" for "field specification", pointers are set to specify addresses of the document element data corresponding to the constituent symbols "[" and "]".

If data corresponding to a constituent symbol of the definition element entry information are detected as partial data (e.g., data for one character) in the string data representing a plurality of characters rather than the character data representing one character, new character data or string data may be generated for the relevant portion, and new string data may be generated for the remaining portion acquired by removing the relevant constituent symbol portion from the relevant string. If the relevant portion is not located at either end of the relevant string, other string data may be generated to put the relevant portion therebetween.

To generate the definition element data, the document element data are searched which has the modification information assigned to the relevant definition system, for example, the (blue) color information. In the case of the string data, data of the relevant characters are searched in the document element data. If the definition element consists of a pair of two symbols such as the "field specification" definition element " ", first, one constituent symbol is searched and detected, and a counterpart constituent symbol is then determined.

If a plurality of counterpart constituent symbols is detected for one definition element constituent symbol, the symbol may be selected as follows. For example, in the case of the "field specification" definition element " ", a combination may be selected such that a rectangle formed by the both constituent symbols does not include a definition element constituent symbol " " or " " of the same kind.

The "definition system code" and "definition element code" can be determined for each definition element with the above method, and the pointer can also be determined to specify each address of the document element data (graphic element data) of the symbols configuring the definition element entry information.

The above definition element data acquired from the definition element data generating unit 42 are stored in a definition element data storing unit 44.

The definition data generating unit 46 refers to the definition information differentiation data (FIG. 8) retained in the definition information differentiation data storing unit 50 to generate the definition data for each piece of the definition information entered in the document, based on the definition data (FIG. 22) accumulated in the definition element data storing unit 44 and the document element data (FIGS. 15 to 20) accumulated in the document element data storing unit 38.

Figure 23:
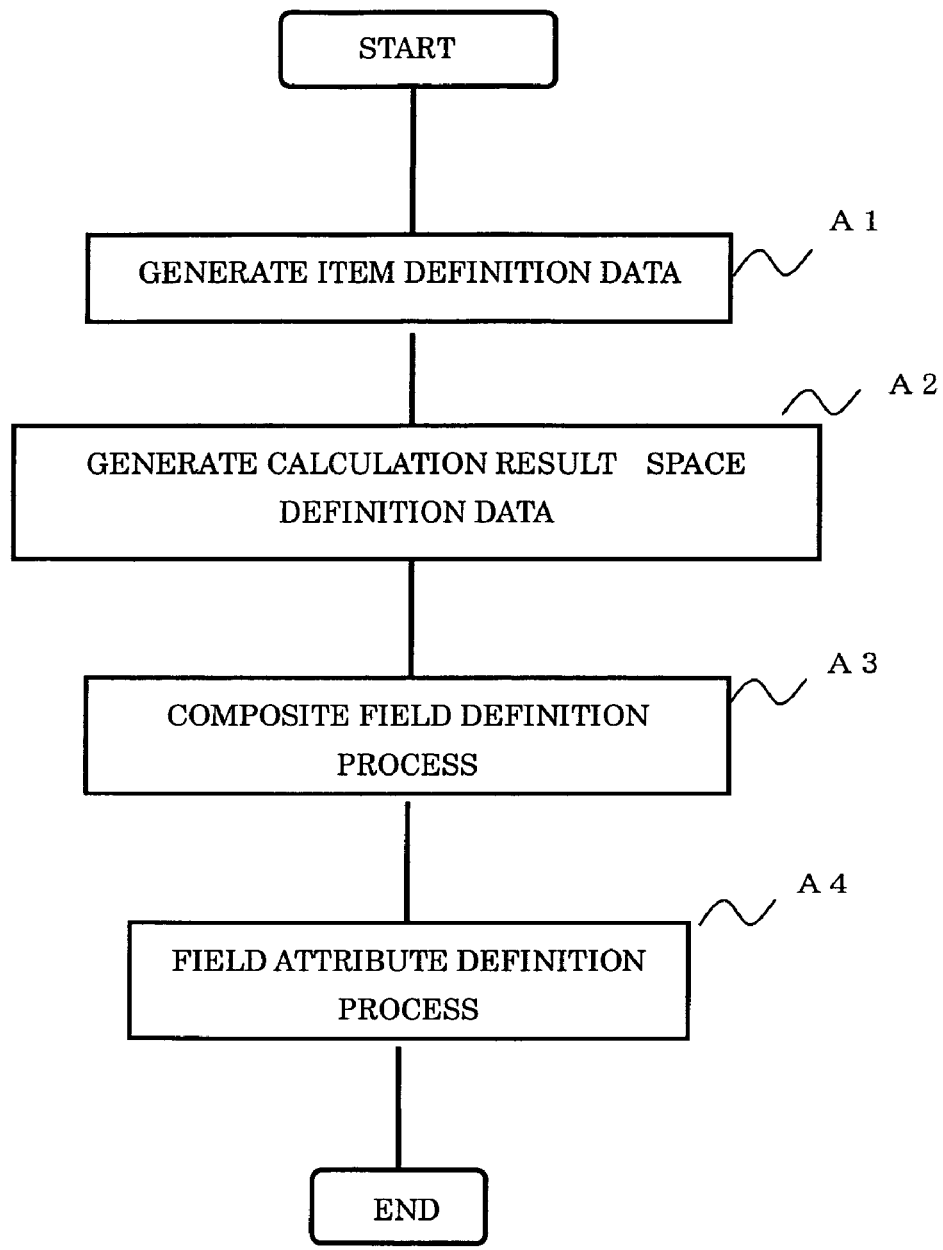
FIG. 23 is a diagram of an example of an overall procedure of definition data creation in the system of the embodiment.
Figure 24:
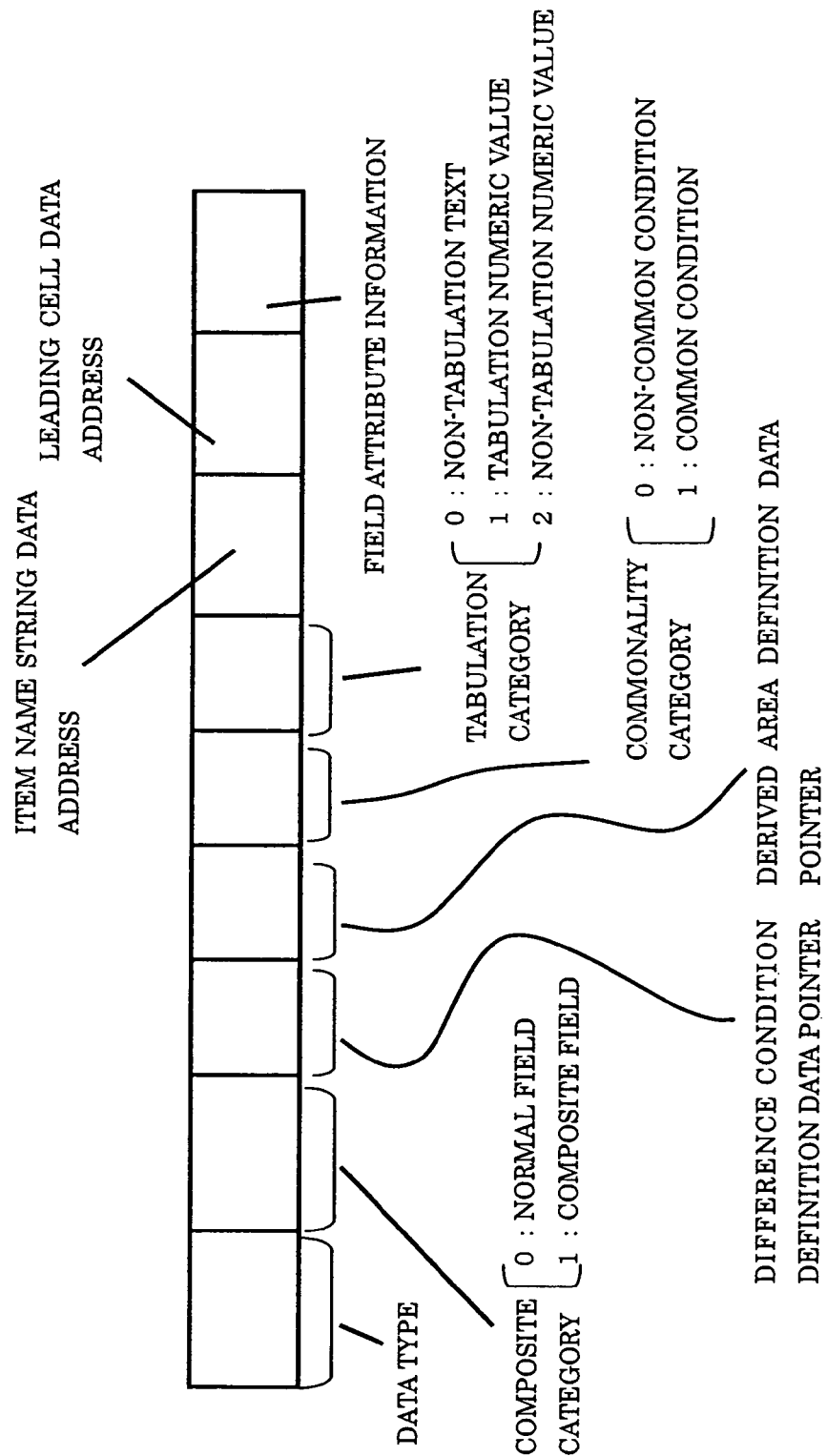
FIG. 24 is a diagram of a data format example of "item definition data" in the system of the embodiment.
Figure 2:
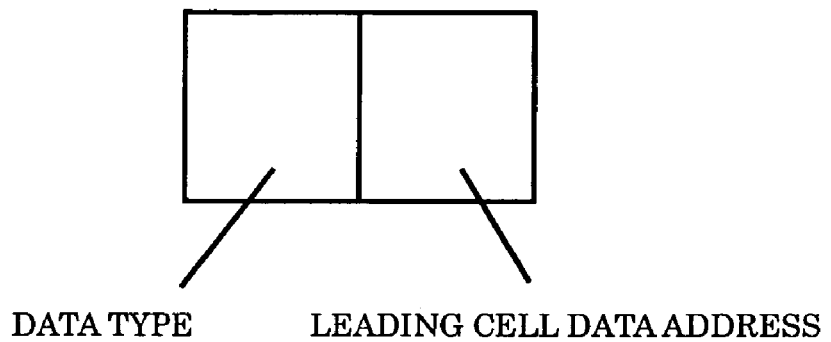

FIG. 23 shows a procedure of creating overall definition data in this example. First, the item definition data (FIG. 24) and the total definition data (FIG. 25) are created for all the data fields in the summary table (steps A1 and A2). When creating the item definition data and the total definition data, the data field and total field of the composite cells are temporarily created in the same way as the normal data field and total field (in a way ignoring the derived areas).

A "composite field definition process" is then performed for the item definition data of the data field consisting of the composite cells (composite field) and the total definition data of the total field consisting of the composite cells to add definition contents for enabling data input/output to the "derived areas" (step A3). Finally, a "field attribute definition process" is performed for the data field with the layout format specified (step A4).

The item definition data (FIG. 24) is created in accordance with the following procedure. The "field specification" definition element symbol "[ ]" or " " already extracted as the definition element data is identified one by one; the cell or cell sequence specified for a data field by the symbol is identified as a "field candidate"; and "field candidate definition data" are created. Although the "field candidate definition data" are created with the format of the item definition data (FIG. 24 described later), the corresponding item name is not determined at this point and, therefore, an "item name string data address" portion in the data is left blank.

The cell sequence configuring the field candidate can be detected by detecting cells including, for example, each of symbols "[" and "]" constituting the "field specification" definition element symbol for cells at both ends and by sequentially detecting cells linking the cells at both ends. The cell including the relevant definition element symbol is detected by sequentially checking the positional information of the relevant definition element symbol against the positional information of the cells on the document.

The cell data of the detected cell sequence are sequentially linked from the leading cell with the use of "pointer data" in the cell data to form a "cell data chain" (not shown), and the cell data address of the leading cell is set in a "leading cell data address" portion in the "field candidate definition data".

If the cell configuration forms a matrix as in the case of the data field of the item name "sales" in this example, for example, cells of the first row are sequentially linked from left; the rightmost cell is linked to the leftmost cell of the second row; cells of the second row are sequentially linked; and the above procedure may be repeated.

The string specified as a "data name" by the "field specification" definition element symbol is identified as a "data name candidate" to create "data name candidate definition data". The "data name candidate" string is also determined by sequentially checking the positional information of the relevant definition element symbol against the positional information of the string on the document.

The data name candidate definition data are created with the format of the item definition data (FIG. 24 described later), and the string data address of the relevant string is set in the "leading cell data address" portion.

A "corresponding item name" is acquired for the above detected "field candidate" and "data name candidate" to complete the item definition data (FIG. 24) from the field candidate definition data or data name candidate definition data.

First, the linking line "-" is searched which is pulled out from the cell sequence of the "field candidate" or the string of the "data name candidate". The linking line can be searched by repeatedly checking the line segment data registered as the definition element "linking line" against the positional information of the cell data in the field or the positional information of the string data.

A string (hereinafter, "item name specification string") is identified which is adjacently entered at the other end of the searched linking line and surrounded by the "item name specification" definition element symbols.

The string adjacently entered at the other end of the searched linking line can also be identified by repeatedly checking the line segment data against the positional information of the string data of the document. By repeatedly checking the string against the positional information between the "item name specification" definition element symbols, it is determined that the string adjacently entered at the other end of the searched linking line is the "item name specification string".

If the linking line is pulled out from the relevant cell sequence or string and the "item name specification string" exists next to the other end of linking line, it is determined that the "item name specification string" is the "corresponding item name" of the relevant "data field candidate" or "data name candidate", and the string data address is set in the "item name string data address" portion of the already created field candidate definition data or the data name candidate definition data.

In this example, the above item name definition data are created for the item name "branch", and the item name "sales" and the item name "year", which are additionally entered on the outside of the table.

If the "field candidate" or "data name candidate" does not have the "item name specification string", the "item definition data" is created by considering that the "corresponding item name" corresponding to the "field candidate" or "data name candidate" is a "item name specification string" not already used as the corresponding item name, which is located at a "specific adjacent position" for the "field candidate" or "data name candidate".

The "specific adjacent position" of the "field candidate" may be a position adjacent to the left side of the field if the data field is horizontally defined and may be a position adjacent to the upper side of the field if the data field is vertically defined.

The relevant string data address of the detected "corresponding item name" is set in the "item name string data address" portion of the field candidate definition data or the data name candidate definition data to complete the item definition data. In this example, the item definition data are created with the "corresponding item name" of the item name "product" in this method.

The "commonality category" and "tabulation category" are then determined for all the created item definition data. It is determined whether the item definition is defined as a "common condition" "outside the table" or defined in the field "inside the table".

If a data field of the item definition is defined in the table as a group of a plurality of cells adjacent to each other, it is determined that the data field is "inside the table", otherwise, it is determined that the data field is "outside the table".

If it is determined that an item definition data field is "inside the table", a relevant code "0" is set in a "commonality category" space in the "item definition data", and if determined that the data field is "outside the table", a relevant code "1" is set in a "commonality category" space in the "item definition data". In this example, "1" is set for the "item definition data" of the item name "year" and "0" is set for the "item definition data" of other item names.

The "tabulation category" of each item name is determined for the item definition in the table format. The determination can be performed for the strings of the definition item names of the item definition by detecting that the definition element symbol "○" of the (blue) color "tabulation category specification" and the definition element symbol "●" of the "non-tabulation numeric value category specification" are added and entered at an upper right adjacent portion of the string, which is a predetermined position of the item name string.

If the definition element symbol "○" of the "tabulation category specification" is detected and it is determined that the data are the "tabulation numeric values", the relevant code "1" is set in a "tabulation category" portion of the relevant item definition data; if the definition element symbol "●" of the "non-tabulation numeric value category specification" is detected and it is determined that the data are the "non-tabulation numeric values", the relevant code "2" is set in the "tabulation category" portion of the relevant item definition data; and otherwise, the relevant code "0" is set in the "tabulation category" portion.

In this example, this "tabulation numeric value" specification is performed for the item definition of the item name "sales".

After creating all the "item definition data", "total field definition data" is created in a "calculation result space definition data generating process" (step A2). The definition element symbol "○" of the "registered word specification" is searched on the document and the characters surrounded by the symbol are searched in the application term dictionary 52.

Figure 27:
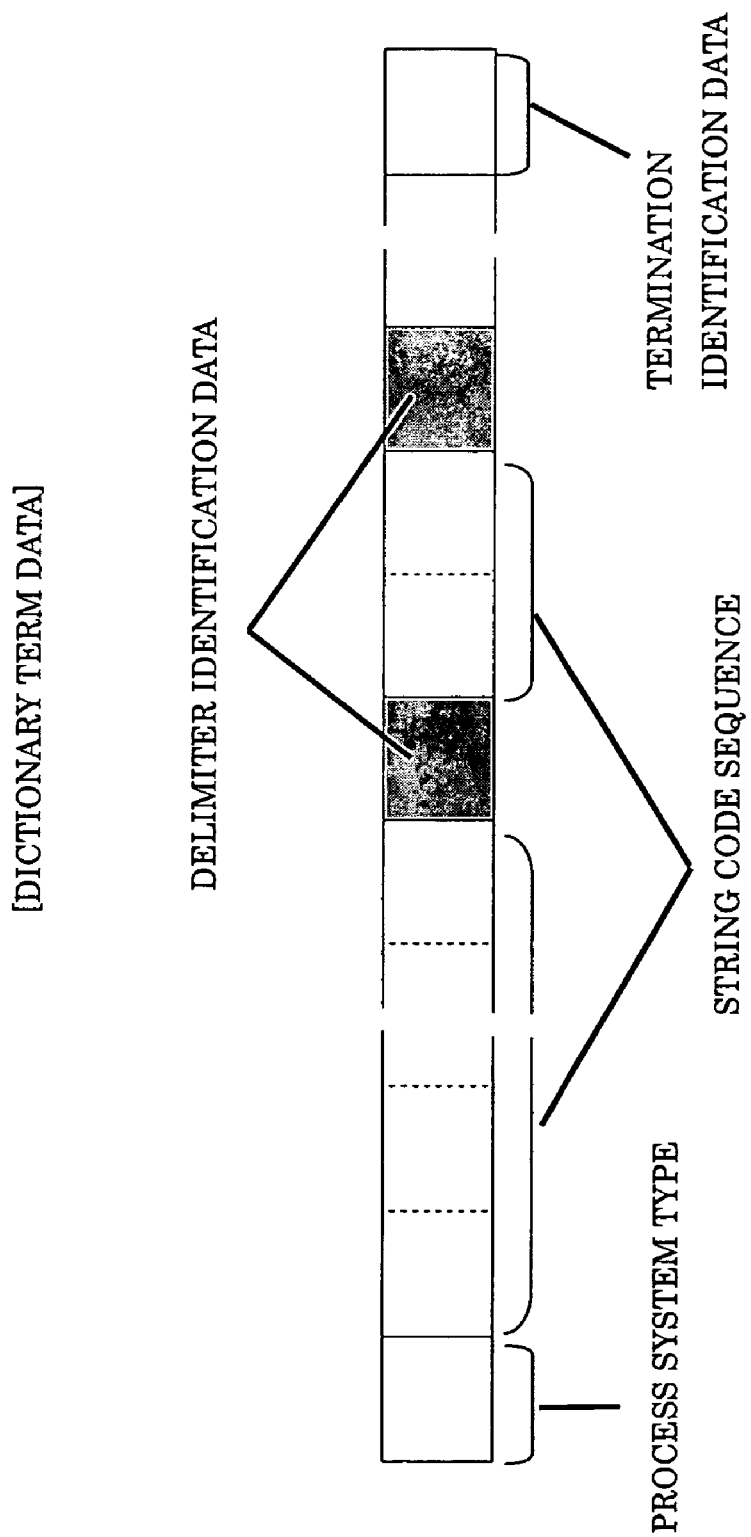
FIG. 27 is a diagram of a data format example of "dictionary term data" in the system of the embodiment.

FIG. 26 shows an example of terms included in the application term dictionary 52. FIG. 27 shows a data format of the term data included in the application term dictionary 52. Each sub-definition system code is set in a data field of a process system type at the header, and a relevant character code sequence is set in a data field of a "character code sequence" after the header. In FIG. 26, "delimiter identification data" correspond to a comma delimits each term.

If it is identified that the characters "total" circled with the definition element symbol "○" is a "total space specification word" in a sub-definition system "calculation result specification" in the application term dictionary 52, a corresponding total field is identified to create "total field definition data". The corresponding total field is identified by searching a data field linked to this "total space specification word" with the "linking line" from the data fields with the field candidate definition data are created, and if no data field is linked to the "total space specification word" with the "linking line", a field candidate may be selected which has the "total space specification word" at the "specific adjacent position" (the "specific adjacent position" for a field has been described above). FIG. 25 shows a format of the "total field definition data".

If a string "Average" is entered at the position of the characters "total" in the table format shown in FIG. 11, The string "average" is also identified as an "average result entry space" specification word" in the sub-definition system "calculation result specification" in the application term dictionary 52, and a corresponding field of entering an average result is identified to create "average result entry space field definition data". The format of the "average result entry space field definition data" is the same as the "total field definition data" with the "data type" portion thereof replaced. Definition data of fields for entering calculation results are created for other calculations such as "variance" in exactly the same way.

The constituent cells configuring the "total field" are sequentially picked up to detect a corresponding "calculation target field" for each constituent cell. The "calculation target field" is a group of cells having entry data that are aggregated in the above total space cell for entering a total value.

If the "total field" is defined in the horizontal direction, a search is performed for an item definition data field with the "tabulation category" of the "tabulation numeric value" in the upward direction of the same column as the constituent cell. If the "total field" is defined in the vertical direction, a search is performed in the leftward direction of the same row as the constituent cell.

Figure 28:
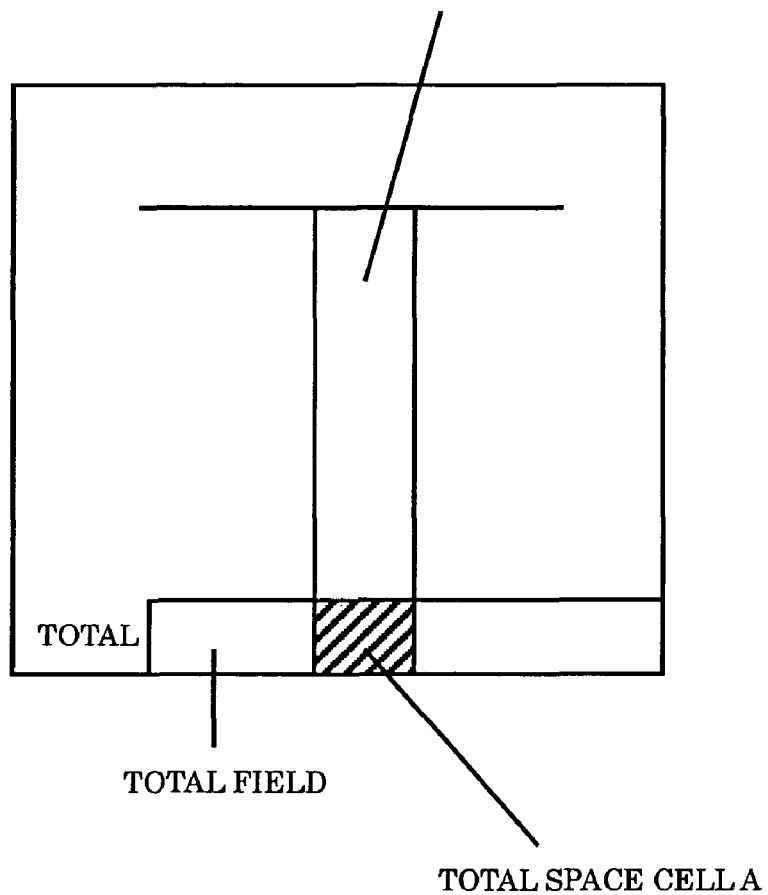
FIG. 28 is a diagram of a relationship among a total field, total space cell, and calculation target field in the system of the embodiment.

If the item definition data field satisfying the above condition can be detected for a constituent cell in the "total field", the cell can be considered as a total space cell using a portion of the same column or row as the "calculation target field" in the relevant item definition data field. FIG. 28 shows a relationship among the "total field", the "calculation target field", and the total space cell.

For the total space cell with the "calculation target field" detected as above in one "total field", the cell data thereof are sequentially linked with the use of the "pointer data" to form the "cell data chain" again. The address of the leading cell data is set in the "leading cell data address" portion in the relevant "total definition field data" (FIG. 25).

In this example, the "total field" is defined in the lowermost row and the rightmost column of the table, and each constituent cell is the total space cell having a portion of the same column or row as the "calculation target field" in the data field of the item name "sales".

After creating the "item definition data" and the "total field definition data" for all the data fields and the total fields, the "composite field definition process" (step A3) is performed for the "composite field" with the "composite cells" defined. The "composite field definition process" is performed by adding contents defining the composite cell to the relevant "item definition data" and "total field definition data" already created.

Figure 29:
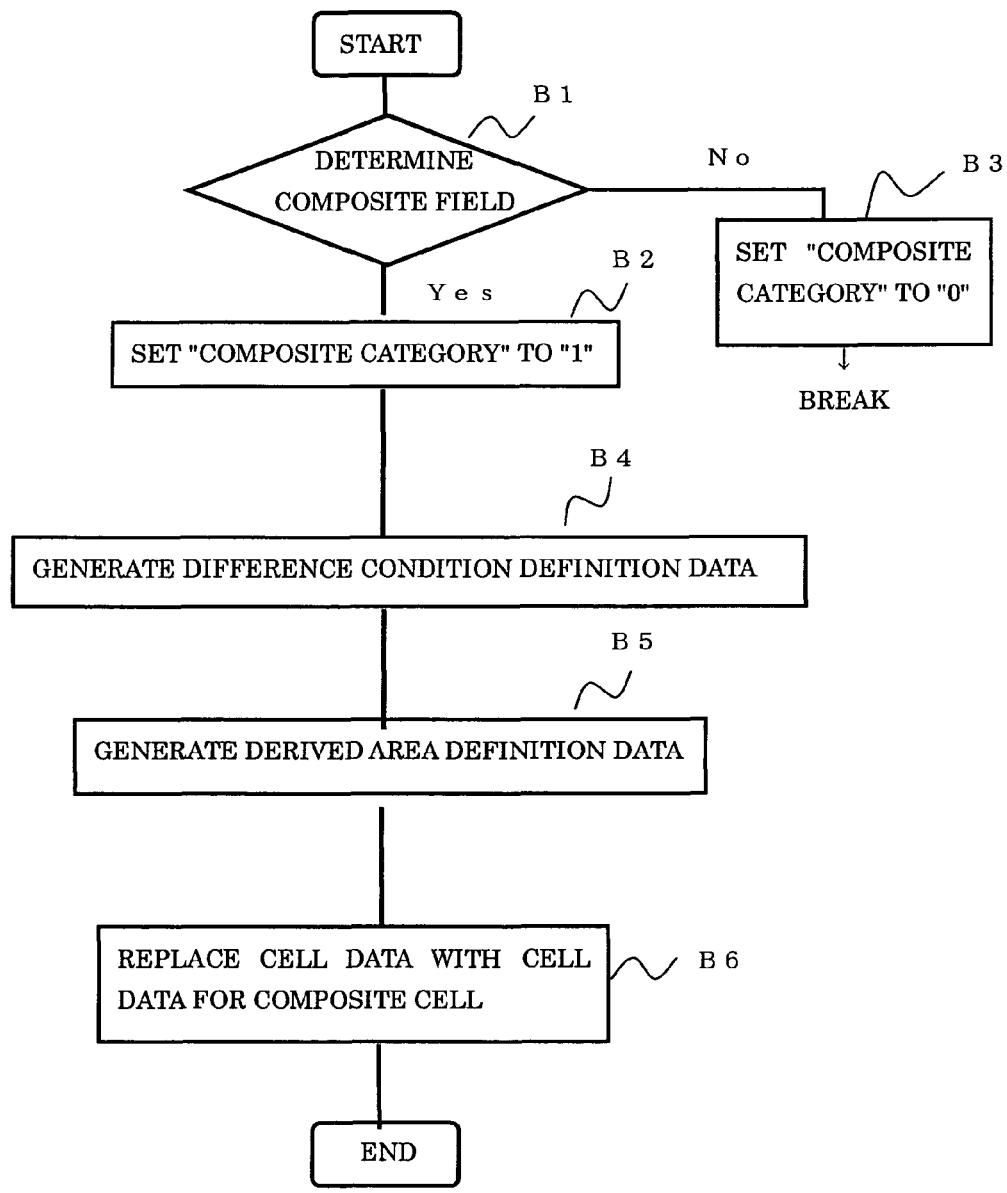
FIG. 29 is a diagram of a flowchart of a composite field definition process in the system of the embodiment.

FIG. 29 shows a process performed for each data field in the "composite field definition process". First, the already created item definition data are picked up one by one to determined whether the relevant data field is a "composite field" (step B1). This determination is performed by determining whether a difference condition satisfying the following condition is correlated with the picked up item definition data field in a predetermined format and method.

In this system, a format of a "pair of item name and data name" is used as a format of the difference condition. In the difference condition, the item name portion of the "pair of item name and data name" must be the same as the corresponding item name (in this example, "year") of the item definition defined "outside the table" as the common condition of the entire table, and the data name portion (in this example, "2000") must be different from the "data name" (in this example, "2001") of the above common condition.

In this system, if the string entered in the format document is defined to satisfy the above format and condition and has a certain correlation with an item definition data field, it is determined that the data field is a "composite field" and that the string is a "difference condition specification string" representing the difference condition.

In this example, with regard to the string "<year>[2000]" additionally entered outside the table in (blue) color, it is determined that a string specified as an item name and a string specified as a data name with the above definition element symbols determined in the system are entered in the same row, in a determined order, and at an interval within a determined threshold and, therefore, it is determined that the string is described in the format of the "pair of item name and data name".

It is then determined that the "year" of the item name portion in the string is the same as the corresponding item name of the item definition for the common condition of the entire table and that the "2000" of the data name portion in the string is different from the data name "2001" of the item definition for the common condition outside of the table.

It is also determined that the string "<year>[2000]" is linked to the item definition data field of the item name "sales" with the linking line and it is determined from the above determination results that this string is the "difference condition specification string" and that the item definition data field of the relevant item name "sales" is the "composite field" having the defined difference condition represented by the "difference condition specification string".

For the data field determined as the "composite field", the code "1" indicating the "composite field" is set in a "composition category" portion in the relevant item definition data (step B2); "difference condition definition data" and "derived area definition data" are created to set the addresses thereof in a "difference condition definition data pointer" portion and a "derived area definition data pointer" portion in the relevant item definition data, respectively (steps B4, B5); and a process of "replacing cell data for composite cell" is performed (B6).

If it is determined that the data field is the "normal field", which is not the "composite field", the code "0" indicating the "normal field" is set in the "composition category" portion in the relevant item definition data (step B3) and the process shown in FIG. 29 is terminated.

Figure 30:
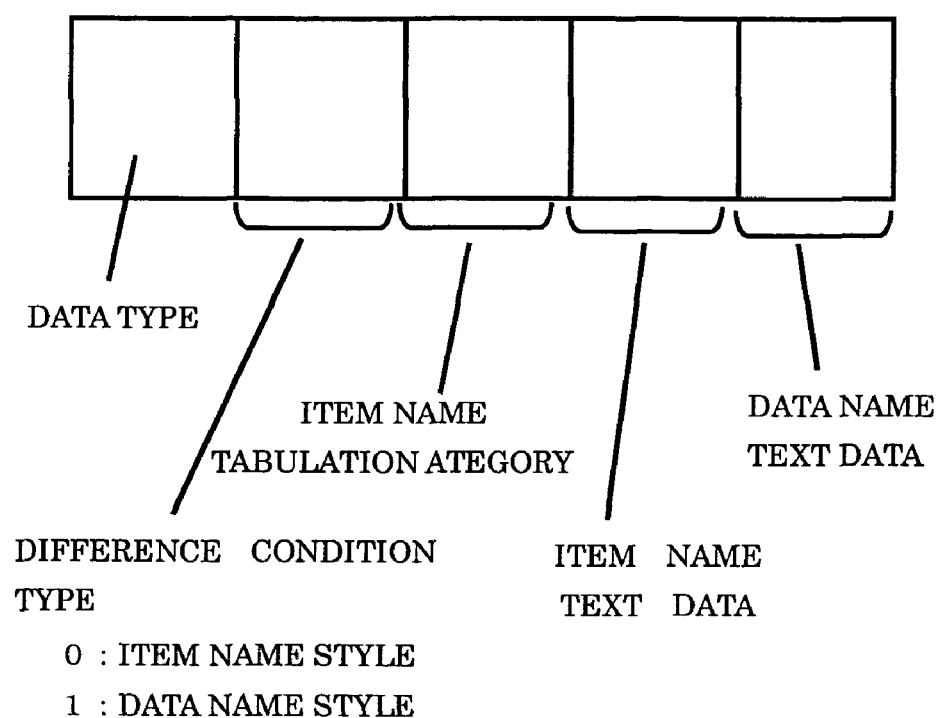
FIG. 30 is a diagram of a data format example of "difference condition definition data" in the system of the embodiment.
Figure 3:
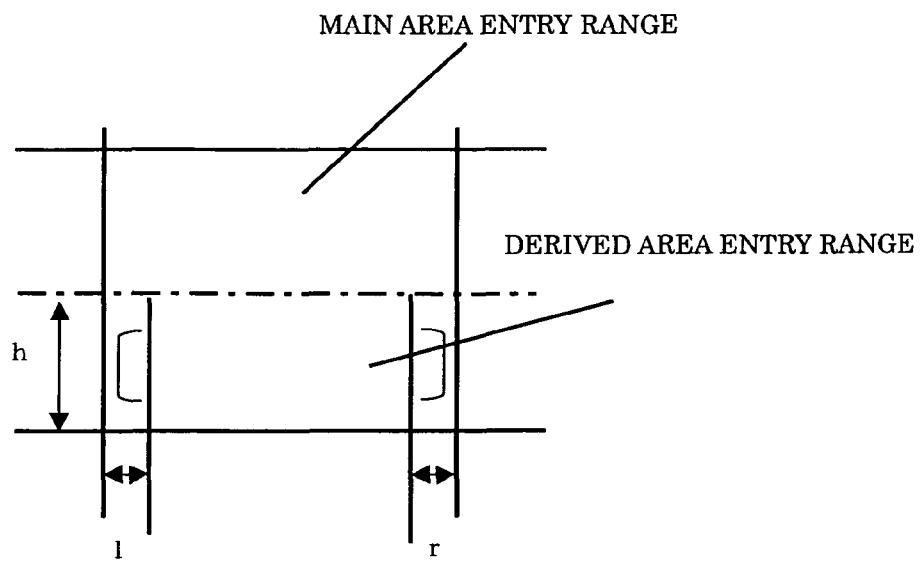

FIG. 30 shows a format of the "difference condition definition data". In this example, the item name portion "year" and the data name portion "2000" are extracted from the strings additionally entered as the difference condition to create relevant text data, which are set in an "item name text data" portion and a "data name text data" portion in the "difference condition definition data". The code "1" indicating the format of the "pair of item name and data name" is set as the "category" of the difference condition (in this description, the format is referred to as a "data name style" format to differentiate from an "item name style" format described later).

With regard to the data field determined as the "composite field" with the "difference condition" defined, a "composite cell format" is identified which is a document format of the "composite cell" and is represented in the form of the "derived area definition data" (FIG. 33) (step B5).

First, an assumptive "composite cell format" is detected by focusing on an arbitrary composite cell in the relevant "composite field". Since each cell configuring one item definition data field generally has the same document format (shape/dimension of cell . . . , entry format of entry data . . . ) in a form format, it is also assumed in the "composite field" that each composite cell configuring composite cell has the same "composite cell format".

Therefore, if the "composite cell format" is detected from one arbitrary composite cell, it is checked that the remaining cells in the same data field have the same "composite cell format" and the format is determined as the "composite cell format". However, since an illustrative "composite cell format" may be entered only in a portion of cells as in the case of this example, the "composite cell format" is not hampered unless different character symbols are entered in other cells at the determined entry positions of the "derived cell generating element" constituent symbols.

This system recognizes the "composite cell format" when a set of a combination of symbols ("derived cell generation element") forms one data string entry area and the formed entry area occupies a lower half or right half of the relevant composite cell. The "derived cell generation element" can be detected by the following procedure.

The system is registered with combinations of symbols that may act as the "derived cell generation element" as much as possible. A "type" code is determined for each combination of symbols; "derived area generating element data" are determined which are registered with codes of the symbols configuring the combinations and orders of entry of the constituent symbols; and the data are registered as a whole to form a "derived area generating element dictionary" (not shown). The format of the "derived area generating element data" may be the same format as the above "definition information identification data" (FIG. 6).

Each cell of the relevant data field is searched to detect the combination of symbols registered in the "derived area generating element dictionary".

If a pair of symbols registered in the "derived area generating element dictionary" can be detected, a rectangle circumscribes the pair of the symbols, and if it can be confirmed that three sides of the circumscribing rectangle in the left, right, and downward directions are formed within a certain threshold from the boundary of the relevant cell as shown in FIG. 31(a), it is determined the pair of the symbols is the "derived area generating element" defining the "derived area" in the lower portion of the cell.

If it can be confirmed that three sides in the right, upward, and downward directions are formed within a certain threshold from the boundary of the relevant cell as shown in FIG. 31(b), it is determined the pair of the symbols is the "derived area generating element" defining the "derived area" in the right portion of the cell. The rectangle circumscribing the pair of the symbols can be obtained from elements of "position", "height", and "width" of the characters by reference to the character data (FIG. 15) of the symbols If the "derived area generating element" can be detected, an appropriate margin is added to the circumscribing rectangle to obtain a "(derived area) dividing position" dividing the main area and the derived area, and a "both-side margin" of the derived area can be obtained from the "position" and "width" of the "derived area generating element" constituent symbol (FIG. 32).

If the "derived area generating element" can be detected in one cell, it is checked that a different symbol or character is not detected in the remaining cell of the relevant data field and the "derived area definition data" are created.

Figure 33:
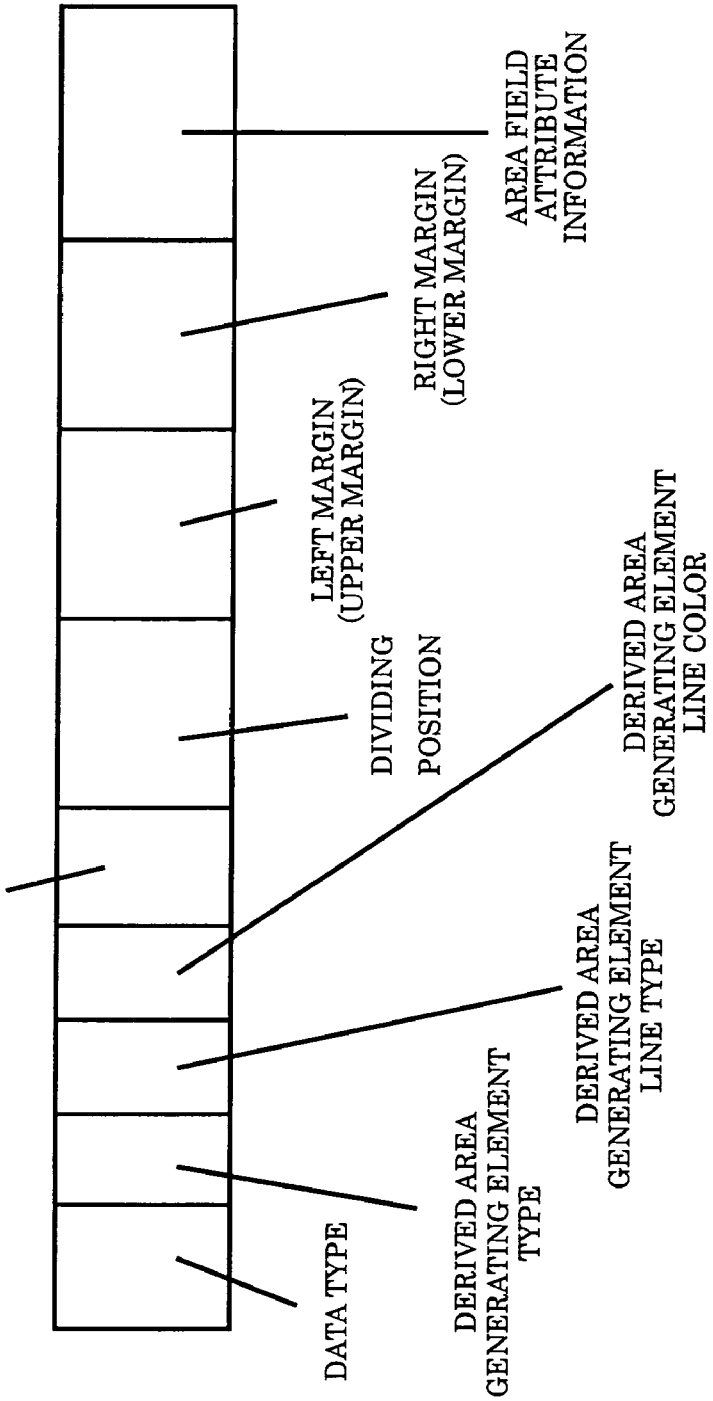
FIG. 33 is a diagram of a data format example of "derived area definition data" in the system of the embodiment.

The "derived area definition data" are registered with a "derived area generating element type" that is a type of the relevant "derived area generating element", a "direction classification" (downward direction or rightward direction) that is set in the cell, the "(derived area) dividing position" dividing the main area and the derived area, and the "both-side margin" (if the "direction classification" is the downward direction, left and right margins, and if the "direction classification" is the rightward direction, upper and lower margins) (FIG. 33). The address of the above "derived area generating element" is set in the "derived area definition data pointer" of the relevant item definition data.

If the user does not enter the "derived area generating element" in the composite field in this system, a predetermined default "derived area generating element" can automatically be created.

A horizontal to vertical dimension ratio is obtained for a cell configuring the composite field and is compared with a predetermined reference value to determine the "direction classification" (either "downward" or "rightward") of the derived area set in the relevant cell.

The "(derived area) dividing position" can be determined by preliminarily determining a reference value of a ratio of the "(derived area) dividing position" to a cell dimension in the dividing direction for each "direction classification". The "both-side margin" can also be determined by preliminarily determining a reference value of a ratio of a "both-side margin" value to the cell dimension in the direction orthogonal to the composite cell dividing direction.

The type of the "derived area generating element" is also determined by default and the "derived area definition data" can be created from the data determined as above. The generation of the "derived area generating element" symbol based on the "derived area definition data" will be described later.

Figure 34:
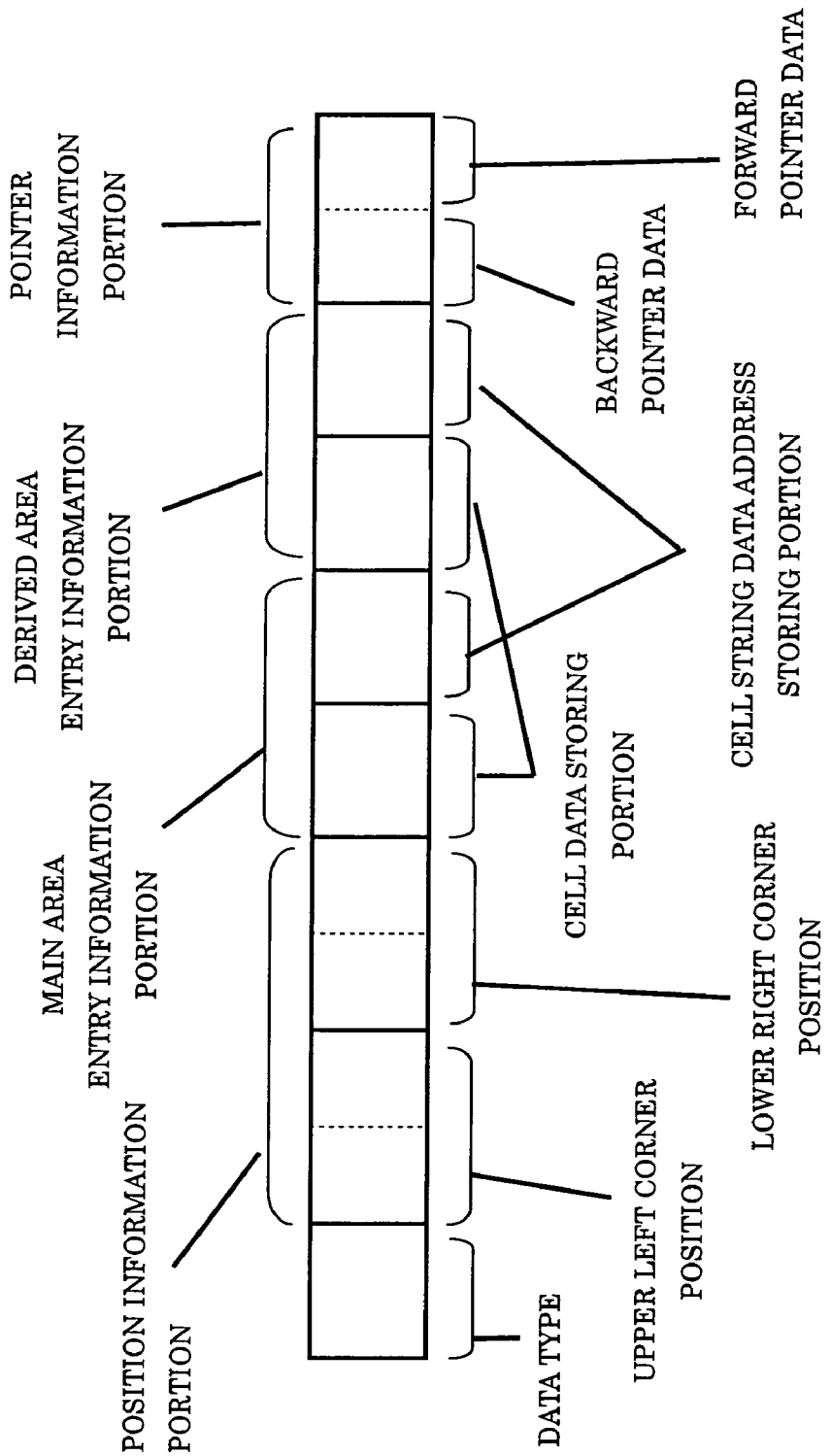
FIG. 34 is a diagram of a data format example of "cell data for composite cell" in the system of the embodiment.

Finally, the cell data are replaced with corresponding "cell data for composite cell" in each composite cell of the item definition data field and the total field with the composite cell defined (step B6). FIG. 34 shows the format of the "cell data for composite cell".

The replacement with the "cell data for composite cell" is first performed in each cell configuring the item definition data field with the composite cell defined. Cell data are picked up one by one from the relevant "cell data chain" and are replaced with the corresponding "cell data for composite cell". The relevant data of the original cell data are copied for the positional information and the pointer information of the new "cell data for composite cell". The address of the new "cell data for composite cell" is set again in the pointer information (pointing the original relevant cell data address) of the cell data located before and after the cell data currently replaced on the "cell data chain". The address of the "cell data for composite cell" at the beginning of the newly created "cell data chain" is also set in the "leading cell data address portion" of the relevant "item definition data". In this example, the replacement with the "cell data for composite cell" is performed for each cell configuring the data field of the item name "sales".

Each constituent total space cell is then picked up from all the total fields to determine whether the cell is the composite cell, and the replacement with the "cell data for composite cell" is performed.

Cell data of each constituent "total space cell" are picked up one by one from the "cell data chain" of each total field, and the "calculation target field" (field for entering data to be aggregated) is identified to determine whether the field is the "composite field". The "calculation target field" of one total space cell is a cell sequence belonging to an item definition data field of the same one item name as described above and is identified as a cell sequence adjacent to the relevant total space cell, which is established in the upper direction perpendicular to or the leftward direction perpendicular to the relevant total field.

If it is determined that each cell configuring the "calculation target field" of the "total space cell" is the composite cell, the "total space cell" must be the same composite cell (composite cell with the same difference condition and composite format) because of the basic nature of the table and, therefore, the "total space cell" is determined as the composite cell and the cell data thereof are replaced with the "cell data for composite cell".

The address of the "cell data for composite cell" at the beginning of the "cell data chain" created by the replacement with the "cell data for composite cell" is set in the "leading cell data address portion" of the relevant "total field definition data".

In this example, it is determined that the "calculation target fields" of the "total space cells" in the lowermost row and the rightmost column of the table belong to the data field of the item name "sales", which is the composite field, and the cell data thereof are switched to the "cell data for composite cell".

After the above "process of replacing with cell data for composite cell" (step B6) is performed for all the composite cells in the table format and the "composite field definition process" (step A3) is completed, the "field attribute definition process" (step A4) is then performed.

The document may be searched to check that a definition element registration term representing a field attribute is entered as the definition support entry information and is pulled out from one data field with a linking line. The field attribute information represented by the certain term is converted into appropriate data and is set in the "field attribute information" in the relevant "item definition data".

If the field attribute specification term is pulled out from a data field that is the composite field, it is further determined whether the pulled-out point of the linking line is included in the main area or the derived area. This may be performed by calculating the positions of the main area and the derived area on the document for each cell in the relevant data field and checking the positions against the relevant linking line pulled-out position. The positions of the main area and the derived area on the document can be obtained based on the positional information of the relevant composite cell, the dividing position information in the relevant "derived area definition data", and the both-side margin.

If the pulled-out position of the linking line is included in the main area, the field attribute specification term is considered to specify a field attribute of the main area of the relevant composite field, and if the position is included in the derived area, the term is considered to specify a field attribute of the derived area of the relevant composite field.

If the field attribute is specified for one of the main area and the derived area in the relevant data field, the field attribute of the other area may be determined in accordance with the above rule of the user operation.

The field attribute of the main area is set in the "field attribute information" in the relevant "item definition data", and the field attribute of the derived area is set in "area field attribute information" in the relevant "derived area definition data".

When the "field attribute definition process" (step A4) is terminated and all the definition data are generated for the relevant document, strings entered in all the cells of the table may be identified to set the string data addresses in a string data address portion of the relevant cell data. In the case of the composite cell, the strings entered in the main area and the derived area are identified to set the string data addresses in a main area string data address portion and a derived area string data address portion, respectively, of the relevant cell data.

The string entered in cells or the main area or derived area in the cell can be identified with a known method by repeatedly checking the position of the relevant cell or the relevant main area or derived area against the positional information of the string data of the document. The position of the main area or derived area in the composite cell of the document can be obtained with a method described later.

When all the definition data are generated for the document with the definition information input to the system, the results of the processes performed by the system, especially, the recognition processes (character/graphic recognition, correction of position/size, etc., and determination of definition contents) can be displayed and output to obtain confirmation from the user.

In this display output, contents of the document recognized by the system are displayed on the display screen 20a. To display the document image, the document image output unit 40 checks the document element data of each document accumulated in the document element data storing unit 38 against the character/graphic pattern dictionary 36 to identify a pattern of each document element and converts each pattern into image data in the bitmap format to generate image signals.

When the document contents of the form is displayed on the display screen 20a in accordance with the recognition process results of the system, the user can use the keyboard 12, the mouse 14, or the digitizer 15 to correct the document and input new entry information on the screen.

From the entry information input from the keyboard 12, a character/graphic element input unit 37 (FIG. 12) can generate the document element data without performing the character/graphic recognition process. With regard to the entry information input from the mouse 14 or the digitizer 15, the character/graphic element input unit 37 inputs the entry information and the character/graphic element recognizing unit 34 sequentially performs the character/graphic recognition process (for each piece of the input entry information) to generate the document element data.

When the definition information is input by the input apparatuses 12, 14, 15 of the screen input mode, the modification information of the definition systems can be set and input in the "definition information differentiation" mode (FIG. 7) of the "environment setting".

If the entry information is input from the screen under a desired definition sub-mode, the system can add the definition differentiation modification specified in the sub-mode to the input entry information and display the entry information on the screen. In this case, the definition information is recognized from the entry information with the relevant definition differentiation modification added.

If the entry information is input on the screen in this way, every time the entry information is input, the character/graphic element input unit 37 (FIG. 12) generates or changes the document element data corresponding to the entry information based on the input data. The entry information (string, symbol, graphic) input from the screen is represented in the form of the document element data (FIGS. 15 to 20) in the system as is the case with the image input from the sheet.

Since the entry information input as an image from the sheet and the entry information input as above from the screen are managed in the form of the same document element data in the system, arbitrary entry information can be input by either the image input or the screen input regardless of whether the original entry information (normal entry information) on the form or the definition support entry information additionally entered thereon.

After using the image scanner 10 to input the sheet with the document contents entered in advance, at the stage of the above output display for checking, the user can add, change, and cancel arbitrary entry information, especially, the definition support entry information with the keyboard 12, the mouse 14, or the digitizer 15 while checking the added definition contents.

Figure 35:
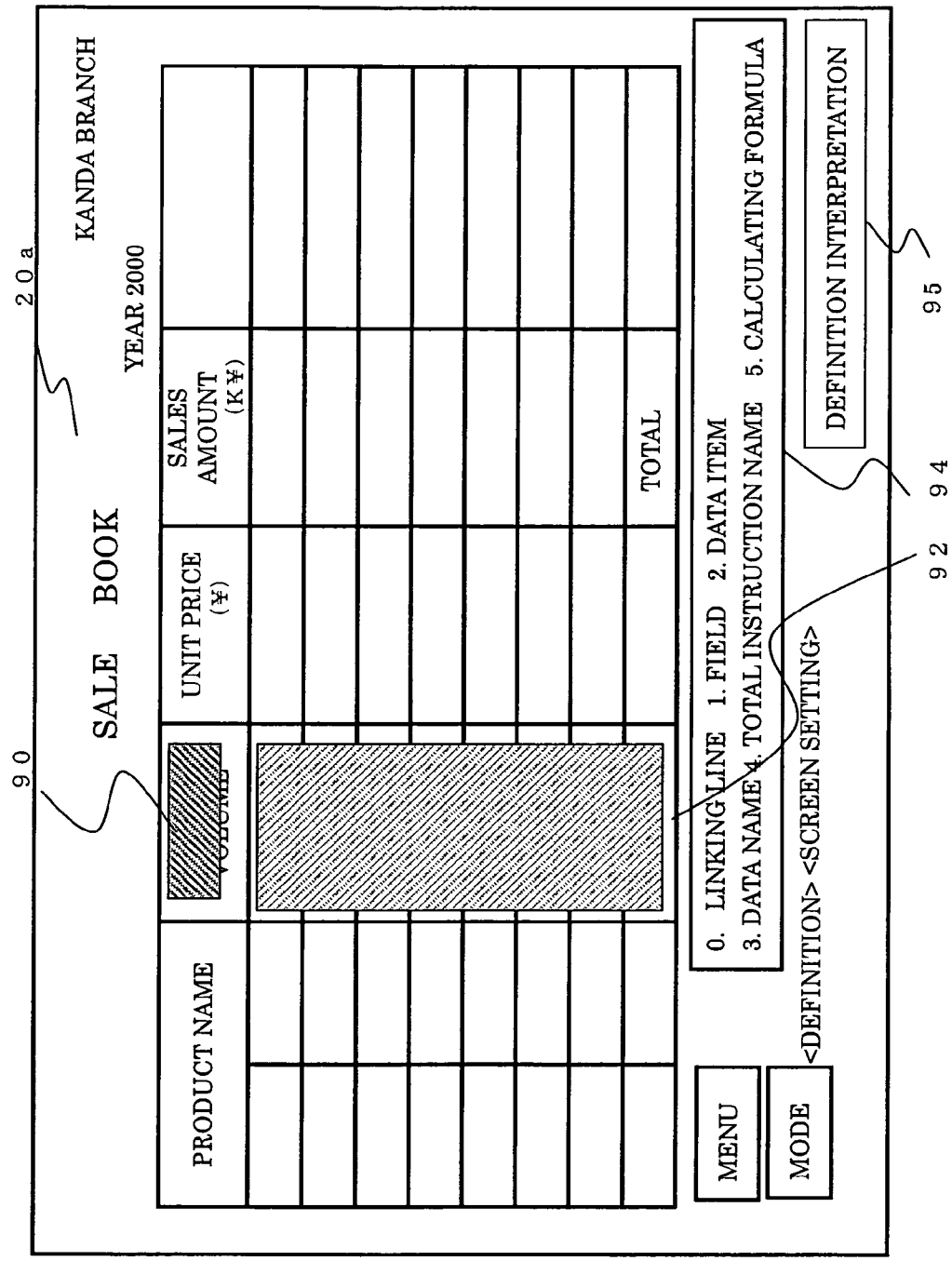
FIG. 35 is a diagram of a screen of definition in accordance with an instruction from a screen in the system of the embodiment.

Although the method of defining the form format with the derived area in the system of the embodiment has been described, various modifications can be achieved. For example, FIG. 35 shows an example of specifying definition contents on a screen. As shown in FIG. 35, desired definition information can be input by displaying document contents of an input form document on the display screen 20a and performing predetermined specification with the keyboard 12 or the mouse 14 while checking the input document contents.

When a "screen specification" button is specified under a "definition" mode to enter a "screen specification" sub-mode, a sub-screen 94 appears which lists various definition items such as "1.field", "2.data item", and "3.Data Name" at an appropriate position on the display screen 20a as shown in FIG. 35. If normal entry information "sales volume" is clicked and specified in the table format on the screen and the "2.data item" is then selected and specified on the sub-screen 94, the item name string "sales volume" is converted into "sales volume" defined as a data item, and the clicked display portion is changed to special display assigned to the "2.data item" at the same time.

Similarly, if an area 92 under the "sales volume" space is clicked and specified and the "1.field" is then specified on the sub-screen 94, the region 92 is defined as a field for entering "sales volume" data, and the clicked portion is changed to special display assigned to the "1.field" at the same time. The specific display assigned to the data item, field, etc., appears as defined in the "definition element/entry information reference table" shown in FIG. 5.

Although the "data item" location 90 and the "field" area 92 are selected and specified at the same time for convenience of description in FIG. 35, actually, one location is selected and specified by one click.

In the case of a total field, after clicking and specifying "total" that is the total space specification word, "4.registration word specification" may be specified on the sub-screen 94, or after clicking and specifying the relevant data field range, "1.field" may be specified.

In the case of the form format including the composite field in this example, after specifying the item definition data field and the total field with the above method, the "difference condition" is specified as follows.

A relevant "difference condition specification string" is entered as the definition support entry information at an appropriate position on the document with a known string input means through the character/graphic element input unit 37. A linking line correlating this "difference condition specification string" with a relevant data field is also entered as the definition support entry information. In the entered "difference condition specification string", after the item name portion ("year" in this example) is specified, "2.data item" is selected and specified from the sub-screen 94, and after the data name portion ("2000" in this example) is specified, "3.data name" is selected and specified from the sub-screen 94.

After the definition of the entire document is completed as above, when specifying the "definition interpretation" button on the screen, in response to the above user specification operation, the system repeatedly checks the click position on the screen against the positional information of the document element data retained in the document element data storing unit 38 to identify the relevant document element data. The required definition data are generated from the identified document element data and the specification on the sub-screen.

Figure 36:
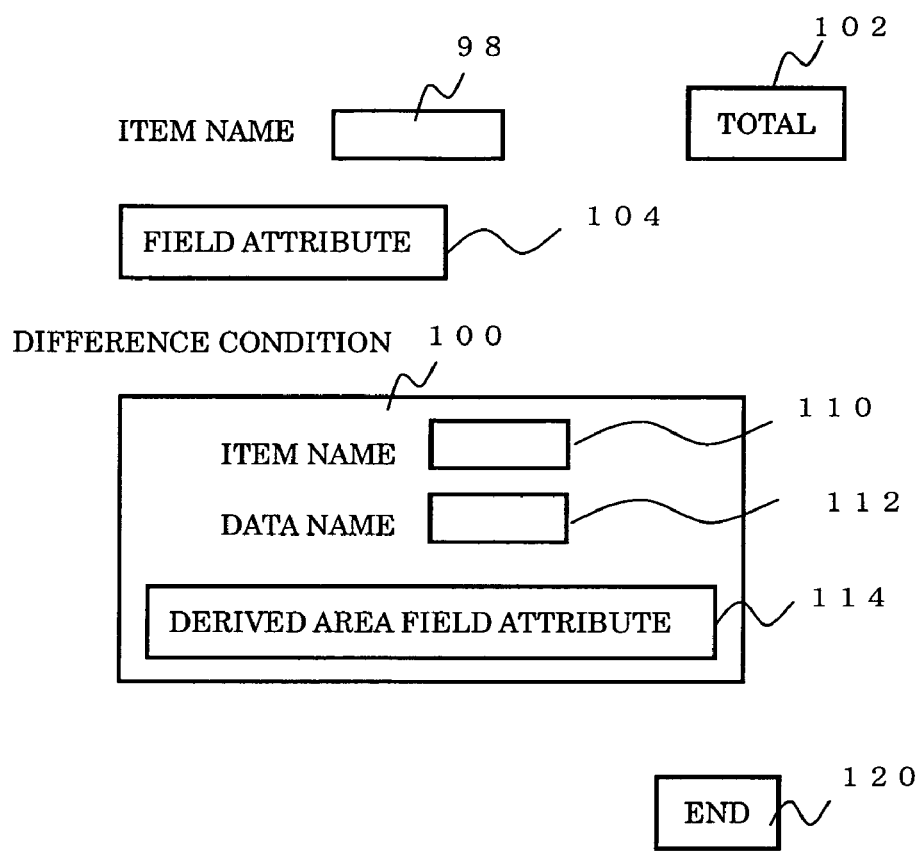
FIG. 36 is a diagram of an example of "item name specification menu" in the system of the embodiment.

The following method can also be used for a method of performing the definition from the screen. After clicking and specifying one data field on the screen, when "1.field" is specified on the sub-screen 94, an "item name specification menu" 96 shown in FIG. 36 is displayed on the screen.

The "item name specification menu" 96 includes a "total field instruction button" 102 and a "field attribute instruction space" 104 in addition to an "item name entry space" 98. A "difference condition specification space" 100 for the composite field is also included, which includes an "item name entry space" 110, a "data name entry space" 112, and a "derived area field attribute instruction space" 114 therein.

To perform the item definition of the specified data field, a relevant corresponding item name is entered only in the "item name entry space" 98. For example, if it is desired to specify a layout format as the field attribute, the "field attribute instruction space" 104 is specified; from a field attribute menu displayed in response to this specification, a required item (in this case, the layout format) is specified; and from a layout format menu subsequently displayed, the desired layout format (e.g., centering) may be specified.

In the case of the total field, after clicking and specifying a field range, the "total field instruction button" 102 in the "item name specification menu" 96 may be specified.

If the specified data field is a composite field, the item name and data name of the difference condition are entered in the "item name entry space" 110 and the "data name entry space" 112 in the "difference condition specification space" 100, respectively, in addition to the entry of the item name in the "item name entry space" 98. In this example, "year" and "2000" may be entered in the "item name entry space" 110 and the "data name entry space" 112, respectively, in the "difference condition specification space" 100.

Particularly, if it is desired to specify a field attribute of a derived area, the "derived area field attribute instruction space" 114 is specified and, from a field attribute menu displayed in response to this specification, a required item may be specified as above.

After performing the above entry and specification, when an "end" button 120 of the "item name specification menu" is clicked, the "item name specification menu" disappears and the next data field can be defined. After performing the above definition for all the data fields, when the "definition interpretation" button is specified on the screen, the system generates required definition data as is the case with the above process.

On the screen 20, the "difference condition specification string" is generated and displayed at an appropriate blank portion outside the table to represent the specification contents on the document. That is, in the generated and displayed "difference condition specification string", the item name string portion and the data name string portion are bracketed by the item name specification and data name specification definition element symbols "< >" and "[ ]", respectively, or are subjected to the special display corresponding to the definition items and are linked to the relevant data field with the linking line.

The system reads the item name and the data name from the generated "difference condition definition data", adds codes of the relevant definition element constituent symbols (in the case of the item name, "<" and ">") to the both sides of the character code sequence, and couples the item name code sequence and the data name code sequence to create the string code sequence corresponding to the entire "difference condition specification string".

The coupled string is provided with appropriate document positional information and format information (character size, pitch, etc.) to create the character data corresponding to the "difference condition specification string". The document position of the "difference condition specification string" may be an arbitrary position outside of the table where the string does not overlap the existing strings and ruled lines.

The linking line may then be generated to correlate the "difference condition specification string" with the relevant composite field as follows. That is, a circumscribing rectangle of the "difference condition specification string" is obtained and a side facing the relevant data field is obtained from the sides configuring the circumscribing rectangle.

This may be performed by determining the positional relationship of the circumscribing rectangle of the "difference condition specification string" and the relevant data field area and, for example, if the circumscribing rectangle is located on the "upper side" of the data field area, the lower edge side of the rectangle may be obtained. For example, the circumscribing rectangle is located on the "upper side" as well as the "left side", a circumscribing rectangle of the entire relevant table, and if located on the "upper side" of that circumscribing rectangle, the lower edge side of the rectangle may be obtained. In the case of other positional relationships, the side can be obtained in the same way.

A side of the relevant data field boundary is then obtained which runs parallel and faces to the side of the circumscribing rectangle to generate line segment data representing a line segment linking the both sides.

Description will then be made of an example of actually outputting and tabulating data on the summary table defined as above.

In this example, a data file of a data output source is assumed to be a file with the configuration shown in FIG. 37, for example. A record is a constituent element of the data file and is divided into category fields with item names of "branch name", "product category", "product code", "sales volume", "sales amount", "unit price", "profit", etc., storing the relevant data, as shown in FIG. 37. A group of the item names configuring the data output source data file must always includes the item names of the item definition defined on the table format of the output destination.

Figure 38:
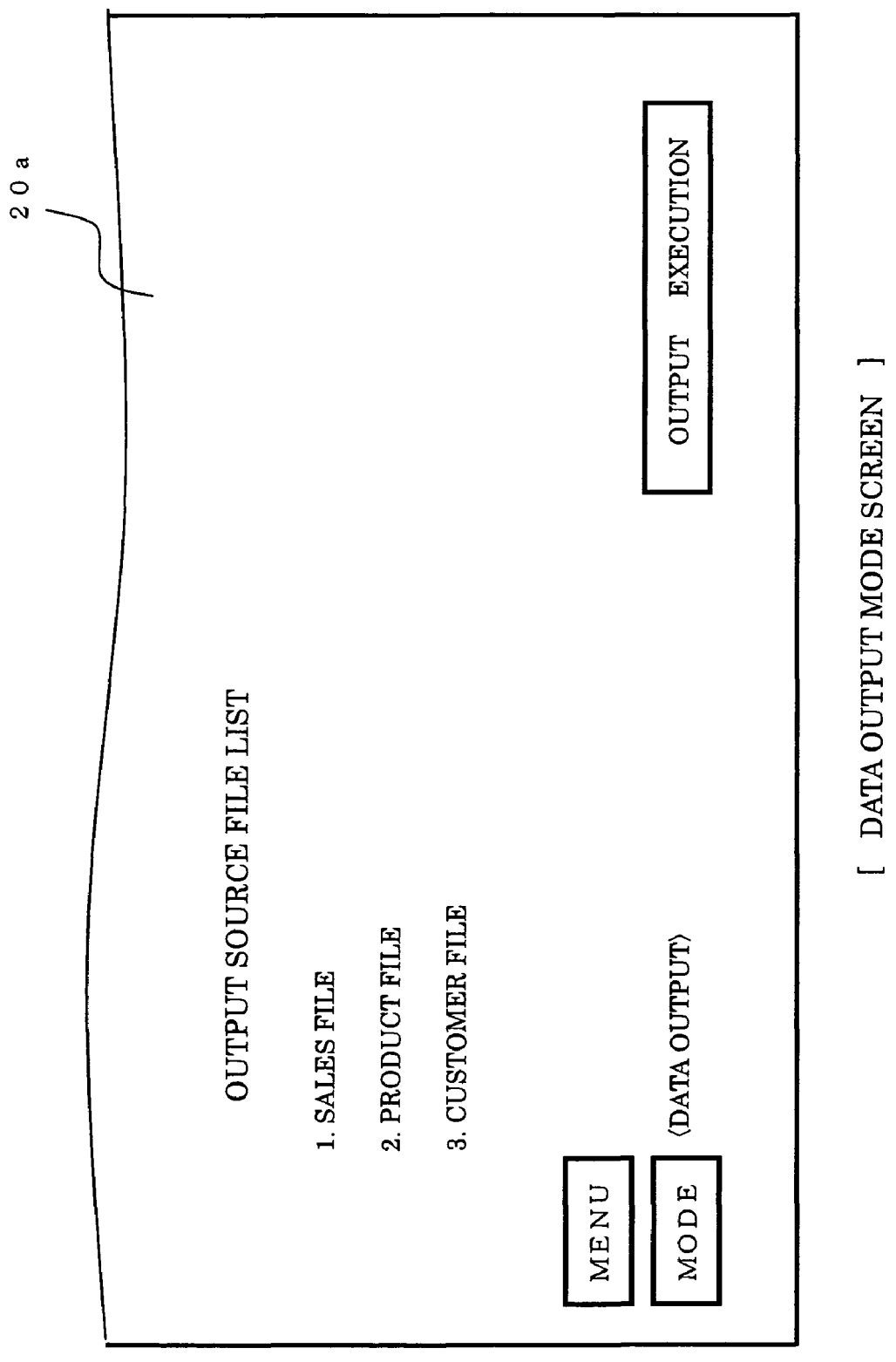
FIG. 38 is a diagram of an example of a data output mode screen in the system of the embodiment.

In the apparatus of the embodiment, a data output process is performed in a "data output mode". When the "mode" button is clicked on the display screen 20a to select "data output" from the mode list menu, the system is switched to the "data output" mode and the display screen 20a displays an "output source file list" screen shown in FIG. 38. The user may select "1.sales file", which is a desired output source, from a plurality of displayed data files and may click an "output execution" button.

In the system of the embodiment, a data output unit responsible for the "data output process" includes the CPU 24 that executes a predetermined conversion or process program and the internal memory 16 or the external memory 18 that stores the above program and associated data.

When the output source data file is specified, an "item name correlation screen" (not shown) is displayed on the screen. The "item name correlation screen" displays and arranges the item names defined in the summary table of the output destination and the item names defined in the output source data file in two rows, and the user can correlate the corresponding item names of the output destination and the output source with each other, for example, by using the mouse to perform an operation of linking the both item names on the screen.

After the correlation operation of the item names, when the "end" button is specified on the screen, the system creates an "item name correlation table" (not shown) that is a pair of rows arranging the corresponding item names of the output destination and the output source to start a "data output overall process".

Figure 39:
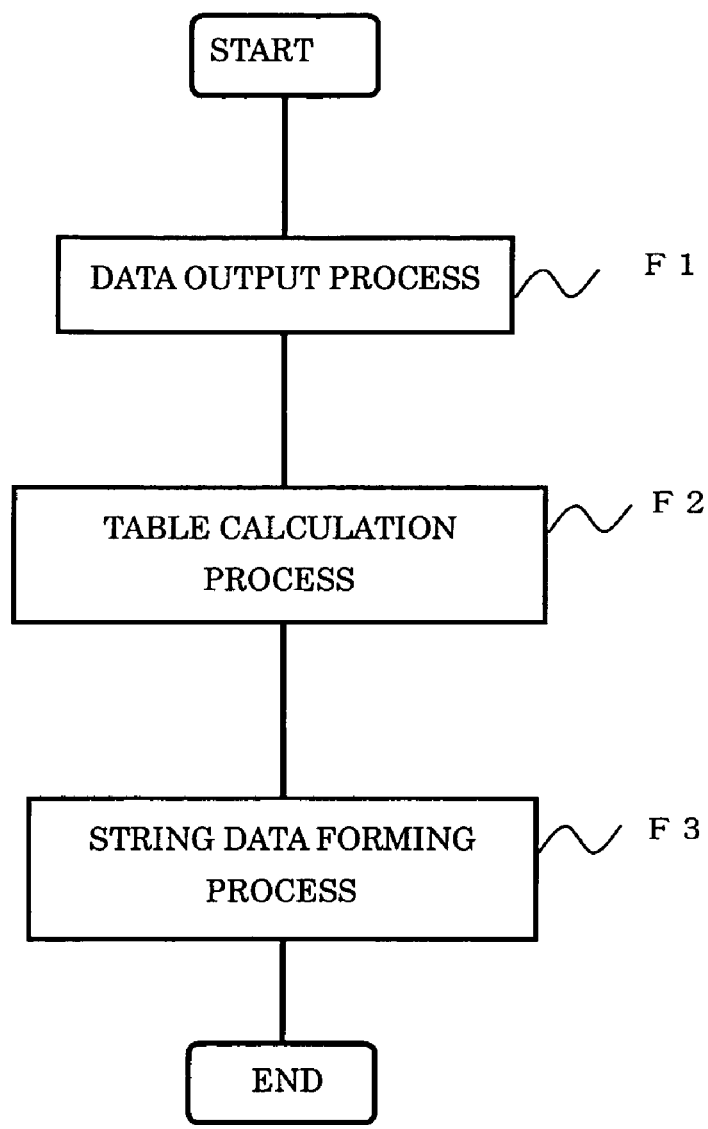
FIG. 39 is a diagram of a flowchart of "data output overall process" in the system of the embodiment.

FIG. 39 shows a flow of a procedure of the "data output overall process". First, the data of the output source file are output and tabulated in the cells of the summary table that is the output destination except the total space (data output process, step F1). In the summary table, the output and entered data in the cells are aggregated in the total space (table calculation process, step F2). Finally, all the data output and entered in the summary table are converted into relevant string data (string data forming process, step F3).

The "data output process" (step F1) is performed by picking up one record from each of the output destination summary table and the output source data file and by checking the records against each other. In this description, a group of cells including entered data configuring one record on the table format is particularly referred to as a "record cell sequence". The "record cell sequence" can be extracted in the table as follows.

Since the data are checked against each other in the system of the embodiment, the system of the embodiment is used on the premise of using unified data notation in the output destination summary table and the output source data file.

From the cells configuring the "item definition data fields" on the table format, a base of the "record cell sequence" is identified which is a group of cells with different definition item names on the same row of the table. For each cell of the identified "record cell sequence" base, a column including the cell is searched in the perpendicular direction in the table. If a cell is detected which belongs to a data field with a new definition item name different from the definition item name of the "record cell sequence" base in the column of the perpendicular direction, the detected cell is added to the cell group of the "record cell sequence".

If the item definition is set as the common condition outside the table, the containing cell can be added to the "record cell sequence". If the item definition outside the table does not have a cell containing data and the data name is directly correlated with the item name, the data name is added to the "record cell sequence" instead of the cell.

In this example, for the "record cell sequence", a combination of the cells of the item names "product name" and "sales" is detected from one of the second and lower rows of the table as the base of the "record cell sequence". The cell of the item name "branch" is added in the column in the direction perpendicular to the cell sequence of the base. The item definition data name "2001" of the item name "year" is added to the "record cell sequence".

If the derived area is established in one cell as in the case of this example, a record is picked up from one "record cell sequence" extracted as above for each of the main area and the derived area and is checked against a record picked up from the output source data file. In this description, the record acquired for the main area is referred to as a "main record", and the record acquired for the derived area is referred to as a "sub-record".

The "sub-record" is acquired by reference to the "difference condition definition data" to perform a relevant change in the "main record". For example, since the difference condition is that "the item name 'year' is '2000'" in this example, the "sub-record" can be acquired by changing the data of the item name "year" in the "main record" from "2001" to "2000".

Figure 40:
FIG. 40 is a diagram of an image of picking up of "record cell sequence" in the system of the embodiment.

In the case of the summary table format in this example, as shown in FIG. 40, for example, from the third row of the table, the third column of the table, and the common condition outside the table, the following main records are obtained:
  data "null" for the item name "sales";
  data "radio" for the item name "product";
  data "Osaka" for the item name "branch"; and
  data "2001" for the item name "year",
and the following sub-records are obtained:
  data "null" for the item name "sales";
  data "radio" for the item name "product";
  data "Osaka" for the item name "branch"; and
  data "2000" for the item name "year".

For example, for convenience of processing, the data output to the table format with such "composite cells" established is actually performed as follows. That is, one "record cell sequence" is picked up from the table with a method described later and, after all the record data of the output source data file are output and tabulated in the "main records" acquired from the "record cell sequence", all the record data of the output source data file are output and tabulated in the "sub records" acquired from the same record cell sequence. The above process is repeated for all the record cell sequences that can be picked up from the table format.

For example, the range of picking up the "record cell sequences" from the table format can be obtained as follows. Rows are sequentially picked up from the upper side and if a row is found which has two or more item definition data fields established, the next row is further picked up to confirm that the cells belonging to the same column of the both rows belong to the same item definition data field. If this is confirmed, it is determined that this row is a "pickup start row" of the "record cell sequence".

The rows are sequentially picked up downward and it is repeatedly determined for vertically adjacent rows that the cells belonging to the same column belong to the same item definition data field. With regard to rows where the cells belonging to the same column belong to the same item definition data field of the same item, a group of the rows is identified and is determined as a "record cell sequence pickup range row".

The "record cell sequence" may be picked up from one row of the table. When the cell with the same item name is repeated in one row as is the case of the data field of the item name "sales" in this example, cells are sequentially picked up from the group of the repeated cells and the "record cell sequence" including the picked up cell is identified from the relevant row. In this example, for example, in the second row of the table, a "record cell sequence" is picked up which consists of the cell with the item name "product" (in the first column) and the cell in the second column of a cell group with the item name "sales".

By searching the column (in this described example, the second column) including the cell picked up for the "record cell sequence" in the cell group with the same item name, a cell of a data field with a new item name is added (in this example, a cell of the data field with the item name "branch"). The required "record cell sequence" can be acquired by adding a data name of the item definition set outside the table as the common condition (in this example, data of the item name "year").

In the cell group having the cell with the same name repeated, a position (order) of the cell currently picked up for the "record cell sequence" in the cell group is referred to as an "in-row repeat cell position" in this description.

The above procedure can be repeated for rows after the "pickup start row" to pick up all the "record cell sequence" on the table. The order of picking up records from the output source data file can be an order determined for convenience of processing, for example, the order of file storage.

Figure 41:
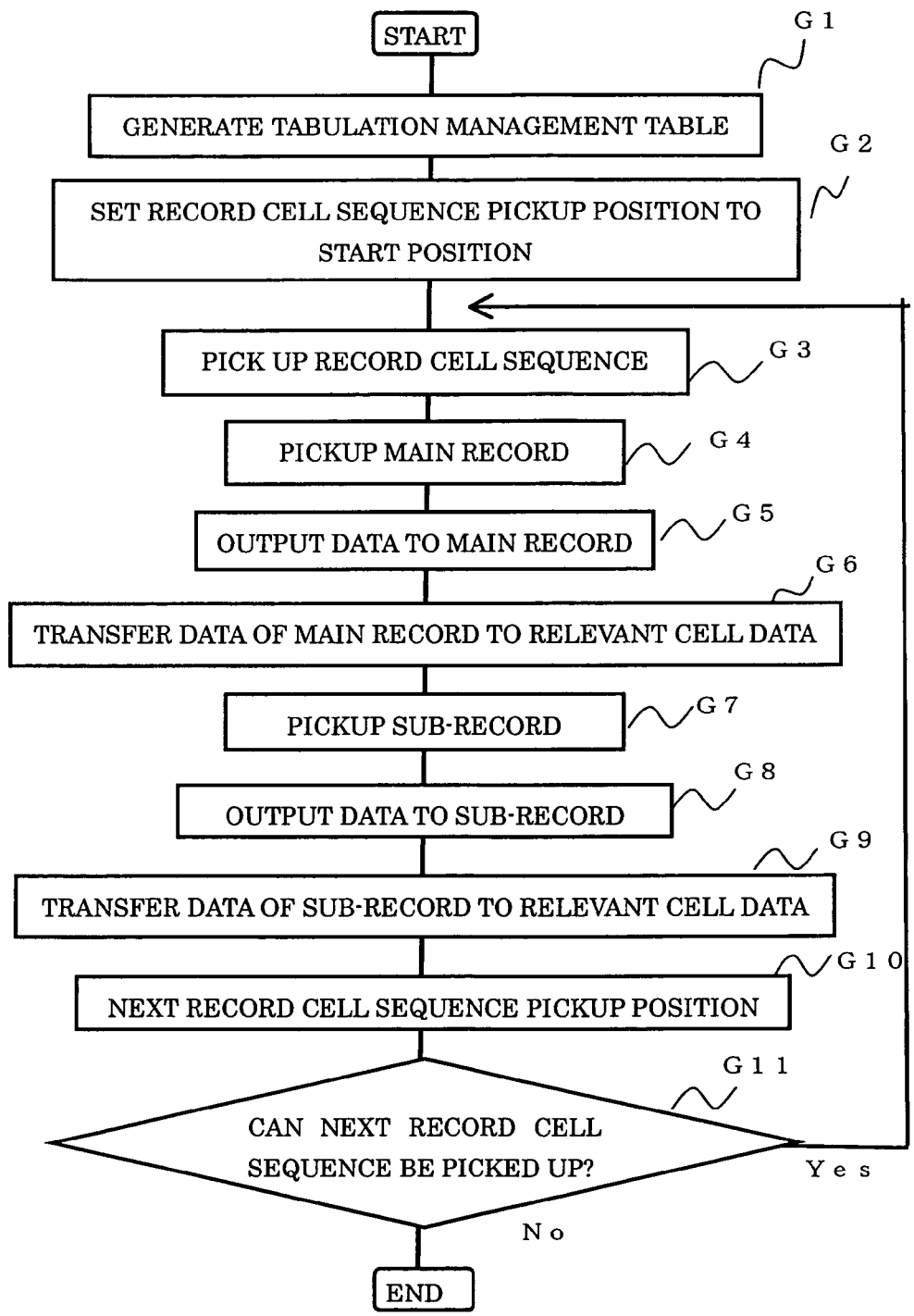
FIG. 41 is a diagram of a flowchart of a "data output process" in the system of the embodiment.

Details of the "data output process" (step F1) are described with reference to a procedure shown in FIG. 41. When the "data output process" is started, a tabulation management table is generated to set records picked up from the data output destination and the data output source thereon for cross reference (step G1). FIG. 42 shows a format of the tabulation management table.

An item name is set in each space of a first row of the tabulation management table. The entered item name is the definition item name of the item definition defined in the output destination summary table. The order of the entry may be a random order. In this example, the item names "sales", "product", "branch", and "year" are entered.

A "tabulation category" of the relevant item name is set in each space of a second row of the tabulation management table. In this example, the code "1" indicating the "tabulation numeric value" is set in the space corresponding to the item name "sales" (the space in the same column as the space with the item name "sales" entered), and the code "0" indicating the "non-tabulation numeric value" is set in other spaces of the second row of the tabulation management table.

A cell data address of each cell configuring the record cell sequence picked up from the output destination summary table is set in each space of a third row of the tabulation management table. In the case of the item definition without a cell such as the item definition of the item name "year" defined on the outside of the table in this example, the address of the relevant string data of the data name "2001" is set as is the case with the method of setting a data name in the item definition data. If the output destination is a data file, an address in a record of each category field is entered.

The entry data in each cell of the output destination summary table are set in each space of a fourth row of the tabulation management table. The relevant numeric data are entered in a space for an item having a tabulation numeric value, and the relevant text data or numeric data are set in a space for an item having a non-tabulation numeric value.

The data string entered in the cell or the main area or derived area of the composite cell can be identified by a known method of repeatedly checking the positional information of the string data on the document against the document position of the relevant cell or the relevant main area or derived area.

The document position of the relevant cell can be known as the positional information in the cell data read from the cell data address in the third row of the tabulation management table, and the document position of the main area or derived area therein can be obtained based on the positional information of the relevant composite cell (registered in the cell data), the dividing position information registered in the derived definition data, and the both-side margin information as described later.

From the string data of the entry string acquired as above, the text data of the code sequence thereof are picked up and, if the relevant item name is a numeric value (tabulation numeric value and non-tabulation numeric value), the text data of the digit sequence is converted into corresponding numeric data with a known method. The predetermined leading bits of this space are set to differentiate the numeric data and the text data and may be set in the relevant space of the fourth row of the tabulation management table.

In the case of the item definition without a cell containing data, as described above, the relevant string data may be picked up from the string data address of the relevant data name registered in the third row of the tabulation management table to acquire the relevant text data, which may be set in the relevant space of the fourth row of the tabulation management table.

If the output source is the table format, the cell data address of each cell configuring the table format is set in a fifth row of the tabulation management table. With reference to the above "item name correlation table", the cell data address is set in the same column where the corresponding item name of the output destination is set. If the output source is a data file as in this example, the address in the record of the category field may be entered for each item name in the record configuring the data file.

If the output source is a table format, the entry data in each cell configuring the table format are set in a sixth row of the tabulation management table. If the output source is a data file, the data in the record configuring the data file are set.

As is the case with the fourth row of the tabulation management table, the predetermined leading bits of this space are set to differentiate the numeric data and the text data. As is the case with the fifth row of the tabulation management table, with reference to the "item name correlation table", the data are set in the same column where the corresponding item name of the output destination is set.

For example, the tabulation management table can actually be implemented as follows. List data (not shown) are disposed for each entry space on the tabulation management table and the list data stores the data set in each entry space and has row-direction pointer data and column-direction pointer data such that the data of the adjacent data entry spaces can be sequentially tracked in the row direction or column direction.

A "main/sub flag" may be disposed in the tabulation management table and may be set to "0" if a main record is set or "1" if a sub-record is set such that the usage status can be determined After the tabulation management table is created, a "pickup position parameter" is set to a "start position" from the table of the output destination (step G2). For example, the "pickup position parameter" of the record cell sequence can be represented by a pair of a row position for picking up the record cell sequence and the above "in-row repeat cell position".

First, the main record is picked up from the leading record cell sequence and set in the relevant portion of the tabulation management table (step G3). That is, the cell data address of each cell configuring the relevant record cell sequence is set in the space of the relevant item in the third row of the tabulation management table.

The entry data in each cell are read in accordance with the set cell data and are set in the space of the relevant item in the fourth row of the tabulation management table. In the case of the composite cell, the data entered in the main area are set as the data configuring the main record in this case (step G4).

When the "tabulation category" of the item name is the "tabulation numeric value" in a cell of the output destination table, if data are originally entered in the cell, the relevant string data are converted into numeric data as above and are set in the relevant space in the fourth row of the tabulation management table.

When an item of a cell is the "tabulation numeric value" as is the case with the data field of the item name "sales" in this example, if data are not originally entered, a tabulation start value "0" is set in the relevant space in the fourth row of the tabulation management table.

Figure 43:
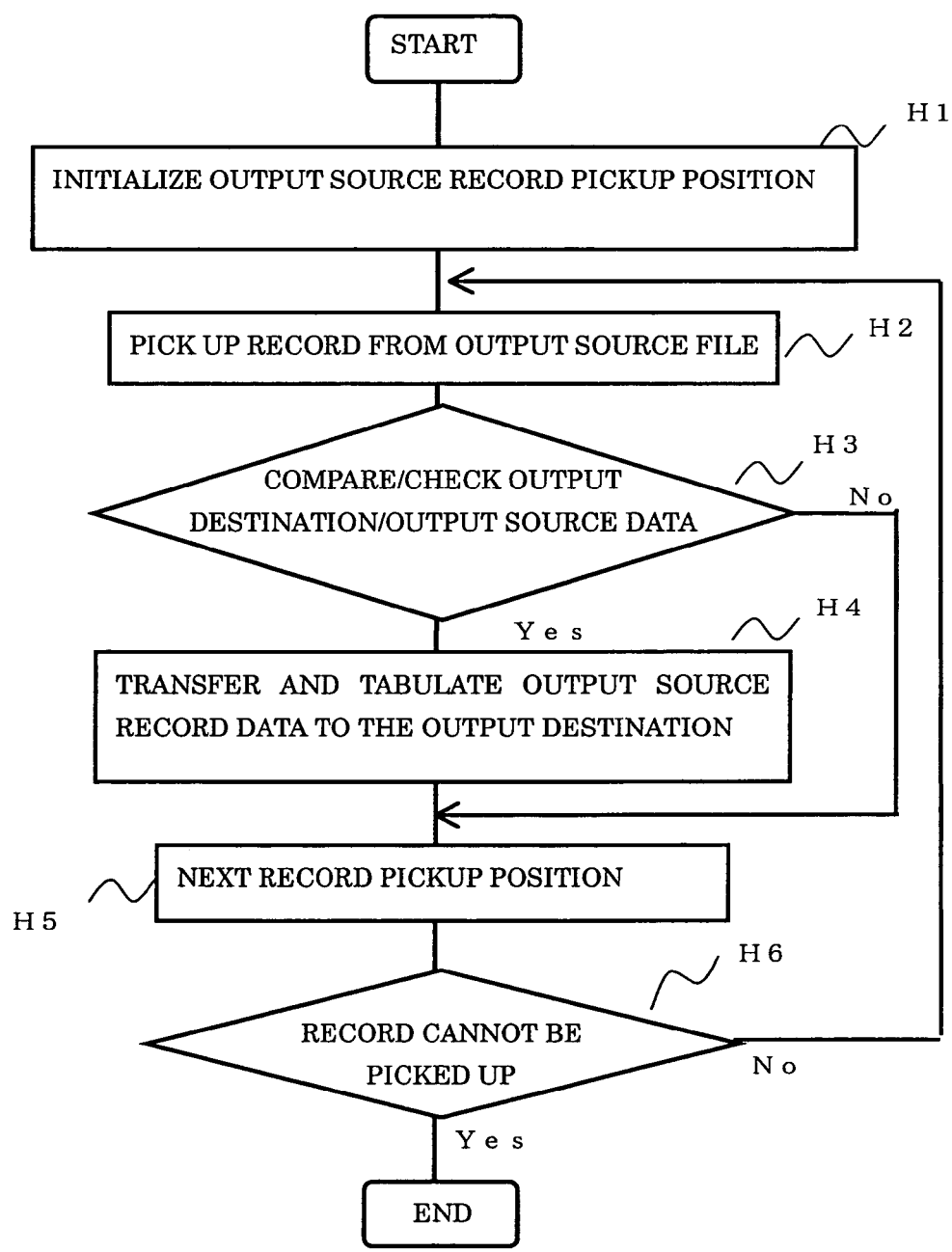
FIG. 43 is a diagram of a flowchart of a "main record (sub-record) data output process" in the system of the embodiment.

All the data of the output source data file are output and tabulated for the main records picked up from the output destination summary table and set in the tabulation management table (step G5). This procedure will be described with reference to FIG. 43.

Records are sequentially picked up one by one from the output source data file and an address in the record of each category field is set in the fifth row of the tabulation management table. The relevant data are read in accordance with the set address in the record and are set in the relevant space in the sixth row of the tabulation management table (step H2).

The constituent data of the record picked up from the output source data file are set in the entry space in the same column as the corresponding item name of the output destination summary table with reference to the above "item name correlation table" (created at the beginning of the overall output process).

A "numeric value/text differentiation flag" is added to the beginning of the data of the picked-up file record to indicate whether the data are "text data" or "numeric data", and the data are set in each space of the sixth row of the tabulation management table.

The order of picking up records from the output source data file can be an order determined for convenience of processing, for example, the order of file storage.

The output destination data and output source data having the same item name are compared and checked in the tabulation management table (step H3). The checking of the data is not performed for the item without data set in the relevant space in the fourth row of the tabulation management table storing the output destination data and the item of the "tabulation numeric value". The data are compared and checked by comparing the data of the fourth row and the sixth row in the relevant column on the tabulation management table.

If the output destination data and the output source data are the same in all the comparison items of the above checking, the output source data (in the sixth row) are added to the output destination data (in the fourth row). If an item of the "non-tabulation item" has no data originally set, the output source data (in the sixth row of the tabulation management table) are transferred to the relevant space (in the fourth row of the tabulation management table) of the output destination record (step H4).

In this example, if the data of the items "product", "branch", and "year" other than the item "sales" are the same, the data of the output source record of the item "sales" are added to the data of the output destination record. This addition is performed by adding the data of the sixth row to the data of the fourth row of the tabulation management table in the column of the item "sales" in the tabulation management table.

If data of at least one compared and checked item is not the same between the output destination data and the output source data, the addition and the transfer are not performed, and the procedure goes to a step of picking up the next record from the output source file (step H5).

After all the record data picked up from the output source data file are tabulated for the main records acquired from one record cell sequence picked up from the output destination table format as above, the data tabulated or transferred to the main records of the output destination of the tabulation management table are transferred to a "cell data storing portion" of the relevant cell of the output destination table format (step G6).

That is, the relevant data in the fourth row of the tabulation management table are transferred to the "cell data storing portion" of the cell data pointed from the cell data address in the third row of the tabulation management table. If data have no cell for entering the data and the item name and the data name are directly associated in the item definition as in the case of the data "2001" of the item "year" in this example, this storage process of data is not performed.

If the relevant cell is the "composite cell" as in this example, since the currently tabulated and transferred data are the data of the main record, the data are transferred to the "cell data storing portion" of a "main area entry information portion" of the relevant "composite cell data". The transferred data are stored in the "cell data storing portion" with the above "numeric value/text differentiation flag" added.

After the data are tabulated and transferred to the main record acquired from one record cell sequence of the output destination table format as above, the sub-record is created from the same record cell sequence as follows to transfer and tabulate the output source data.

The sub-record is created by reference to the item definition data configuring the output destination table format as above, by picking up the difference condition definition data pointed by the relevant item definition data in the case of the "composite category", and by reference to the difference condition definition data to change the main record picked up from the same record cell sequence.

Since the corresponding main record is already set in the tabulation management table, the sub-record can be acquired by replacing only a portion of the set data, which is specified by the difference condition (step G7). In this example, since the difference condition indicates that the data of the item name "year" is "2000", the data of the item "year" may be switched from already set "2000" to "2001" in the fourth row of the tabulation management table.

All the data of the output source data file are tabulated and transferred to the sub-records picked up in the tabulation management table as is the case with the main records (step G8). As in the case of the main records, the tabulation and the transfer are performed by repeating the process of picking up the records one by one from the output data file to the sixth row of the tabulation management table to compare and check the record against the data in the fourth row of the tabulation management table.

After all the records of the output source file are transferred and tabulated in the sub-records (the fourth row of the tabulation management table) of the output destination table, the records are transferred and tabulated in the cell data of the output destination table format as is the case with the main records (step G9). That is, the data in the fourth row of the tabulation management table are set in the "cell data storing portion" of the "derived area entry information portion" in the cell data pointed from the cell data address in the third row of the tabulation management table. Of course, the transfer and tabulation of the sub-record data are performed only for the data of the items in the "composite category".

When the above process is completed for one record cell sequence picked up from the output destination table, the "next record cell sequence" is picked up from the output destination table to repeat the same process. The "next record cell sequence" in the output destination table can be acquired by replacing the cell in the range of repeating the cell with the same name among the constituent cells of the picked up record cell sequence (in this example, the cell configuring the data field of the item "sales") with the next adjacent cell in the repeating range.

After all the record cell sequences are picked up in one row, the leading cell is selected from cells of the repeated item in the repeating range in the next row and a record cell sequence may be picked up to perform the same procedure.

When records are set in the tabulation management table for the second time or later, even if data are not originally entered in the cell of the document, stored data are set as long as the cell is the non-tabulation item and the stored data exist in the "data storing portion" in the relevant cell data. With regard to the data of the common condition outside the table (in this example, "2001"), the setting may be skipped when main records are set for the second time or later.

In the process of storing the record tabulated on the tabulation management table in the "cell data storing portion" of the cell data again, if the data of the same cell are repeatedly stored in the cell data, this storage may be skipped in the second time or later in the case of the data of the non-tabulation item. The storage in the cell data may be skipped for the data of the common condition outside the table.

The above tabulation is completed for all the record cell sequence picked up from the output destination, a "table calculation process" is performed to perform calculation specified in a calculation result space defined in the table for these output data and the calculation result is entered in the calculation result space (step F2).

In this example, in the "table calculation process", predetermined aggregation is performed for the total space cells in the data field subjected to the above "total definition". In this example, the predetermined aggregation is performed for the total space cells set in the lowermost row and the rightmost row of the table.

In the "table calculation process", the cell data chains of the "total field definition data" are sequentially tracked to pick up the total space cells configuring the cell data chains and the calculation target fields thereof are identified. As described above, the calculation target field corresponding to the total space cell is a group of a plurality of cells belonging to one item definition data field, is identified in the upper direction or the leftward direction perpendicular to the relevant total definition data field, and is detected as a cell group in the same column or the same row as the relevant total space cell. If a cell group belonging to a plurality of item definition data fields is detected as satisfying the layout condition of the calculation target field, a cell group in proximity to the relevant total space cell may be selected.

After reading the entry data in all the cells configuring the calculation target field, the read data are added and the result of the addition is entered in the relevant total space cell. The calculation target field can be acquired by sequentially tracking the cell data chains created for the item definition data fields and by selecting a group of cells satisfying the above configuration condition of the calculation target field from the cell data chains.

The entry data in the cells configuring the calculation target field may be read from a cell data portion storing portion of the relevant cell data. The relevant addition result is stored in the cell data portion storing portion in the cell data of the total space cell.

If "average result entry space field definition data" are defined instead of the "total field definition data", after reading the entry data in all the cells configuring the calculation target field in the same way, an average value of the read data may be calculated and the calculation result may be entered in the relevant calculation result space.

If the cells configuring the calculation target field are the composite cells as in this example, the total space cell is the composite cell having the same difference condition and derived area definition data, and the cell data are already switched to the composite cell data.

The data stored in the "cell data storing portion" of the "main area entry information portion" in the relevant cell data are read and added for the composite cells configuring the relevant calculation target field and the result is stored in the "cell data storing portion" of the "main area entry information portion" in the cell data of the total space cell as well.

Similarly, the data stored in the "cell data storing portion" of the "derived area entry information portion" in the relevant cell data are read and added for the composite cells configuring the relevant calculation target field and the result is stored in the "cell data storing portion" of the "derived area entry information portion" in the cell data of the "total space cell".

After the "table calculation process" is completed, a "string data forming process" is performed (step F3). The data stored in the "cell data storing portion" in the relevant cell data are picked up for each cell with output data to create corresponding string data. This process is performed for the data in the cells configuring all the data fields having the item definition and the total definition, except the data of the non-tabulation item originally entered in the output destination table format.

If the data string originally entered in the output destination table format is the data of the non-tabulation item, this "string data forming process" is not performed. The data string originally entered in the table format can be detected by repeatedly checking the positional information of the relevant cell against the positional information of the string data.

If the data string originally entered is the data of the tabulation item, the string data are generated for the newly tabulated data, and the relevant string data of the originally entered data are deleted.

The string data representing the cell entry data are generated as follows. If the data picked up from the "cell data storing portion" in the cell data are numeric data, the numeric data are converted with a known method into text data. As a result, for example, data representing only a magnitude of a numeric value "396" as numeric value are converted into text data that are a series of characters "3", "9", and "6".

The entry destination (positional information) of the relevant string data can be determined from the positional information of the relevant cell and a cell layout format as follows. The cell layout format can be read from field attribute information associated with the item definition data to which the relevant cell belongs. In the case of the composite cell, as described above, the layout format of the main area can be read from the field attribute information associated with the item definition data. The layout format of the derived area can be read from the field attribute information associated with the derived area definition data.

A rectangle circumscribing the string is obtained from the size and pitch of the characters registered in the format information in the item definition data to which the relevant cell belongs, and the position of the circumscribing rectangle in the cell is obtained by reference to the cell layout format information (e.g., specification of right-aligned, centering, etc.).

The document position of the generated string can be obtained by reference to the document position (set in the relevant cell data) of the relevant cell to obtain the document position of the relevant circumscribing rectangle.

The relevant string data are generated from the above text data and positional information of the string. The generated string data are stored in the document element data storing unit 38 along with other document element data originally entered in the relevant form. The address of the generated string data may be set in the cell string data address portion in the corresponding cell data (FIG. 20).

In the case of the composite cell, two data entered in the "(derived area) dividing position" information and the "both-side margin value" are read from the derived area definition data defined for the relevant composite field, and a "data string entry range" is obtained for each of the main area and the derived area from both the above information and the overall positional information of the relevant composite cell. FIG. 32 shows a relationship of the "data string entry ranges", the "dividing position", and the "both-side margin value".

In the case of the composite cell in the total field, the corresponding calculation target field is identified to identify the relevant derived area definition data from the item definition data defined thereon, and the "data string entry range" can be obtained for each of the main area and the derived area in the same way.

The area entry data picked up from the relevant cell data storing portion are picked up for each of the main area and the derived area to refer to the "data string entry range" thereof, and the positional information of the relevant string can be obtained to acquire string data as is the case with the above normal cell.

The area layout formats of the main area and derived area referred in this case can be known from the field attribute information associated with the relevant item definition data and derived area definition data.

The created string data are stored in the document element data storing unit 38 along with other document element data originally entered in the relevant form as is the case with the normal cell.

The addresses of the string data generated for the main area and the sub-area may be set in a "main area cell string data address storing portion" and a "derived area cell string data address storing portion", respectively, in the composite cell data.

When it is checked at this point whether the relevant derived area generating element is entered in each composite cell in the table format, if the derived area generating element is not entered, the relevant derived area generating symbol is newly generated and entered.

That is, the composite cells are picked up one by one from the item definition data field with the composite cells defined, and all characters, symbols, etc., entered on the derived area side from the "derived area dividing position" are identified to determined whether a combination of the derived area generating elements of the relevant "type" is detected from the characters, symbols, etc. The "type" of the relevant derived area generating element can be known from the relevant "derived area definition data", and the symbol codes configuring the derived area generating element and the entry order thereof are known from the "derived area generating element dictionary" through the currently acquired "type".

If the combination of the symbols configuring the derived area generating element of the relevant "type" is detected in the derived area, it is also checked that the detected derived area generating symbols are entered within a certain threshold of a predetermined entry position in the derived area. The predetermined entry position of the derived area generating symbol can be acquired by reference to the "dividing position" information and the "both-side margin" information registered in the derived area definition data.

If the relevant derived area generating symbol is not entered in the predetermined position in the cell, the relevant derived area generating symbol is generated and entered as follows. With regard to the symbols configuring the derived area generating element to be entered, the codes and entry orders thereof are identified by reference to the "derived area generating element dictionary".

The cell entry position of the derived area generating symbol is obtained by reference to the "dividing position" information and the "both-side margin" information registered in the "derived area definition data". The document positional information of the constituent symbols of the derived area generating element can be obtained by reference to the document positional information (registered in the cell data) of the entire relevant composite cell to acquire the corresponding document element data (character data). The character data representing the derived area generating symbol created as above are also stored in the document element data storing unit 38 along with other document element data originally entered in the relevant form.

It is also checked for the composite cell in the total field whether the relevant derived cell generating symbol is entered within a predetermined position, and if the derived cell generating element is not entered, the relevant derived cell generating symbol is generated and entered. The type and entry position of the derived cell generating symbol entered in the total field can be known from the "derived area definition data" of the item definition data field to which the relevant tabulation target field belongs.

The document image output unit 40 reads all the document element data corresponding to the (black) normal entry information from the document element data storing unit 38, checks the read document element data against the character/graphic pattern dictionary 36 to identify a pattern of each document element, and uses a deployed program to convert each pattern into image data in the bitmap format, and the intended form output document shown in FIG. 10 can be displayed on the display screen 20*a*, for example. The document can also be printed out by the printing apparatus 22 or faxed by the communicating apparatus 24.

The system of the embodiment can be used to pick up a data record from the table format with the composite field. For example, after the definition shown in FIG. 11 is added to the table shown in FIG. 10, if the "definition" mode is selected on the display screen 20*a* and the "definition interpretation" button is selected and specified, the item definition data, the difference condition definition data, and the derived area definition data are created as in the above case.

If the "mode" button is specified on the display screen 20*a* and a "data record creation" sub-mode is specified on the displayed "main mode list menu", the "record cell sequences" can sequentially be picked up from the table in accordance with the above method.

The entered string in each cell configuring the "record cell sequence" is identified as above and is converted into the relevant numeric data or text data with reference to the "tabulation category" of the item definition data defined for each cell. The entered strings in the main area and the derived area of the composite cell in the "record cell sequence" can be identified by reference to the relevant cell data and the derived area definition data to obtain the relevant area range as above and by repeatedly checking the range against the positional information of each string on the document. The identified entered strings in the main area and the derived area are also converted into the relevant numeric data or text data.

A "data record" is created as a combination of data picked up from the "record cell sequence" as above. If a composite cell is included in the "record cell sequence" as in this example, the data picked up from the main area are selected to create the "main record", and the data picked up from the derived area are selected to create the "sub-record".

The data configuring the above picked-up "data record" are correlated with the "corresponding item name" and the "tabulation category" and can be converted and used in various physical formats.

A tabulation format shown in FIG. 44 can also be used by changing and adding a portion of the system of the embodiment. The example of usage will hereinafter be described.

In the tabulation format shown in FIG. 44, a derived area is disposed in each cell configuring the data field of the item name "sales" as is the case with the above table format of FIG. 11, and data entered in the derived area are data of an item name "profit", which is different from the corresponding item name "sales" of the relevant data field. In this table format, the data field of the item name "sales" can be considered as a composite field where "the item name 'profit' is defined" as a difference condition.

In this description, if a difference condition of the composite field has an item name different from the corresponding item name of the relevant data field in this example, the difference condition is referred to as the "item name style", and if a difference condition is data of the item name of the common condition as in the above case of FIG. 11, the difference condition is referred to as the "data name style". If the difference condition is the "item name style", this item name acting as a difference condition is referred to as a "difference item name".

As shown in FIG. 45, the definition of the table format is performed as is the case with the above table format of FIG. 11 except the definition of the difference condition. In the definition of the difference condition, after the difference item name string "profit" is entered in an appropriate blank outside the table as the (blue) definition support entry information and the "item name" is specified with the definition element symbol "< >" for the "item name specification", the string is linked to the relevant data field with a linking line. If the difference condition is the "item name style" as in this example, a definition element symbol " " indicating the "difference item name" is added to the right shoulder portion of the difference condition string to differentiate from the string of the corresponding item name of the relevant data field.

The definition element symbol " " for the "difference condition specification" is preliminarily registered in the definition element identification data storing unit (definition element dictionary) 48 in the same way as other definition elements.

Since the item name "profit" is a "tabulation numeric value item", the definition element symbol "○" indicating the "tabulation numeric value item" is also added to the right shoulder portion (FIG. 45).

After the table format with the above definition is input to the system and the above predetermined instruction is provided, the same process is performed as is the case with the above table format of FIG. 11 until the item definition data are created.

At the "item definition data generating" process (step A1), an item name is specified for each data field and a string correlated to the relevant field with a linking line is searched as is the case with the above table format of FIG. 11. It is detected for the searched string of the item name definition whether the definition element symbol " " for the "difference condition specification" is added to the predetermined position, and if the definition element symbol " " for the "difference condition specification" is not added, it is determined that the string for the item name specification is the corresponding item name of the relevant data field.

On the other hand, if the definition element symbol " " for the "difference condition specification" is added to all the strings for the item name specification correlated with the relevant data field by the linking lines, the string for the item name specification is identified, which is located at the above "specific adjacent position" for the relevant data field, and is considered as the corresponding item name of the relevant data field.

In this example, with regard to a data field correlated by the linking lines with two strings "sales" and "profit" specified as item names, it is determined that the corresponding item name of the relevant data field is the item name specification string "sales" without the definition element symbol " " for the "difference condition specification" added, and the relevant string data address is set in the "item name string data address" portion of the relevant "item definition data".

Since the definition element symbol "○" indicating the "tabulation numeric value item" is searched at the right shoulder portion of the string "sales" determined as the corresponding item name, the relevant code "1" is set in the "tabulation category" portion of the relevant "item definition data".

The same "item definition data" are created for other data fields as is the case with the above table format of FIG. 11.

In the "calculation result space definition data generating" process (step A2) following the "item definition data generating" process (step A1), the same process is performed as is the case with the above table format of FIG. 11.

In the "composite field definition" process (step A3) following the "calculation result space definition data generating" process (step A2), the beginning step thereof, i.e., the "composite field determining" process (step B1) in this example is performed as follows.

For each data field, a string is searched which is correlated by the linking line and which has a defined format of the difference condition as in the example of the above table format of FIG. 11. That is, A string correlated by the linking line is identified for each data field and it is determined that the string has the above pair format of an item name specification string and a data name specification string as the "data name style" difference condition specification string.

If the string defined in the "data name style" format is searched, the above "data name style" difference condition is determined for this string.

If no searched string satisfies the condition for determining the above "data name style" difference condition, among the strings correlated with the relevant data field by the linking lines, a string is searched that is specified as an item name for the "item name style" difference condition specification string and that has the definition element symbol " " added for the "difference condition specification".

If a string satisfying the above condition is searched and the string is different from the corresponding item name of the relevant data field, it is determined that the relevant data field is a composite field defined with the "item name style" difference condition.

In this example, since the searched string "profit" is specified as an item name for the data field of the corresponding item name "sales" and has the definition element symbol " " added for the "difference condition specification", it is determined that the data field of the corresponding item name "sales" is a composite field defined with the "item name style" difference condition "profit".

When it is determined that one item definition data field is a composite field defined with the "item name style" difference condition, the code "1" indicating the composite field is set in the "composite category" portion of the relevant item definition data as in the case of using the above table format of FIG. 11 (step B2) to create the "difference condition definition data" and the address thereof is set in the "difference condition definition data pointer" portion of the item definition data (step B4). The code "0" is set in a "difference condition type" portion of the "difference condition definition data" to indicate that the difference condition is the "item name style", and the relevant item name code sequence is set in the "item name text data" portion.

Since the definition element symbol "○" indicating the "tabulation item" is also searched at the right shoulder portion of the string "profit" determined as the difference item name, the relevant code "1" is set in the "item name tabulation category" portion of the "difference condition definition data".

In the remaining "composite field definition process", the "derived area definition data generating" process (step B5) and the process of "replacing cell data with cell data for composite cell" (step B6) are performed as in the case of using the above table format of FIG. 11.

Description will then be made of an example of performing definition of the table format of FIG. 44 with the use of the sub-screen 94. The item definition of the normal data field can be performed as is the case with the above table format of FIG. 11. That is, after clicking and specifying each data field on the screen, the "1.field" is specified on the sub-screen 94; the relevant corresponding item name is entered only in the "item name entry space" 98 on the "item name specification menu" (FIG. 36) subsequently displayed; and the "end" button 120 may be clicked.

If the specified data field is a composite field, the corresponding item name ("sales" in this example) is entered in the "item name entry space" 98 on the "item name specification menu" displayed by the above operation; the difference item name ("profit" in this example) is entered only in the "item name entry space" 110 of the "difference condition specification space" 100; and the "end" button 120 may be clicked on the "item name specification menu".

The definition of the total field can be performed as in the case with the above table format of FIG. 11.

When the "definition interpretation" button 95 on the display screen a is specified after the above operation is performed for each data field of the table format, the system creates the relevant item definition data, the difference condition definition data, and the derived area definition data on the memory 16 in accordance with the above process.

To display contents specified by the user on the screen, the difference condition string "profit" and a linking line to the relevant data field are also generated and displayed with the above method in an appropriate blank portion outside the table in this example.

Description will then be made of a process performed at the time of data output to the table format shown in FIG. 44. The example of the output source data file is the same as the explanatory example for the above table format of FIG. 11.

If the difference condition is the "item name type" as in this case, since data configuring the main record and the sub-record acquired from the same record cell sequence are common except data in the composite cells, a difference data portion included in the sub-record for the relevant main record may be added to the main record on the tabulation management table and the output source data may be transferred and tabulated for the merged record to perform data output to the main record and the sub-record at the same time.

In the "data output process" (step F1) included in the processes relating to the data output, a "difference condition type" is determined for the composite field in the output table format and, if the type is the "item name style" as in this example, the process branches into the following procedure. The "difference condition type" is determined by picking up the difference condition definition data pointed from the item definition data with the "composite category" data set to the code ("1") corresponding to the "composite field" and by referring to the "difference condition data" thereof.

A "difference item name" is read by reference to the relevant "difference condition definition data" and is added to the first row of the tabulation management table. The "item name tabulation category" corresponding to this "difference item name" is read from the difference condition definition data and is set in the relevant space in the second row of the tabulation management table.

In this example, the difference item name "profit" is additionally set in the first row of the tabulation management table and the code "1" corresponding to the "tabulation item" is set in the relevant space in the second row of the tabulation management table.

In the tabulation management table, a column position of the added difference item name is stored as "difference item column position data" at a certain location of the memory 16.

A record cell sequence is picked up from the beginning of the table as is the case with the above table format of FIG. 11; the cell data addresses of the constituent cells are set in the third row of the tabulation management table; and the constituent data of the main record are set in the relevant space of the fourth row of the tabulation management table.

The cell address entered in the relevant space of the "difference item name" of the third row of the tabulation management table is that of the cell in the record cell sequence currently picked up, which belongs to the composite field having the "difference item name" as the difference condition. That is, the cell address entered in the column of the corresponding item name of the composite field is copied in the third row of the tabulation management table.

In this example, the value entered in the relevant space of the "difference item name" of "profit" in the third row of the tabulation management table is the same as the cell data address entered in the column of the definition item name "sales" of the composite field having the "difference item name" as the difference condition.

The relevant data of the "difference item name" added to the tabulation management table are set in the relevant space in the fourth row of the tabulation management table. That is, the data set in the space are the data entered in the derived area of the cell pointed from the relevant cell address in the third row of the tabulation management table.

The data string entered in the derived area can be identified by checking the position of the relevant area against the positional information of the strings on the document as described above. The identified data string is converted into text data or numeric data with the above method and is set in the relevant space in the fourth row of the tabulation management table.

If the "difference item name" is a tabulation item and data are not originally entered in the derived area, a numeric value "0" is set as a tabulation initial value as is the case with FIG. 11.

In this example, the relevant data of the "difference item name" of "profit" are identified as the data string entered in the derived area of the composite cell of the item name "sales" and, since the data string is not entered in this case, a numeric value "0" is set in the relevant space in the fourth row of the tabulation management table.

As in the case of FIG. 11, the data of the data output source are transferred and tabulated in the fourth row of the tabulation management table set as above. The data tabulated in the fourth row of the tabulation management table are transferred to the "cell data storing portion" of the relevant cell data name of the output destination table as in the case of FIG. 11.

If the relevant cell is the composite cell, the data in the fourth row of the tabulation management table are transferred to the "cell data storing portion" of the "main area entry information portion" in the relevant cell data if the column position thereof on the tabulation management table is not the above "difference item column position data", and are transferred to the "cell data storing portion" of the "derived area entry information portion" in the relevant cell data if the column position thereof on the tabulation management table is the "difference item column position data".

In this example, the relevant data of the column of the item name "sales" in the fourth row of the tabulation management table are transferred to the "cell data storing portion" of the "main area entry information portion" in the relevant cell data, and the relevant data of the column of the "difference item name" ("profit" in this example) are transferred to the "cell data storing portion" of the "derived area entry information portion" in the relevant cell data.

After the above transfer and tabulation are performed for one record cell sequence, the next record cell sequence is picked up from the output destination table, and the main record is merged with the data of the "difference item name" and is set in the tabulation management table to perform the transfer and tabulation of the output source data as above.

The same procedure is repeated to perform the transfer and tabulation of the output source data for all the record cell sequences acquired from the output destination table.

In the processes relating to the data output, the "table calculation process" (step F2) and the "string data forming process" (step F3) following the "data output process" (step F1) are the same as the processes in the case of FIG. 11.

If the difference condition is the "item name type", from a standpoint of sharing the same output process mechanism, after the above method in the example of FIG. 11, i.e., after the main record of the output destination table is set in the tabulation management table to output the output source data, the relevant sub-record may be created again in the tabulation management table to output the output source data. In this case, the sub-record can be acquired by replacing the data of the relevant column of the corresponding item name ("sales" in this example) with the relevant data of the difference item name ("profit" in this example) for the main record set in the tabulation management table.

Figure 46:
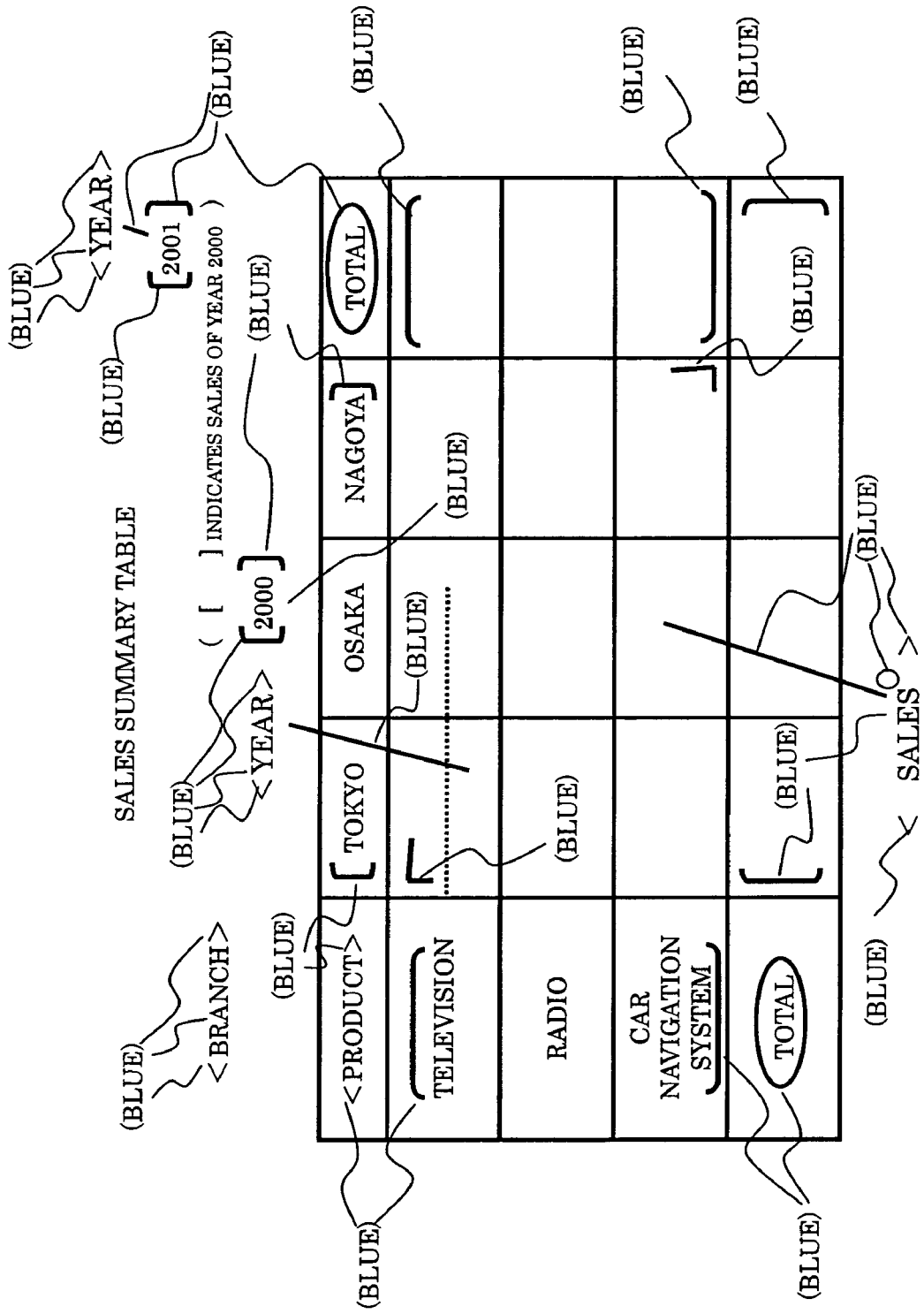
FIG. 46 is a diagram of an example of additionally entering definition support entry information in a third form format in the system of the embodiment.

The composite field may be established by partitioning one cell with a ruled line as shown in FIG. 46. In a table shown in FIG. 46, when the item name "year" is "2001", data are entered in the upper portion from a broken ruled line formed in a cell of the data field defined with the corresponding item name "sales" and, when the item name "year" is "2000", data are entered in the lower portion from the ruled line.

In the table shown in FIG. 46, two cells on the both sides of the broken ruled line are combined to configure a composite cell in the data field of the item name "sales", and the upper cell and the lower cell are considered to configure the main area and the derived area, respectively.

A tabulation format with the composite cell formed by the ruled line can also be used by changing and adding a portion of the user operation and process in the system of the embodiment.

In the table shown in FIG. 46, since a broken line is used for the ruled line in the horizontal direction dividing the main area cell and the derived area cell in the composite cell, the ruled line can be differentiated from the solid ruled line in the horizontal direction vertically partitioning the composite cells. In the description, the ruled line dividing the main area cell and the derived area cell in the composite cell is particularly referred to as "(composite) cell dividing ruled line".

The "(composite) cell dividing ruled line" may only be entered in an arbitrary portion of cells in the composite field. However, for convenience of a system internal process, an operation rule is established for a user to always enter the "(composite) cell dividing ruled line" in the composite cell at the upper left corner of the composite field.

In FIG. 46, the definition is performed by adding the (Blue) color definition support entry information to the table created in (black) color of the normal entry information. The same definition as the case of FIG. 11 is performed for data fields other than the composite field of the item name "sales". In the definition of the composite field of the item name "sales", both the specification of the corresponding item name ("sales" in this example) and the specification of the difference condition are performed as is the case with FIG. 11.

After the table format defined as shown in FIG. 46 is input to the system and a predetermined instruction is provided, the above process is performed until the "item definition data generation" (step A1).

However, as the result of the process, cell data are generated for each cell that is an area surrounded by ruled lines in the table in the case of the composite cell with the "(composite) cell dividing ruled line". That is, in the composite cell with the "(composite) cell dividing ruled line" entered, the cell data are created for each of the main area and the derived area, and in the composite cell without the "(composite) cell dividing ruled line", the cell data are created for the entire composite cell.

A cell data chain linking cell data of constituent cells is created for one data field or total field in the "item definition data generation" (step A1) and the "calculation result space definition data generation" (step A2), and the order of the linkage in the cell data chain may be random in the process currently described. Although the cell data chain is created by linking the relevant cell data in the arrangement order of cells in the data field in the above process in the example of FIG. 11, the cells are not sorted by the arrangement order in this process.

The "composite field determination" (step B1) and the "difference condition definition data generation" (step B4) subsequently performed in the "composite field definition process" (step A3) are performed in accordance with the above process, and the same "difference condition definition data" as the case of FIG. 11 are created for the composite field of the item name "sales" in this example.

In the "derived area definition data generating" process (step B5) in the "composite field definition process" (step A3), the following procedure is added to the above process. Detection of The derived area generating symbol is performed in the composite field, and if the derived area generating symbol registered in the derived area generating element dictionary is detected, the "derived area definition data" are created in accordance with the above process. If the derived area generating symbol is not detected, it is assumed that the composite cell is generated by ruled lines as in this example, and the process branches into the following process.

Two horizontal ruled lines are detected which are close to the upper boundary line of the relevant composite field among ruled lines formed in the relevant composite field. The position of the upper boundary line of the composite field can be obtained as the maximum value of the upper position of each cell configuring the relevant composite field. The upper position of each cell can be known by the positional information in the relevant cell data. The position of the lower boundary line of the composite field can be obtained in the same way.

If two horizontal ruled lines are detected within the relevant composite field, line types and line colors are compared between a first horizontal ruled line, which is closest to the upper boundary line of the relevant field, and a second horizontal ruled line, which is the next closest line.

Since the "(composite) cell dividing ruled line" is always formed in the composite cell at the upper left corner of the relevant composite field as described above, if the line types or line colors are different between the first horizontal ruled line and the second horizontal ruled line, it is determined that this composite field is a composite field having the main area and the derived area vertically divided by the first horizontal ruled line acting as the "(composite) cell dividing ruled line" and that the second horizontal ruled line is a ruled line vertically dividing another lower adjacent composite cell.

If the above determination cannot be acquired from the horizontal ruled lines, two vertical ruled lines are detected which are close to the left boundary line of the relevant composite field as above to perform the same determination.

If the above determination is acquired from either the horizontal ruled lines or the vertical ruled lines detected from the composite field, the "derived area definition data" are generated; a relevant code indicating "derived area division by ruled lines" is set in a "derived area generating element type" data portion thereof; and a code indicating the relevant derived area dividing direction is set in a "direction category" data portion.

The "derived area dividing position" is obtained as dimensions between the first horizontal ruled line and the second horizontal ruled line if the derived area dividing direction is the vertical direction, and is obtained as dimensions between the first vertical ruled line and the second vertical ruled line if the derived area dividing direction is the horizontal direction. The obtained "derived area dividing position" is set in a "dividing position" data portion in the "derived area definition data".

With regard to the first horizontal ruled line or the first vertical ruled line determined as the "(composite) cell dividing ruled line" in the above determination, the relevant ruled line data are referenced to set codes indicating the line type and line color thereof in a "line type" data portion and a "line color" data portion in the "derived area definition data". In the case of FIG. 46 of this example, codes are set to indicate a line type of broken line and a line color of black.

In the process of "replacing with cell data for composite cell" (step B6) following the "derived area definition data generating" process (step B5), the "derived area generating element type" in the "derived area definition data" is determined first and, in the case of the "derived area division by ruled lines" as in this example, the following process is performed.

If the derived area dividing direction is the vertical direction, candidates of the main area cells are found one by one as the cells with lower boundary ruled lines having the same line type and line color as the line type and line color of the "(composite) cell dividing ruled line" registered in the "derived area definition data" in the relevant composite field. The ruled line forming the lower boundary line of the cell can be acquired by repeatedly checking the position of the lower cell boundary portion registered in the relevant cell data against the positional information of each ruled line data on the document.

With regard to each candidate of the main area cell found as above, a lower adjacent cell is found as a derived area cell to identify a combination of the main area cell and the derived area cell configuring one composite cell. The lower adjacent derived area cell of the main area cell can be found by repeatedly checking the positional information of the main area cell candidate against the positional information of each cell configuring the relevant composite field.

If the derived area dividing direction is the "horizontal direction", candidates of the main area cells may be found as the cells with right boundary ruled lines having the same line type and line color as the line type and line color of the "(composite) cell dividing ruled line", and with regard to the candidate cells of the main area cells, a right adjacent cell may be found as a derived area cell to identify a combination for a composite cell.

Cell data are created for each of the newly identified composite cell combination. The position of the upper left corner point of the entire composite cell is positional information to be registered in the cell data and is, for example, the position of the upper left corner point of the main area cell configuring the composite cell if the composite cell is vertically configured as in this example, and the position of the lower right corner point of the entire composite cell is obtained as the position of the lower right corner point of the derived area cell. If the composite cell is horizontally configured, the position of the upper left corner point of the entire composite cell is the position of the upper left corner point of the main area cell and the lower right corner point of the entire composite cell is also obtained as the position of the lower right corner point of the derived area cell.

The above process of "replacing with cell data for composite cell" is also performed for all the total fields, and two original cells configuring the composite cell are identified for all the composite cells with "(composite) cell dividing ruled lines" originally formed to create a new piece of the cell data. The original cell data of two cells configuring the composite cell are discarded at this point.

The "cell data chain" is created again for all the composite cells configuring the composite field by sorting the cell date with the order of cell arrangement, and the address of the leading cell data is set again in a "leading cell data address" data portion in the "item definition data" or the "total field definition data".

For all the item definition and total definition data fields other than the composite field, the "cell data chains" are linked again at this point in the order of cell arrangement.

With regard to the above process change of sorting the "cell data chain" in the order of cell arrangement for the first time after the "derived area definition data generation", it is apparent from the above description that this process change can directly be applied to the case of generating the composite cell with derived area generating symbols other than ruled lines.

In the "string data forming process" (step F3) of the "data output process", the string data are generated to represent each of data transferred and tabulated in the output format as described above, and string data are newly generated which correspond to the derived area generating symbol for the composite cells not having the derived area generating symbols originally entered. In the case of the currently described "derived area division by ruled lines", a function corresponding to the process of automatically generating the derived area generating symbol is performed as follows.

It is determined for each composite cell in the composite field that a ruled line with the same direction, line type, and line color as the defined "(composite) cell dividing ruled line" is formed within a threshold of the "derived area dividing position" in the relevant composite cell. This may be performed by picking up ruled line data for the ruled lines in the relevant direction on the document, by selecting ruled lines including the both end positions of the relevant cell at the both end positions thereof in the direction of the ruled lines, and by searching among the selected ruled lines for a ruled line located within a threshold of the derived area dividing position of the relevant composite cell in the direction perpendicular to the ruled line.

If the ruled line satisfying the above condition is not formed in a composite cell, a new "(composite) cell dividing ruled line" is generated in the cell. That is, ruled line data are generated that represent the "(composite) cell dividing ruled line" in accordance with the relevant "derived area definition data".

For example, if the composite cell is divided in the vertical direction as in this example, the ruled line to be generated is a horizontal ruled line; the vertical position thereof on the document is a position acquired by adding the "derived area dividing position" to the lower boundary position of the relevant cell; and the both horizontal end positions are equivalent to the both horizontal end positions of the relevant composite cell. The "line modification" data and "line color" data of the generated ruled line data may be set to the "line type" data and "line color" registered in the "derived area definition data".

The above ruled line data of the "composite cell dividing ruled lines" created for the composite cells may be integrated for each row or column of the composite field. If the "(composite) cell dividing ruled line" is originally formed in a portion of the row or column, the ruled line data of that line are also integrated. For example, if the composite cell is vertically divided, the both horizontal end positions of the newly integrated ruled line are both horizontal end positions of the relevant composite field, and the vertical position is a position acquired by adding the "derived area dividing position" to the lower position of the relevant row.

The both horizontal end positions of the composite field can be acquired by picking up the constituent cells one by one from the relevant cell data chain and by obtaining the minimum value of the left positions and the maximum value of the right positions of the cells. The relevant ruled line data are discarded at this point for the originally formed (composite) cell dividing ruled line and the (composite) cell dividing ruled line created for each composite cell.

In the system of the embodiment, the definition support entry information entered for definition can be differentiated by the preliminarily given modification information from the normal entry information originally entered on the document as described above and, for example, when the document is printed, only the definition support entry information can be controlled not to be output.

Therefore, an output result of a table format without ruled lines can be acquired by entering the ruled lines of the table format as the definition support entry information. For example, if the ruled lines of the table format shown in FIG. 11 are entered in (blue) color, which is differentiation information assigned to the definition support entry information, a table output result shown in FIG. 47 can be acquired.

When the ruled lines in the table format shown in FIG. 11 are entered in (blue) color, which is the differentiation information of the definition support entry information, although the definition element data are once created as the "linking lines" of the definition elements after the ruled line data are created for each ruled line, the relevant definition element data are discarded as residual definition elements that cannot configure the definition data in the subsequent "overall definition data creating" procedure (FIG. 23), and the ruled lines are handled as ruled lines simply entered as the normal entry information in the process.

However, at the time of data output, the differentiation information assigned to the definition support entry information is referenced for each of the document element data, and the corresponding result can be acquired as the table output result without the printed table lines shown in FIG. 47.

By entering the "composite cell dividing ruled line" with the use of the definition support information differentiated by (blue) color, the table output result can be acquired without clearly showing the derived area boundary. For example, if the composite cell dividing ruled lines are assigned to the definition support entry information and entered in (blue) color in the table format shown in FIG. 46, a table output result shown in FIG. 48 can be acquired.

In this case, the "dividing ruled lines" entered in (blue) color are handled in the same way as the ruled lines entered as the normal entry information in the process, and the table output result shown in FIG. 48 is obtained without printing the "dividing ruled lines" at the time of data output by performing the process exactly the same as the case shown in FIG. 46.

It is apparent from the above description that the sub-screen 94 can be used on the screen to perform the definition as above if a composite cell is divided by a ruled line.

A portion of the apparatus of the embodiment can be expanded and changed to perform a table calculation function on the table format in a simple manner. For example, it is assumed that a user creates and fills out a table shown in FIG. 49, which is prepared as a sheet. The table shown in FIG. 49 is a table having the same format as the table shown in FIG. 10, and the same data as the table shown in FIG. 10 are entered in the data field of the item name "sales" while total data are not yet entered in the total field in the right end column and the total field in the lower end row.

The definition element symbols for the "field specification" are used on the sheet as in the above case to specify only the data field including data to be summed (the data field of the item name "sales" in this example) and the total fields to be filled out with the total data. The definition element symbols "○" for the "registered word specification" are used as in the above case to circle the characters "total" adjacent to the left side of the total field at the lower end of the table and the characters "total" adjacent to the lower side of the total field at the right end of the table.

If the data field filled out with the data to be summed is a composite field consisting of composite cells, in a method of instruction, the definition element symbol "○" for the "registered word specification" is used to circle an arbitrary derived area generating element (symbol pair "[ ]" in this example) in the relevant data field. Alternatively, in another method, a definition element term (e.g., "composite") may be registered to instruct that a data field is a composite field, entered as the (blue) color definition support information in any blank space, and correlated with the relevant data field through a linking line.

After the sheet with the above definition is input to the system through the scanner 10 and the predetermined operational instruction is provided, the system performs the same operation procedure as above to create the field candidate definition data pointing the relevant cell data chain of a field specified with the use of the definition element symbol for the "field specification".

In the next step of creating the item definition data, if an item name specification string cannot be found to complete the item definition data of each data field with the field candidate definition data created, it is considered that a mode is "simple table calculation", and the process branched into the following procedure.

Among the data fields with the field candidate definition data created, a data field is identified which is correlated through the linking line with the characters "total" circled with the definition element symbol "○" for the "registered word specification" or which is located at the above "specific adjacent position" and the total field definition data are created as above. In the remaining field candidate definition data, certain new data are set in the "data type" portion to form the "calculation target field definition data".

With regard to each total space cell configuring the data field with the field candidate definition data defined, it is confirmed again that the corresponding calculation target field may exist in a data field range where the calculation target field definition data are defined, and only the confirmed total space cell is selected to create a new cell data chain again.

The determination of the composite field is performed for the data field with the "calculation target field definition data" defined. If the data field with the "calculation target field definition data" defined is correlated with the definition element term for the "composite field specification" through the linking line, it is determined that this data field is the composite field.

When the definition element symbol "○" for the "registered word specification" is searched in the data field with the "calculation target field definition data" defined, if a circled symbol is a symbol registered in the "definition area generating element dictionary", it is determined that this data field is the composite field.

The "composite category" data in the relevant "calculation target field definition data" are set to "1" representing the "composite field" for the data field determined as the composite field. The "derived area definition data" are created as above and are pointed from the "derived area definition data pointer" of the relevant "calculation target field definition data". The cell data of all the cells configuring the relevant composite field are replaced with the cell data for the composite cell as above.

Finally, it is determined for all the total space cells configuring the total field whether the corresponding calculation target field is the composite field, and if it is determined that the field is the composite field, the relevant cell data are replaced with the cell data for the composite cells.

With the above process, all the definition data generating processes are terminated which is performed in response to the specification of the "definition interpretation button". On the "mode list menu" displayed when clicking and specifying the "mode" button always displayed on the display screen 12a, a "calculation execution" button is specified, the following process is performed.

A data string is identified which is entered in each cell in the data field with the "calculation target field definition data" defined and is converted into relevant numeric data with a known method, and the acquired numeric data are set in the "cell data storing portion" in the relevant cell data.

If the data field with the "calculation target field definition data" defined is the composite field, a data string is identified for each of the main area and the derived area of each cell configuring the composite field and is converted into the numeric data, which are set in the "cell data storing portion" of the "main area entry information portion" and the "cell data storing portion" of the "derived area entry information portion" in the relevant cell data.

The calculation target field is identified for each total space cell configuring the data field with the "calculation target field definition data" defined, and the entry data in each cell configuring the calculation target field are read and added to enter the addition result in the relevant total space cell.

The calculation target field corresponding to one total space cell can be identified as above. The entry data in each cell configuring the calculation target field may be read from the "cell data storing portion" of the relevant cell data, and the addition result data may be stored in the "cell data storing portion" in the cell data.

If each cell configuring the calculation target field is the composite cell as in this example, the data stored in the "cell data storing portion" of the "main area entry information portion" in the relevant composite cell data are read and added to store the result in the "cell data storing portion" of the "main area entry information portion" in the cell data of the total space cell. Similarly, the data stored in the "cell data storing portion" of the "derived area entry information portion" in the relevant composite cell data may be read and added to store the result in the "cell data storing portion" of the "derived area entry information portion" in the cell data of the "total space cell".

Finally, the "string data forming process" is performed for the data summed as above. The data stored in the "cell data storing portion" in the relevant cell data are picked up for each total space cell in the total field to create the corresponding string data. If the total cell is the composite cell, the "string data forming process" is performed for the total data of the main area and the derived area. The "string data forming process" can be performed in exactly the same way as above.

If the derived area generating element is not preliminarily entered in the total space cell, the string data corresponding to the derived area generating element are also generated as above.

If the characters "total" in the table format shown in FIG. 49 is replaced with characters of a term instructing calculations such as "average" or "variance" and the same definition operation is performed, as apparent from the above description, after it is identified that the term string is the registered term in the sub-definition system of the "calculation result specification" in the application term dictionary 52, the definition data (such as "average result entry space field definition data") of the field filled out with the calculation result of the relevant calculation type are created for a field portion corresponding to the total field in the table format of FIG. 49. It is also apparent from the above description that each constituent cell is filled out with the calculation result of the relevant calculation type performed for the relevant data in the calculation target field by the "calculation execution" instruction on the screen 20a.

The table shown in FIG. 49 may be defined with the above on-screen defining method. In the case of the above defining method using the sub-screen 94, after the calculation target data field range is clicked and specified, the end instruction button 120 is specified. If it is desired to specify a field attribute, only the field attribute is input with the above method and the end instruction button 120 is specified. The system creates the "calculation target field definition data" in response to the above operation.

If the calculation target data field is the composite field, on the "item name specification menu" 96 displayed after the relevant data field range is clicked and specified, for example, an appropriate dummy string (e.g., ***) is entered in the item name space 110 or the data name entry space 112 of the difference condition without entry in the item name space 98, and the end instruction button 120 is specified. If it is desired to specify the field attribute of the derived area, the field attribute is input as above and the end instruction button 120 is specified.

To specify that the relevant data field is the composite field, for example, an appropriate button ("composite" button) may be newly disposed in the "item name specification menu" 96 and may be clicked and specified for the specification.

In response to the above operation, the system creates the "calculation target field definition data" with the "composite category" data set to "1" representing the "composite field". The "derived area definition data" are created which are pointed from the "calculation target field definition data", and the cell data of the constituent cells are replaced with the data for the composite cells.

After all the calculation target data fields are defined, the definition of the total field is performed. The order of the specification of the calculation target data fields and the total field is determined by the user operation rule. After clicking and specifying the relevant data field range, the "total" specification button 102 may be specified.

In response to the above operation, the system creates the total field definition data. As described above, it is determined for each total space cell of the total field whether the calculation target field is the composite field, and if it is determined that the field is the composite field, the relevant cell data are replaced with the cell data for the composite cell.

Although description has been made of the embodiment of the normal summary table when all the non-tabulation items act as keys for tabulation, in the case of a particular summary table including non-tabulation items not acting as the keys for tabulation, a definition element symbol may be provided to indicate the "non-tabulation items not acting as the keys for tabulation", and the relevant item name string may be differentiated by adding the symbol to the right shoulder portion as above and may be removed from the checked items when checking the data at the time of tabulation.

The present invention uses a program or software for realizing the above function of the present invention. The software may be installed in the system of the present invention through an arbitrary medium, for example, an accumulation medium or online. Therefore, embodiments of the present invention include an act of transferring an accumulation medium storing the software for carrying out the present invention in business and an act of installing the software into the system online.

The invention claimed is:

1. A method of using an information processing apparatus for processing data related to a table format of a table having at least one of rows and columns separated by a ruled line, the information processing apparatus including (i) a means to generate and store table format data that represents the table format, the table format data including (a) character string data specifying a code string and a position of a character string or a symbol on the table format, (b) line data specifying a category and a position of a line on the table format, one category of the line being the ruled line, and (c) cell data specifying a boundary position of a cell of a plurality of cells, each of the plurality of cells being a rectangular area surrounded by ruled lines on the table format, (ii) a means to designate each set of a plurality of sets of cells, of the plurality of cells, as a respective data field and to associate a corresponding item name with each respective data field of the designated data fields, such that each of a plurality of corresponding item names is associated with a respective data field, wherein the designated data fields comprise a plurality of data fields, (iii) a means to relate a difference condition character string to a first data field of the plurality of data fields, the difference condition character string representing a difference condition that is a difference in a method of outputting data between two unitary areas specified in the first data field, and each of the two unitary areas being a rectangular area in which one datum is entered, (iv) a means to display the table format based on the table format data, and (v) a means to store a data file containing a plurality of file records, each of the plurality of file records being a set of a datum, wherein each respective constituent datum of each of the plurality of file records is associated with a proper item name, the method comprising:

(1) specifying, for each respective data field of the plurality of data fields, item definition data that relates a corresponding item name, of the plurality of corresponding item names, to the respective data field, of the plurality of data fields, such that the first data field, of the plurality of data fields, is associated with a first item name of the plurality of corresponding item names, wherein each other data field, of the plurality of data fields, is disposed to the left of or above the first data field on the table format;

(2) specifying difference condition definition data for the first data field, the difference condition definition data being specified based on the difference condition character string related to the first data field, the difference condition definition data defining the difference condition and including information of data changing and information of the item name registered therein, such that a datum is to be changed according to the information of data changing, and the datum to be changed is associated with the item name registered as the information of item name;

(3) identifying a set of cells, of the plurality of cells, as a relational cell set based on the cell data identified in the item definition data specified for each respective data field, wherein each constituent cell of the relational cell set is respectively identified in a data field, of the plurality of data fields, having a proper item name associated therewith, such that a first constituent cell of the relational cell set is identified in the first data field, such that the first constituent cell is located on a target column and on a target row of the table format, and such that each other constituent cell of the constituent cells of the relational cell set is located on only one of the target column and the target row;

(4) identifying a first unitary area and a second unitary area in relation to the first constituent cell of the relational cell set in the first data field, wherein a rectangular area obtained by uniting the first unitary area and the second unitary area occupies a vertical range and a horizontal range, such that each respective constituent cell of the relational cell set other than the first constituent cell fully occupies only one of the vertical range and the horizontal range, and such that the first unitary area and the second unitary area are identified by a predetermined method based on cell data representing the first constituent cell of the relational cell set;

(5) specifying a main record that is a combination of each respective constituent datum associated with the proper item name, each respective constituent datum of the main record being identified as a datum entered in each respective constituent cell of the relational cell set, and the proper item name associated with each respective constituent datum of the main record being identified as an item name associated with a data field, of the plurality of data fields, containing a corresponding constituent cell of the relational cell set;

(6) specifying a sub-record by changing a constituent datum of each respective constituent datum of the main record according to the information of data changing included in the difference condition definition data, and the changed constituent datum being associated with the item name registered as the information of the item name included in the difference condition definition data;

(7) outputting a constituent datum of a first file record fetched out from the data file into the identified first unitary area, the output constituent datum of the first file record being associated with the first item name in the first file record, wherein each constituent datum of the main record and associated with an item name other than the first item name, is the same as a constituent datum (i) of the first file record and (ii) sharing a same associated item name; and (8) outputting a constituent datum of a second file record fetched out from the data file into the identified second unitary area, the output constituent datum of the second file record being associated with the first item name in the second file record, wherein each constituent datum of the sub-record and associated with an item name other than the first item name, is the same as a constituent datum (i) of the second file record and (ii) sharing a same associated item name.

2. The method of claim 1, wherein the first unitary area and the second unitary area is identified by dividing the first constituent cell of the relational cell set based on specified symbols or a specified line entered at the specified position in the first constituent cell.

3. The method of claim 1, wherein the sub-record is obtained by replacing a corresponding constituent datum of the main record with a datum registered as the information of data changing in the difference condition definition data, the corresponding constituent datum of the main record being associated with an item name registered as the information of the item name in the difference condition definition data.

4. The method of claim 1, wherein a datum is output into the second unitary area, the datum output into the second unitary area representing a numerical value that is a sum of each numerical value represented by a constituent datum of each file record of a sub-set of file records of the plurality of file records, the datum output into the second unitary area being associated with the first item name, the first item name being designated as tabulation category, wherein each constituent datum of the sub-record and associated with an item name other than the first item name, is the same as a constituent datum (i) of each file record of the plurality of file records and (ii) sharing a same associated item name.

5. An information processing apparatus for processing data related to a table format of a table having at least one of rows and columns separated by a ruled line, the information processing apparatus comprising:

a means to generate and store table format data that represents the table format, the table format data including (a) character string data specifying a code string and a position of a character string or a symbol on the table format, (b) line data specifying a category and a position of a line on the table format, one category of the line being the ruled line, and (c) cell data specifying a boundary position of a cell of a plurality of cells, each of the plurality of cells being a rectangular area surrounded by ruled lines on the table format;

a means to designate each set of a plurality of sets of cells, of the plurality of cells, as a respective data field and to associate a corresponding item name with each respective data field of the designated data fields, such that each of a plurality of corresponding item names is associated with a respective data field, wherein the designated data fields comprise a plurality of data fields;

a means to relate a difference condition character string to a first data field of the plurality of data fields, the difference condition character string representing a difference condition that is a difference in a method of outputting data between two unitary areas specified in the first data field, and each of the two unitary areas being a rectangular area in which one datum is entered;

a means to display the table format based on the table format data;

a means to store a data file containing a plurality of file records, each of the plurality of file records being a set of a datum, wherein each respective constituent datum of each of the plurality of file records is associated with a proper item name;

a means for specifying, for each respective data field of the plurality of data fields, item definition data that relates a corresponding item name, of the plurality of corresponding item names, to the respective data field, of the plurality of data fields, such that the first data field, of the plurality of data fields, is associated with a first item name of the plurality of corresponding item names, wherein each other data field, of the plurality of data fields, is disposed to the left of or above the first data field on the table format;

a means for specifying difference condition definition data for the first data field, the difference condition definition data being specified based on the difference condition character string related to the first data field, the difference condition definition data defining the difference condition and including information of data changing and information of the item name registered therein, such that a datum is to be changed according to the information of data changing, and the datum to be changed is associated with the item name registered as the information of item name;

a means for identifying a set of cells, of the plurality of cells, as a relational cell set based on the cell data identified in the item definition data specified for each respective data field, wherein each constituent cell of the relational cell set is respectively identified in a data field, of the plurality of data fields, having a proper item name associated therewith, such that a first constituent cell of the relational cell set is identified in the first data field, such that the first constituent cell is located on a target column and on a target row of the table format, and such that each other constituent cell of the constituent cells of the relational cell set is located on only one of the target column and the target row;

a means for identifying a first unitary area and a second unitary area in relation to the first constituent cell of the relational cell set in the first data field, wherein a rectangular area obtained by uniting the first unitary area and the second unitary area occupies a vertical range and a horizontal range, such that each respective constituent cell of the relational cell set other than the first constituent cell fully occupies only one of the vertical range and the horizontal range, and such that the first unitary area and the second unitary area are identified by a predetermined method based on cell data representing the first constituent cell of the relational cell set;

a means for specifying a main record that is a combination of each respective constituent datum associated with the proper item name, each respective constituent datum of the main record being identified as a datum entered in each respective constituent cell of the relational cell set, and the proper item name associated with each respective constituent datum of the main record being identified as an item name associated with a data field, of the plurality of data fields, containing a corresponding constituent cell of the relational cell set;

a means for specifying a sub-record by changing a constituent datum of each respective constituent datum of the main record according to the information of data changing included in the difference condition definition data, and the changed constituent datum being associated with the item name registered as the information of the item name included in the difference condition definition data;

a means for outputting a constituent datum of a first file record fetched out from the data file into the identified first unitary area, the output constituent datum of the first file record being associated with the first item name in the first file record, wherein each constituent datum of the main record and associated with an item name other than the first item name, is the same as a constituent datum (i) of the first file record and (ii) sharing a same associated item name; and a means for outputting a constituent datum of a second file record fetched out from the data file into the identified second unitary area, the output constituent datum of the second file record being associated with the first item name in the second file record, wherein each constituent datum of the sub-record and associated with an item name other than the first item name, is the same as a constituent datum (i) of the second file record and (ii) sharing a same associated item name.

6. A non-transitory computer-readable recording medium having a computer program recorded thereon, the program being for controlling an information processing apparatus to process data related to a table format of a table having at least one of rows and columns separated by a ruled line, the information processing apparatus including (i) a means to generate and store table format data that represents the table format, the table format data including (a) character string data specifying a code string and a position of a character string or a symbol on the table format, (b) line data specifying a category and a position of a line on the table format, one category of the line being the ruled line, and (c) cell data specifying a boundary position of a cell of a plurality of cells, each of the plurality of cells being a rectangular area surrounded by ruled lines on the table format, (ii) a means to designate each set of a plurality of sets of cells, of the plurality of cells, as a respective data field and to associate a corresponding item name with each respective data field of the designated data fields, such that each of a plurality of corresponding item names is associated with a respective data field, wherein the designated data fields comprise a plurality of data fields, (iii) a means to relate a difference condition character string to a first data field of the plurality of data fields, the difference condition character string representing a difference condition that is a difference in a method of outputting data between two unitary areas specified in the first data field, and each of the two unitary areas being a rectangular area in which one datum is entered, (iv) a means to display the table format based on the table format data, and (v) a means to store a data file containing a plurality of file records, each of the plurality of file records being a set of a datum, wherein each respective constituent datum of each of the plurality of file records is associated with a proper item name, the program causing the information processing apparatus to execute a method comprising:

(1) specifying, for each respective data field of the plurality of data fields, item definition data that relates a corresponding item name, of the plurality of corresponding item names, to the respective data field, of the plurality of data fields, such that the first data field, of the plurality of data fields, is associated with a first item name of the plurality of corresponding item names, wherein each other data field, of the plurality of data fields is disposed to the left of or above the first data field on the table format;

(2) specifying difference condition definition data for the first data field, the difference condition definition data being specified based on the difference condition character string related to the first data field, the difference condition definition data defining the difference condition and including information of data changing and information of the item name registered therein, such that a datum is to be changed according to the information of data changing, and the datum to be changed is associated with the item name registered as the information of item name;

(3) identifying a set of cells, of the plurality of cells, as a relational cell set based on the cell data identified in the item definition data specified for each respective data field, wherein each constituent cell of the relational cell set is respectively identified in a data field, of the plurality of data fields, having a proper item name associated therewith, such that a first constituent cell of the relational cell set is identified in the first data field, such that the first constituent cell is located on a target column and on a target row of the table format, and such that each other constituent cell of the constituent cells of the relational cell set is located on only one of the target column and the target row;

(4) identifying a first unitary area and a second unitary area in relation to the first constituent cell of the relational cell set in the first data field, wherein a rectangular area obtained by uniting the first unitary area and the second unitary area occupies a vertical range and a horizontal range, such that each respective constituent cell of the relational cell set other than the first constituent cell fully occupies only one of the vertical range and the horizontal range, and such that the first unitary area and the second unitary area are identified by a predetermined method based on cell data representing the first constituent cell of the relational cell set;

(5) specifying a main record that is a combination of each respective constituent datum associated with the proper item name, each respective constituent datum of the main record being identified as a datum entered in each respective constituent cell of the relational cell set, and the proper item name associated with each respective constituent datum of the main record being identified as an item name associated with a data field, of the plurality of data fields, containing a corresponding constituent cell of the relational cell set;

(6) specifying a sub-record by changing a constituent datum of each respective constituent datum of the main record according to the information of data changing included in the difference condition definition data, and the changed constituent datum being associated with the item name registered as the information of the item name included in the difference condition definition data;

(7) outputting a constituent datum of a first file record fetched out from the data file into the identified first unitary area, the output constituent datum of the first file record being associated with the first item name in the first file record, wherein each constituent datum of the main record and associated with an item name other than the first item name, is the same as a constituent datum (i) of the first file record and (ii) sharing a same associated item name; and (8) outputting a constituent datum of a second file record fetched out from the data file into the identified second unitary area, the output constituent datum of the second file record being associated with the first item name in the second file record, wherein each constituent datum of the sub-record and associated with an item name other than the first item name, is the same as a constituent datum (i) of the second file record and (ii) sharing a same associated item name.

* * * * *